US012111638B2

(12) United States Patent
Czinger et al.

(10) Patent No.: US 12,111,638 B2
(45) Date of Patent: Oct. 8, 2024

(54) ADAPTIVE PRODUCTION SYSTEM

(71) Applicant: Divergent Technologies, Inc., Los Angeles, CA (US)

(72) Inventors: Kevin Robert Czinger, Santa Monica, CA (US); Michael Thomas Kenworthy, Rancho Palos Verdes, CA (US); Lukas Philip Czinger, Santa Monica, CA (US); Jinbo Chen, Rancho Palos Verdes, CA (US); Antonio Bernerd Martinez, El Segundo, CA (US); Matthew Cooper Keller, Marina Del Rey, CA (US); Alex James Hamade, Redondo Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/342,926

(22) Filed: Jun. 9, 2021

(65) Prior Publication Data
US 2022/0066426 A1 Mar. 3, 2022

Related U.S. Application Data

(60) Provisional application No. 63/047,815, filed on Jul. 2, 2020, provisional application No. 63/037,555, filed on Jun. 10, 2020.

(51) Int. Cl.
*G05B 19/418* (2006.01)

(52) U.S. Cl.
CPC ... *G05B 19/41805* (2013.01); *G05B 19/4183* (2013.01); *G05B 19/4188* (2013.01); *G05B 19/41885* (2013.01)

(58) Field of Classification Search
CPC ......... G05B 19/41805; G05B 19/4183; G05B 19/4188; G05B 19/41885
(Continued)

(56) References Cited

U.S. PATENT DOCUMENTS 5,203,226 A 4/1993 Hongou et al.
5,742,385 A 4/1998 Champa
(Continued)

FOREIGN PATENT DOCUMENTS

NO 2010142703 A2 12/2010
WO 1996036455 A1 11/1996
(Continued)

OTHER PUBLICATIONS

US 9,202,136 B2, 12/2015, Schmidt et al. (withdrawn)
(Continued)

*Primary Examiner* — Mohammad Ali
*Assistant Examiner* — Joshua T Sanders
(74) *Attorney, Agent, or Firm* — ARENTFOX SCHIFF LLP

(57) ABSTRACT

Adaptable manufacturing systems, methods, and apparatuses are disclosed. An apparatus for manufacturing a product in accordance with the present disclosure may include a design apparatus, an assembly apparatus, and a control apparatus, coupled to the design apparatus and the assembly apparatus. The control apparatus receives input information from the design apparatus and the assembly apparatus. The control apparatus provides output information for altering at least one parameter used by at least one of the design apparatus and the assembly apparatus in the manufacture of the product.

69 Claims, 40 Drawing Sheets

(58) Field of Classification Search
USPC .......................................................... 700/97
See application file for complete search history.

(56) References Cited

U.S. PATENT DOCUMENTS

| | | | |
|---|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |

(56) References Cited

U.S. PATENT DOCUMENTS

| | | |
|---|---|---|
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |

(56) References Cited

U.S. PATENT DOCUMENTS

| | | |
|---|---|---|
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2015/0142153 A1* | 5/2015 | Chun .............. B29C 64/40 700/98 |
| 2016/0129636 A1* | 5/2016 | Cudak ............ G05B 19/4099 700/97 |
| 2017/0113344 A1 | 4/2017 | Schönberg |
| 2017/0341309 A1 | 11/2017 | Piepenbrock et al. |
| 2017/0343984 A1* | 11/2017 | Czinger ............ B33Y 50/00 |
| 2018/0311769 A1 | 11/2018 | TenHouten et al. |
| 2018/0341248 A1 | 11/2018 | Mehr et al. |
| 2019/0351106 A1* | 11/2019 | Bonassar ............ B22F 12/30 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |
| WO | 2019/125970 A1 | 6/2019 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding application No. PCT/US21/36687, mailed Sep. 15, 2021, 11 pages.
Extended European Search Report received for European Patent Application No. 21823095.1, mailed on Apr. 23, 2024, 8 pages.

\* cited by examiner

Additive Manufacturing (Print) 2201

- Build Cylinder Re-Merge 2301
- Build Plate/Cylinder Preheat 2303
- Printing 2305
- Build Package Unmerge 2307
- Build Package Cooldown 2309
- Powder Recovery 2311
- Automated Build Plate Separation 2313
- Build Plate Resurface (CNC) 2315
- Build Plate Shot Peen 2317
- Heat Treat 2319
- Support Removal 2321
- Surface Treatment 2323

FIG. 23

ADAPTIVE PRODUCTION SYSTEM

CROSS-REFERENCE TO RELATED APPLICATIONS

This application claims the benefit under 35 U.S.C. § 119(e) of U.S. Patent Application No. 63/037,555, filed 10 Jun. 2020, entitled "ADAPTIVE PRODUCTION SYSTEM", and also claims the benefit under 35 U.S.C. § 119(e) of U.S. Patent Application No. 63/047,815, filed 2 Jul. 2020, entitled "ADAPTIVE PRODUCTION SYSTEM", For those jurisdictions that allow incorporation by reference, the contents of the applications listed in this section are incorporated by reference in their entirety into the present specification.

BACKGROUND

Field

The present disclosure relates generally to manufacturing, and more specifically to an adaptive production system.

Background

Manufacturing of large machines, such as automobiles, is a highly capital-intensive sector. The design, tooling (e.g., steel dies used for mass production of parts), manufacturing lines for parts, and assembly lines for the final product require large capital outlays, and each design change requires changing most of these manufacturing arrangements.

The economics of the automobile industry, and the capital expenditures required to maintain the design and assembly operations, often require multi-year capital investments, maintaining a design and manufacturing team of personnel, and establishing, maintaining and redesigning assembly lines. Only when these structures are in place can a manufacturer begin producing a product.

A significant portion of the automotive assembly is the vehicle body and chassis structure. The body and chassis structure is the protective structure for the vehicle's occupants, powertrain, and other large components included in the automobile. Many auto manufacturers use a combined body and chassis structure, known as a "unibody" construction, to produce automobiles in a more timely and efficient manner. Unibody construction combines the body and chassis of a vehicle in one structure that is stamped and welded together. Since the development of unibody construction over one hundred years ago, very few changes have been made to the overall construction process. Almost all automobiles, sport utility vehicles, and minivans, and even some light trucks, are built using unibody construction.

The production lifecycle of a given automobile begins with an initial perceived demand, and may only last for a short period of time. Although some popular models may last for several generations, and sometimes even decades, many automobile models have updated styling, features, and components every two to five years. A design of the model is started, and the production lines are initiated and assembled. The time between the decision to design a given model and the first automobile to be produced may be three or four years, during which time no return on investment is made.

The unibody of a given automobile model can take a year or more to fully design and engineer. Extensive computer simulations of multiple characteristics, e.g., crashworthiness, durability, manufacturability, aerodynamics, etc., are required before physical models from the design studio can be converted into a unibody. Once the engineering design is finalized, it can take from nine to twelve months to machine the tooling used to stamp hundreds of different individual sheet metal body and frame pieces. These body and frame components are then fixtured and welded together, often with thousands of spot welds, on an assembly line to form the unibody.

Other types of assembly of the unibody, e.g., structural adhesives, self-tapping screws, rivets, mechanical clinching techniques, etc., may also be employed. Thereafter, the unibody is electro-coated and painted, and the remaining parts of the automobile, e.g., glass, drivetrain, interior parts, electronics, etc., are installed to complete construction of the motor vehicle.

As can be seen from this description, such a system is capital intensive and often uses tooling, construction equipment, and other components that are design-specific. Such a system is difficult to modify, and even more difficult to modify in a quick, efficient, or financially reasonable way. When market forces, innovation, or other constraints change, the time and expense needed to modify a production line is often difficult to justify.

Accordingly, the costs to produce a given model are often amortized over a three to four year design and validation period and a six to seven year sales period. Even though a ten to fifteen year amortization seems like a long time, the up-front capital outlay and long period of time before any return on investment is realized creates a large risk of return for any given automobile model.

SUMMARY

Several aspects and features of adaptive manufacturing systems, methods, and apparatuses are disclosed. An apparatus for manufacturing a product in accordance with the present disclosure may comprise a design apparatus, an assembly apparatus, and a control apparatus coupled to the design apparatus and the assembly apparatus. The control apparatus receives input information from the design apparatus and the assembly apparatus. The control apparatus provides output information for altering at least one parameter used by at least one of the design apparatus and the assembly apparatus in the manufacture of the product.

An apparatus for manufacturing a product in accordance with an aspect of the present disclosure comprises a design apparatus, an assembly apparatus, and a control apparatus. The control apparatus is coupled to the design apparatus and the assembly apparatus. The control apparatus receives input information from the design apparatus and the assembly apparatus and provides output information for altering at least one parameter used in the manufacture of the product.

Such an apparatus may further optionally include the control apparatus maintaining at least one first parameter at a desired value while altering the at least one parameter used by the design apparatus or the assembly apparatus, the at least one first parameter being at least one of a strength, a crashworthiness, a cost, or an assembly time, and the output information being delivered to the design apparatus and the assembly apparatus for changing the operation of the design apparatus or the assembly apparatus.

Such an apparatus may further optionally include a testing apparatus, an output of the testing apparatus being used by the control apparatus to alter at least one parameter used by the design apparatus or the assembly apparatus.

The control apparatus may further optionally include a monitoring apparatus, the monitoring apparatus monitoring at least the assembly apparatus such that at least one material used by the assembly apparatus is provided to the assembly apparatus at a time prior to use of the at least one material in the assembly apparatus, the monitoring apparatus further monitoring the design apparatus, such that a change in the design of the product made by the design apparatus is promulgated to the assembly apparatus, and the monitoring apparatus monitoring an inventory of the at least one material.

An apparatus for manufacturing a product in accordance with an aspect of the present disclosure may comprise a design apparatus, an assembly apparatus, a memory, and at least one processor coupled to the memory, the design apparatus, and the control apparatus and configured to receive input information from the design apparatus and the assembly apparatus, and provide output information for altering at least one parameter used in the manufacture of the product.

A method for manufacturing a product in accordance with an aspect of the present disclosure may comprise receiving input information from at least one of a design apparatus and an assembly apparatus, providing output information to at least one of the design apparatus and the assembly apparatus, and altering at least one parameter used by at least one of the design apparatus and the assembly apparatus in the manufacture of the product using the output information.

It will be understood that other aspects of manufacturing, including changes to the overall design and manufacturing process, will become readily apparent to those skilled in the art from the following detailed description, wherein it is shown and described only by way of illustration in the embodiments herein. As can be appreciated by those skilled in the art, the principles or features of the disclosure can be realized with other embodiments without departing from the scope of the present disclosure. Accordingly, the drawings and detailed description are to be regarded as illustrative in nature and not as restrictive.

BRIEF DESCRIPTION OF THE DRAWINGS

Various aspects of the present disclosure will now be presented in the detailed description by way of example, and not by way of limitation, in the accompanying drawings, wherein:

FIG. 23 illustrates further details of an AM print module in accordance with an aspect of the present disclosure.

DETAILED DESCRIPTION

Figure 1:
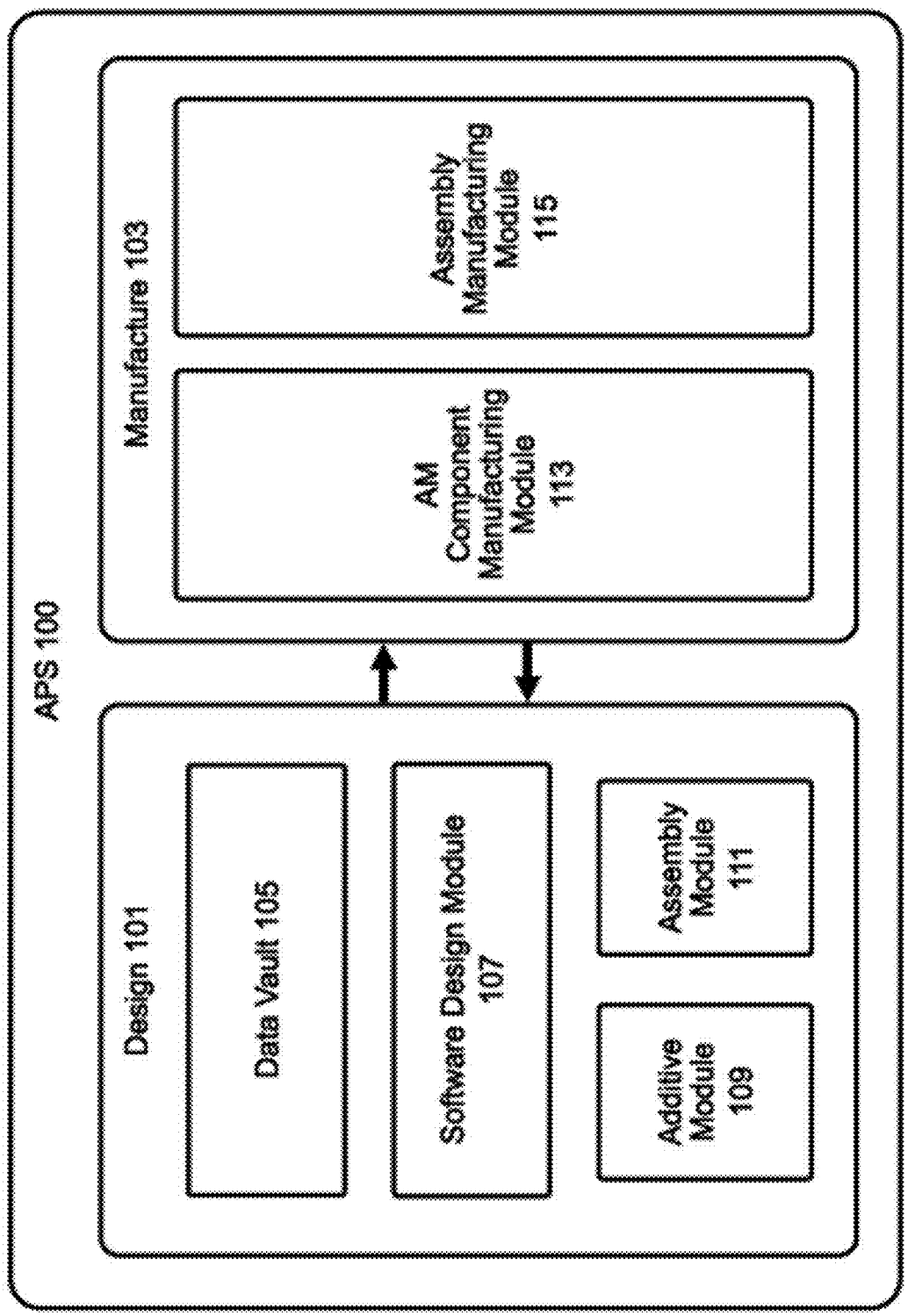
FIG. 1 illustrates an example adaptive production system (APS) in accordance with an aspect of the present disclosure.

The detailed description set forth below in connection with the drawings is intended to provide a description of an exemplary embodiment of an adaptive production system, and it is not intended to represent the only embodiment in which the disclosure may be practiced. The term "exemplary" used throughout this disclosure means "serving as an example, instance, or illustration," and should not necessarily be construed as preferred, advantageous, or exclusive. The detailed description includes specific details for the purpose of providing a thorough and complete disclosure that fully conveys the scope of the disclosure to those skilled in the art. However, the disclosure may be practiced without these specific details. In some instances, well-known structures and components may be shown in block diagram form, or omitted entirely, in order to avoid obscuring the various concepts presented throughout this disclosure.

Overview

In an aspect of the disclosure, an adaptive production system, which may be referred to as the Divergent Adaptive Production System™ (DAPS™) herein, may reduce the capital intensity, design inflexibility, and long product cycle issues that are present in current automotive and/or other heavy manufacturing processes in industry today. In an aspect of the present disclosure, DAPS, when used by automakers, may reduce capital costs, shorten product cycles, reduce the risk of product introductions, and may enable production of more material efficient, energy efficient and capital efficient vehicles.

In an aspect of the present disclosure, an adaptive production system, of which DAPS is an embodiment, may provide for a more localized and resilient automotive industry, as well as other manufacturing industries. DAPS may also enable efficient material distribution in complex structures (such as automobiles) through the use of additive manufacturing-enabled manufacturing. In an aspect of the present disclosure, an adaptive production system such as DAPS places material in the expected load paths in the complex structures during their operation and/or safety requirements. In contrast, stamped components are manufacturing process driven, so stamped components include material in regions that do not function as load paths. This extra material results in mass and energy consumption, as well as material cost penalties.

In an aspect of the present disclosure, an adaptive production system such as DAPS functions as a digital universal construction or manufacturing system, which may partially and/or completely replace unibody construction processes. Outside of the automotive industry, an adaptive production system such as DAPS can be applied to any major industrial sector, such as aerospace, whose products are based on large complex structures that serve as a chassis or motherboard. Such industries may also receive benefits from an adaptive production system such as DAPS analogous to the auto industry.

In an aspect of the present disclosure, an adaptive production system such as DAPS can be an end-to-end, complex production system that integrates multiple manufacturing technologies. In such an aspect, digital design constraints are provided as inputs to the system, and the system produces a physical structure representing the digital input. The product may be produced as digitally designed, or modified and re-evaluated to determine whether the overall design objectives can still be achieved.

In an aspect of the present disclosure, an adaptive production system such as DAPS can provide design teams with a universal construction module or system, allowing users to input various design requirements for any structure and have the system generate a fully engineered structure design, including materials selection, manufacturing order, etc. in digital form that meets all input performance requirements.

The design may be expressed as a physical structure that is designed for additive manufacture, automated assembly, and integrated additive manufacturing. The system may also provide precision assembly of the components of the design, whether the components are additively manufactured or are otherwise manufactured, and produce a final physical structure as the output. The design can be scaled in size or product output, (i.e., production volume) and the system of the present disclosure can maintain some characteristics while changing others to determine where improvements may be made in the overall design and manufacturing process.

In an aspect of the present disclosure, an adaptive production system such as DAPS may provide additional design and manufacturing flexibility over current design and manufacturing systems, as the hardware and software of the adaptive production system remain unchanged. Instead, the design requirements are used as inputs to the system, and a precisely expressed physical structure is output. An adaptive production system in accordance with an aspect of the present disclosure may switch seamlessly from one design to another.

In an aspect of the present disclosure, an adaptive production system, such as DAPS, may comprise one or more subsystems. Each subsystem may comprise one or more modules. For example, and not by way of limitation, in an aspect of the present disclosure, the subsystems of an adaptive production system such as DAPS may be designated using functional process pathways, e.g., a design subsystem, a manufacture subsystem, a test subsystem, and/or additional subsystems. In such an aspect, the subsystems may include modules, e.g., a Data Vault Module, a Software Design Module, an Additive Module, an Assembly Module, an additive manufacturing (AM) Component Manufacturing Module, and an Automated Assembly Module, and/or additional subsystems.

An adaptive production system in accordance with an aspect of the present disclosure may integrate a generative or iterative design process, material selection, performance requirements, additive manufacturing, robotic manufacture, procurement, and machine learning into a globalized system. This globalized system can alter the design and manufacturing process while maintaining performance, quality, and factory throughput parameters, as well as other parameters.

An adaptive production system in accordance with an aspect of the present disclosure may monitor the design, materials used, manufacturing data, assembly processes, testing, and may use the data generated by one monitored aspect to alter aspects in other parts of the system. By viewing the data globally rather than at a sub-assembly level, more detailed analysis and intelligence may be gathered to improve the final product design in terms of cost, performance, quality, or other parameters. Global data analysis may allow the overall system to adapt to changes in one area that may not necessarily be visible in another, but can have effects nonetheless. The adaptive system in accordance with the present disclosure may generates information that in turn is used to improve the system as well as improving the overall product.

An adaptive production system in accordance with an aspect of the present disclosure may more efficiently use materials, energy, and capital outlay per useful product generated and produced. Because data from larger portions, or the entire system, is used in the analysis, an adaptive production system in accordance with an aspect of the present disclosure can reduce the financial risk of embarking on new product development, and can provide more insight to economic value, production costs, and environmental impact.

An adaptive production system in accordance with an aspect of the present disclosure, such as DAPS, may be viewed as a digital universal construction system. Because the adaptive production system is non-design-specific, a factory can easily change from one design to another without retooling, reorganization, or downtime. The digital design input into the adaptive production system determines the physical output, but has minimal or no impact on the software and hardware of the system or its configuration.

Adaptive Production System Diagrams

FIG. 1 illustrates an example adaptive production system (APS), such as DAPS, in accordance with an aspect of the present disclosure.

APS 100 may include two subsystems, a design subsystem 101 and a manufacture subsystem 103. The subsystems can include six modules, a data vault 105, a software design module 107, an additive module 109, an assembly module 111, an AM component manufacturing module 113, and an assembly manufacturing module 115.

Design subsystem 101 can allow users to input design requirements for any structure, and the subsystem can automatically generate a fully engineered structure design (including materials selection) in digital form that meets all input performance requirements and which can be designed for additive manufacture and automated assembly of manufacture subsystem 103. Design subsystem 101 can optimize structural designs specifically for the combination of AM and automated assembly used in manufacture subsystem 103. In this way, for example, structures can be designed and manufactured more efficiently and at reduced cost because the design can be based on the specific requirements, advantages, and limitations of the combination of AM and automated assembly.

In various embodiments, design subsystem 101 can be implemented as a software as a service (SaaS) model. For example, design subsystem 101 can be a service that can be accessed by manufacture subsystem 103 over the internet. In this example, design subsystem 101 and manufacture subsystem 103 may be in geographical different locations. In various embodiments, design subsystem 101 may be locally integrated with manufacture subsystem 103, e.g., in one or more computing systems and databases on a factory floor of the manufacture subsystem. In various embodiments, some of the functions of the design subsystem can be performed instead in the manufacture subsystem, e.g., to enable "factory level" decisions for some functions. For example, the design subsystem may generate fully-engineered CAD of a particular part and send the CAD to the manufacture subsystem, and the manufacture subsystem can generate the printer instructions for the part based on the CAD.

Design subsystem 101 can design for manufacture (DFM) based on the combination of AM and assembly used in APS 100. Design subsystem 101 can take into account many factors, such as manufacturing constraints of AM and automated assembly. For example, design subsystem 101 can design based on manufacturing constraints of AM, such as printer speed vs. quality, the printed characteristics of various materials, etc., and automated assembly constraints, such as robot reach, robot speed, robotic cell layout, etc. In various embodiments, for example, design subsystem 101 may determine that printing a particular part with a particular material at particular printer parameter will likely result in a particular shrinkage of the part due to thermal effects. In this case, design subsystem 101 may take various measures, such as increasing the size of the design to compensate for the shrinkage, adjusting the amount of adhesive used to bond the part to an assembly in the robotic cell post-printing, adjusting the printer parameters to reduce shrinkage at the cost of reducing print speed, etc., or a combination of these or other measures. In various embodiments, a part may include a quick connect (QC) feature (i.e., a feature that a robot can quickly connect to pick up and manipulate the part) designed into the part. Design subsystem 101 may take into account both AM and assembly factors in determining the location of the QC feature in the part. For example, while it might be advantageous for 3D printing to locate the QC feature in a particular location (because the QC feature could be printed without the use of support structures, for example), it might be that the location would make the QC feature inaccessible to the robot during a particular assembly sequence. In this case, design subsystem 101 may adjust the location of the QC feature and/or may adjust the assembly sequence used to assembly the part.

In another example of DFM, in the case that the 3D printer cannot print an entire large structure at one time because of a printing size constraint of the 3D printer, design subsystem 101 may split the large structure a various splitting locations so that the entire structure is divided into multiple parts that can be printed and assembled together to form the entire structure. In this case, fewer splits result in fewer parts that need to be assembled, which generally results in a shorter assembly time. However, design subsystem 101 may determine to increase the number of splits, thereby ultimately increasing assembly time, because the increased number of splits results in smaller parts that can be nested and printed more efficiently by the 3D printer.

In these ways, for example, design subsystem 101 may design for the particular manufacturing environment that uses an integrated combination of 3D printers and robotic assembly.

Data Vault 105

Data vault 105 can provide scalable secure data storage and data query application programming interface (API) for all data collected from various components of APS 100. Data mining and machine learning can be applied to data vault 105 to leverage the extensive data coverage in manufacturing process to improve the algorithms in design, AM and assembly. Data vault 105 can include data collected from any module in APS 100, including software design module 107, additive module 109, and assembly module 111 of design subsystem 101 and AM component manufacturing module 113 and assembly manufacturing module 115 of manufacture subsystem 103, as well as data collected from sources external to APS 100, such as in-service data, which may include, for example customer use data (e.g., data from sensors incorporated with structures manufactured by APS 100 and used by customers). In various embodiments that include a test subsystem, data collected in data vault 105 can include data from testing, such as from test subsystem 204, which is described in more detail below.

Software design module 107 data can include, for example, design input data (FEM, CAD), design objectives, simulation data (topology optimization, free shape optimization, fatigue analysis, crashworthiness analysis, thermal analysis), design output (CAD, design validation, metrics for design objectives), proposed joints for each design options, and nominal assembly sequence and costs. Additive module 109 data can include, for example, data collected during AM manufacturing, such as build logs, build instructions, or other data defined in an AM data specification. In various embodiments, AM data may be available from one or more various software applications, such as Splunk. Additive module 109 data can include, for example, pre/post-coating images that may be analyzed by image processing. In various embodiments, cloud storage, such as MinIO can be used. Additive module 109 data can include, for example, data from a manufacturing execution system (MES) 2003, such as described in more detail below. Assembly module 111 data can include, for example, data from a programmable logic controller (PLC) of assembly manufacturing module 115. In this way, for example, all the data of robotic motion, timing, etc., can be gathered and stored for analysis. In various embodiments, PLC data may be available from one or more various software applications, such as Splunk. In various embodiments that include a test subsystem, data in data vault 105 can include testing data.

Data vault 105 can provide a uniform interface to design data, AM data assembly data, test data, in-service data, etc., and correlate the data to improve quality, performance, and costs. Data from material database 601, a part of data vault 105, can be transferred to software design module 107. More specifically, this data can be transferred to architecture design/optimization module 701, a part of the software design module 107, which will be described in more detail below in the specification. This data may include, for example, one or more of the following: material selection of one or more alloys for an application from alloys and parameters database 605, material selection of one or more adhesives for an application from adhesives database 607, COTS geometry from commercial off-the-shelf (COTS) parts library 609. Material database 601, alloys and parameters database 605, adhesives database 607, and commercial off-the-shelf (COTS) parts library 609 will be described in more detail below. Additionally, some data can be transferred to manufacture 103. More specifically, this data can be transferred to AM powder and material management 214, which will be described in more detail below in the specification. This data may include, for example, one or more of the following: material selection of one or more alloys for an application from alloys and parameters database 605, material selection of one or more adhesives for an application from adhesives database 607.

Software Design Module 107

Software design module 107 can use a system approach to provide a powerful designer centric solution by considering structural performance requirements, AM manufacturing processes and assembly processes, and how each of these parts of the system can interact to optimize efficiency, cost, and performance. Software design module 107 can utilize generative design and private HPC cloud to generate validated solutions quickly. Furthermore, by using machine learning over the data in data vault 105, software design module 107 can self-improve its algorithms to generate better solutions and reduce the manufacturing costs as more data is collected and better coverage of multiple data dimensions is achieved.

The input for software design module 107 can include design input data (FEM, CAD), and design objectives. Software design module 107 can generate design output (CAD, design validation, metrics for design objectives).

Additive Module 109

Additive module 109 can generate a digital model and instructions, such as printing instructions, to allow modules of manufacture subsystem 103, such as AM component manufacturing module 113, to execute a series of processes that converts a feedstock (powder or wire typically) into a net or near-net shape output. Instructions can further cause, for example, the physical structures manufactured by 3D printers to go through a series of prescribed post-processing and verification steps to assure the targeted performance characteristics are achieved. These post-processing steps generally entail a combination of thermal methods (e.g., hot isostatic pressing (HIP) heat treatment), subtractive processes (such as machining, support removal or cutting), surface finishing (e.g., mass media, chemical), and coating processes (e.g. conversion coatings, electrocoatings, anodization) that, taken together, can reliably achieve a set of mechanical goals for a target design environment. Physical realization of the digital design varies within a defined set of allowable limits (dimensional, material properties) based on stack-up of contributors (e.g., material composition/degradation, AM system condition, etc.) which can be closely monitored by the system. These monitoring elements of the feedstock and AM systems can be prescribed ex ante, in situ, post hoc, or in any combination thereof as warranted by the application criticality and associated quality requirements.

The input for additive module 109 can include a digital model (three-dimensional structure) that meets a set of performance requirements resulting from a design optimization process. Additive module 109 can generate a set of outputs, including for example, printer instructions for printing a component, post processing instructions, etc., that can be used by manufacture subsystem 103 to manufacture the component. In various embodiments, data from additive module 109 can be sent to and stored in data vault 105 for later analysis to improve system performance.

Assembly Module 111

Assembly module 111 can generate instructions to automate the automation-specific manufacturing engineering on a given structure/assembly. It can dramatically reduce the time it takes to create assembly instructions (e.g., robotic assembly cell instructions) from weeks to minutes and solves/converges on solutions that outperform those that could be arrived at by simply considering standard robotic assembly criteria. The module itself can be embodied in software, the front end of a robotic assembly cell in which the user uploads the CAD and selects the layout (can be preset), and the automated output can be detailed CAD with all automation features and all robot and PLC/IPC code. Essentially after this module completes computation, it can output instructions for the robotic assembly cell, so that the cell can be equipped with all the necessary information to begin the physical assembly process, and the design module can receive all the automation/manufacturing data to include in the automated generation of detailed CAD (robot gripper feature locations (QC's), UV features, metrology features).

The input for assembly module 111 can include the robotic assembly layout (all hardware, and quantified performance of hardware) and assembly/structure CAD (with associated information). The output of assembly module 111 can include CAD detailed with manufacturing data and features, accuracy prediction of completed assembly, cycle time prediction, assembly sequence, all robot programs (OLPs) ready to upload to cell, points of interest, via points, program logic, and assembly log/Gantt for PLC/IPC (Industrial PC). Outputs can be sent to manufacture subsystem 103 and used, for example, by a robotic assembly cell/server/MES for the physical assembly. In various embodiments, data from assembly module 111 can sent to and stored in data vault 105 to include the generated assembly data/features in the detailed CAD for later analysis to improve system performance.

Manufacture Subsystem 103

Manufacture subsystem 103 can express the digital form of the fully engineered structure design generated by design subsystem 101 in a physical structure through integrated additive manufacturing and automated assembly with the precision of the additively manufactured and other components into the final physical structure output meeting all design and product requirements.

AM Component Manufacturing Module 113

AM component manufacturing module 113 can additively manufacture structures designed by design subsystem 101 to a design intent using primarily additive processes. Subtractive processes may be employed as required to achieve a tolerance or finishing requirement that cannot be achieved economically or technically directly from the AM process. AM component manufacturing module 113 can include, for example, one or more 3D printers, post-processing machines, automated machines for transporting, e.g., build plates, structures in various intermediate states of finishing, etc.

Examples of additive manufacturing techniques include freeform fabrication, fused deposition modeling, electron beam melting, laminated object manufacturing, binder jetting, selective laser sintering, laser powder bed fusion also referred to as direct metal laser sintering or melting or as selective laser melting, and stereolithography, cold spray deposition, directed energy deposition, among others.

The inputs for AM component manufacturing module 113 can be, for example, printer instructions for printing a structure, post-processing instructions for refining the structure, etc. The outputs of AM component manufacturing module 113 can include 3D printed parts that are the physical realization of the digital design to a final set of requirements either as a standalone product or for integration with other components into an assembly.

Assembly Manufacturing Module 115

Assembly manufacturing module 115 can perform the physical assembly of multiple components into assemblies. In various embodiments, this can include, for example, part staging, automated assembly, machining of assemblies and finished inventory. Assembly manufacturing module 115 can include, for example, robots (which may be arranged in a robotic assembly cell, for example), automated guided vehicles (AGVs), parts tables, one or more curing ovens, etc. The inputs for assembly manufacturing module 115 can include physical parts from inventory and instructions/code from assembly module 111. In various embodiments, assembly manufacturing module 115 can receive instructions from a MES/factory planning/inventory software to control various aspects of the assembly manufacturing module. In various embodiments, MES software may coordinate releasing physical parts from inventory, for example. The output of assembly manufacturing module 115 can be a completed, assembled structure, which can be, for example, bonded, baked, computer numerically controlled (CNC)-machined, etc.

Figure 2:
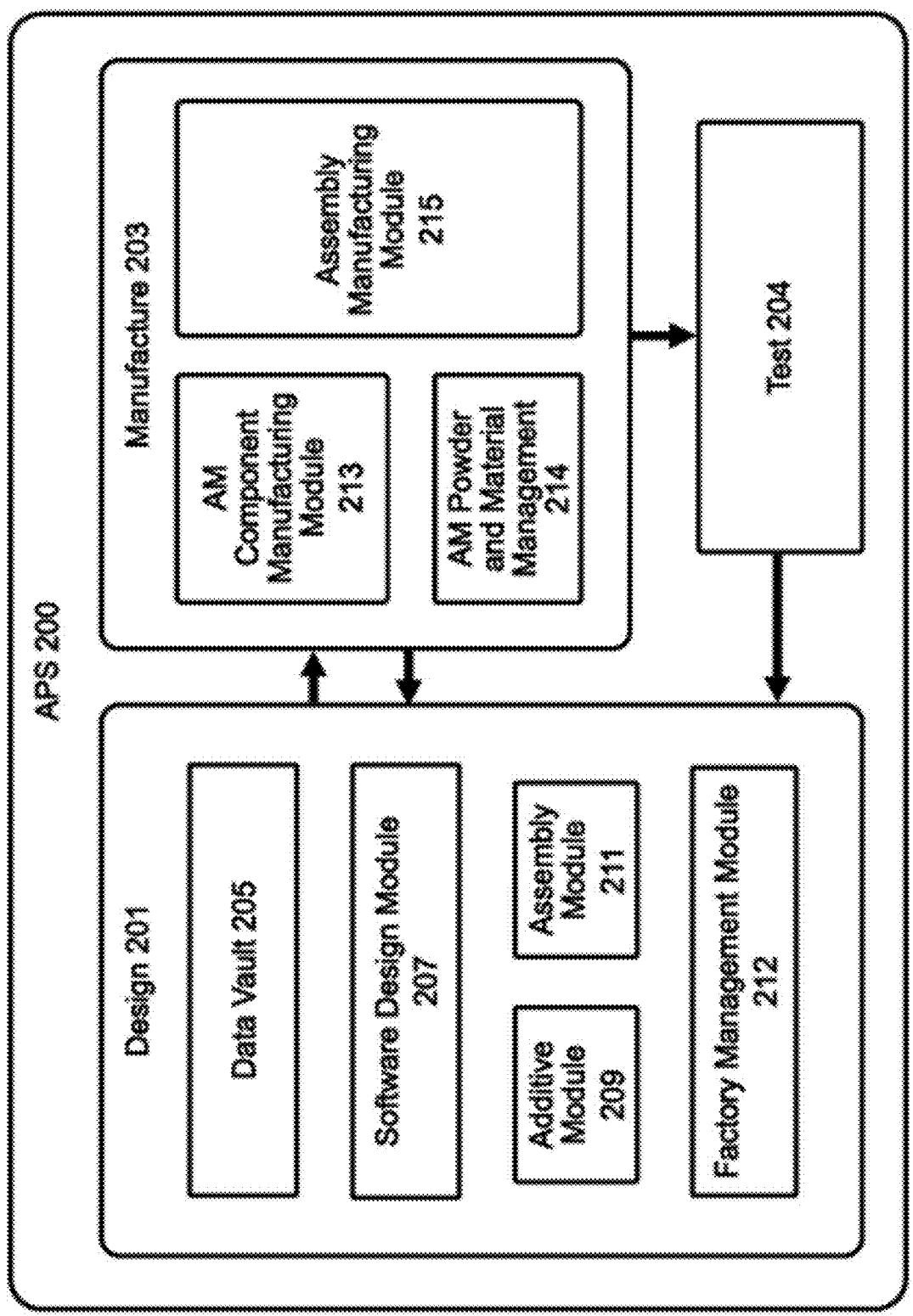
FIG. 2 illustrates an example APS in accordance with an aspect of the present disclosure.

FIG. 2 illustrates a configuration of an adaptive production system in accordance with an aspect of the present disclosure.

APS 200 may include, inter alia, three subsystems, e.g., a design subsystem 201, a manufacture subsystem 203, and a test subsystem 204. The subsystems can include, inter alia, eight modules as shown in FIG. 2.

Design subsystem 201 can allow users to input design requirements for any structure, and the subsystem can automatically generate a fully engineered structure design (including materials selection) in digital form that meets all input performance requirements and which can be designed for additive manufacture and automated assembly of manufacture subsystem 203. Design subsystem 201 can optimize structural designs specifically for the combination of AM and automated assembly used in manufacture subsystem 203. In this way, for example, structures can be designed and manufactured more efficiently and at reduced cost because the design can be based on the specific requirements, advantages, and limitations of the combination of AM and automated assembly.

In various embodiments, design subsystem 201 can be implemented as a software as a service (SaaS) model. For example, design subsystem 201 can be a service that can be accessed by manufacture subsystem 203 over the internet. In this example, design subsystem 201 and manufacture subsystem 203 may be in geographical different locations. In various embodiments, design subsystem 201 may be locally integrated with manufacture subsystem 203, e.g., in one or more computing systems and databases on a factory floor of the manufacture subsystem. In various embodiments, some of the functions of the design subsystem can be performed instead in the manufacture subsystem, e.g., to enable "factory level" decisions for some functions. For example, the design subsystem may generate fully-engineered CAD of a particular part and send the CAD to the manufacture subsystem, and the manufacture subsystem can generate the printer instructions for the part based on the CAD.

Design subsystem 201 can design for manufacture (DFM) based on the combination of AM and assembly used in APS 200. Design subsystem 201 can take into account many factors, such as manufacturing constraints of AM and automated assembly. For example, design subsystem 201 can design based on manufacturing constraints of AM, such as printer speed vs. quality, the printed characteristics of various materials, etc., and automated assembly constraints, such as robot reach, robot speed, robotic cell layout, etc. In various embodiments, for example, design subsystem 201 may determine that printing a particular part with a particular material at particular printer parameter will likely result in a particular shrinkage of the part due to thermal effects. In this case, design subsystem 201 may take various measures, such as increasing the size of the design to compensate for the shrinkage, adjusting the amount of adhesive used to bond the part to an assembly in the robotic cell, adjusting the printer parameters to reduce shrinkage at the cost of reducing print speed, etc., or a combination of these or other measures. In various embodiments, a part may include a quick connect (QC) feature (i.e., a feature that a robot can quickly connect to pick up and manipulate the part) designed into the part. Design subsystem 201 may take into account both AM and assembly factors in determining the location of the QC feature in the part. For example, while it might be advantageous for 3D printing to locate the QC feature in a particular location (because the QC feature could be printed without the use of support structures, for example), it might be that the location would make the QC feature inaccessible to the robot during a particular assembly sequence. In this case, design subsystem 201 may adjust the location of the QC feature and/or may adjust the assembly sequence used to assembly the part.

In another example of DFM, in the case that the 3D printer cannot print an entire large structure at one time because of a printing size constraint of the 3D printer, design subsystem 201 may split the large structure a various splitting locations so that the entire structure is divided into multiple parts that can be printed and assembled together to form the entire structure. In this case, fewer splits result in fewer parts that need to be assembled, which generally results in a shorter assembly time. However, design subsystem 201 may determine to increase the number of splits, thereby ultimately increasing assembly time, because the increased number of splits results in smaller parts that can be nested and printed more efficiently by the 3D printer.

In these ways, for example, design subsystem 201 may design for the particular manufacturing environment that uses an integrated combination of 3D printers and robotic assembly.

Manufacturing Subsystem 203

Manufacture subsystem 203 can express the digital form of the fully engineered structure design generated by design subsystem 201 in a physical structure through integrated additive manufacturing, and can automatically assemble with precision the additively manufactured and other components into the final physical structure output meeting all design and product requirements.

Data Vault 205

Data vault 205, which may be included as part of design subsystem 201, can provide scalable secure data storage and data query API for all data collected from various components of APS 200. Data mining and machine learning can be applied to data vault 205 to leverage the extensive data coverage in manufacturing process to improve the algorithms in design, AM and assembly. Data vault 205 can include data collected from any module in APS 200, including software design module 207, additive module 209, and assembly module 211 of design subsystem 201 and AM component manufacturing module 213, assembly manufacturing module 215, and AM powder and material management module 214 of manufacture subsystem 203, test subsystem 204, as well as data collected from sources external to APS 200, such as in-service data, which may include, for example customer use data (e.g., data from sensors incorporated with structures manufactured by APS 200 and used by customers).

Software design module 207 data can include, for example, design input data (FEM, CAD), design objectives, simulation data (topology optimization, free shape optimization, fatigue analysis, crashworthiness analysis, thermal analysis), design output (CAD, design validation, metrics for design objectives), proposed joints for each design options, and nominal assembly sequence and costs. Additive module 209 data can include, for example, data collected during AM manufacturing, such as build logs, build instructions, or other data defined in an AM data specification. In various embodiments, AM data may be available from one or more various software applications, such as Splunk. Additive module 109 data can include, for example, pre/post-coating images that may be analyzed by image processing. In various embodiments, cloud storage, such as MinIO can be used. Additive module 209 data can include, for example, data from a manufacturing execution system (MES), such as MES 2003 described in more detail below. Assembly module 211 data can include, for example, data from a programmable logic controller (PLC) of assembly manufacturing module 215. In this way, for example, all the data of robotic motion, timing, etc., can be gathered and stored for analysis. In various embodiments, PLC data may be available from one or more various software applications, such as Splunk. In various embodiments that include a test subsystem, data in data vault 205 can include testing data.

Data vault 205 can provide a uniform interface to design data, AM data assembly data, test data, in-service data, etc., and correlate the data to improve quality, performance, and costs. Data from material database 601, which may be a part of data vault 205, can be transferred to software design module 207. More specifically, this data is transferred to architecture design module 801, which may be a part of the software design module 207, which will be described in more detail below in the specification. This data may include one or more of the following: material selection of one or more alloys for an application from alloys and parameters database 605, material selection of one or more adhesives for an application from adhesives database 607, COTS geometry from commercial off-the-shelf (COTS) parts library 609. Material database 601, alloys and parameters database 605, adhesives database 607, and commercial off-the-shelf (COTS) parts library 609 will be described in more detail below. Additionally, some data can be transferred to manufacture 203. More specifically, this data can be transferred to AM powder and material management 214, which will be described in more detail below. This data may include one or more of the following: material selection of one or more alloys for an application from alloys and parameters database 605, material selection of one or more adhesives for an application from adhesives database 607.

Software Design Module 207

Software design module 207, which may be included as part of design subsystem 201, can use a system approach to provide a powerful designer centric solution by considering structural performance requirements, AM manufacturing processes and assembly processes, and how each of these parts of the system can interact to optimize efficiency, cost, and performance. Software design module 207 can utilize generative design and private HPC cloud to generate validated solutions quickly. Furthermore, by using machine learning over the data in data vault 205, software design module 207 can self-improve its algorithms to generate better solutions and reduce the manufacturing costs as more data is collected and better coverage of multiple data dimensions is achieved.

The input for software design module 207 can include design input data (FEM, CAD), and design objectives. Software design module 207 can generate design output (CAD, design validation, metrics for design objectives).

Additive Module 209

Additive module 209, which may be included as part of design subsystem 201, can generate a digital model and instructions, such as printing instructions, to allow modules of manufacture subsystem 203, such as AM component manufacturing module 213, to execute a series of processes that converts a feedstock (powder or wire typically) into a net or near-net shape output. Instructions can further cause, for example, the physical structures manufactured by 3D printers to go through a series of prescribed post-processing and verification steps to assure the targeted performance characteristics are achieved. These post-processing steps generally entail a combination of thermal methods (e.g., HIP, heat treatment), subtractive processes (such as machining, support removal or cutting), surface finishing (e.g., mass media, chemical), and coating processes (e.g. conversion coatings, electrocoating, anodization) that, taken together, can reliably achieve a set of mechanical goals for a target design environment. Physical realization of the digital design varies within a defined set of allowable limits (dimensional, material properties) based on stack-up of contributors (e.g., material composition/degradation, AM system condition, etc.) which can be closely monitored by the system. These monitoring elements of the feedstock and AM systems can be prescribed ex ante, in situ, post hoc, or in any combination thereof as warranted by the application criticality and associated quality requirements.

The input for additive module 209 can include a digital model (three-dimensional structure) that meets a set of performance requirements resulting from a design optimization process. Additive module 209 can generate a set of outputs, including for example, printer instructions for printing a component, post processing instructions, etc., that can be used by manufacture subsystem 203 to manufacture the component. In various embodiments, data from additive module 209 can be sent to and stored in data vault 205 for later analysis to improve system performance.

Assembly Module 211

Assembly module 211, which may be included as part of design subsystem 201, can generate instructions to automate the automation-specific manufacturing engineering on a given structure/assembly. It can dramatically reduce the time it takes to create assembly instruction (e.g., robotic assembly cell instruction) from weeks to minutes and solves/converges on solutions that outperform those that could be arrived at by simply considering standard robotic assembly criteria. The module itself can be embodied in software, the front end of a robotic assembly cell in which the user uploads the CAD and selects the layout (can be preset), and the automated output can be detailed CAD with all automation features and all robot and PLC/IPC code. Essentially after this module completes computation, it can output instructions for the robotic assembly cell, so that the cell can be equipped with all the necessary information to begin the physical assembly process, and the design module can receive all the automation/manufacturing data to include in the automated generation of detailed CAD (robot gripper feature locations (QC's), UV features, metrology features).

The input for assembly module 211 can include the robotic assembly layout (all hardware, and quantified performance of hardware) and assembly/structure CAD (with associated information). The output of assembly module 211 can include CAD detailed with manufacturing data and features, accuracy prediction of completed assembly, cycle time prediction, assembly sequence, all robot programs (OLPs) ready to upload to cell, points of interest, via points, program logic, and assembly log/Gantt for PLC/IPC (Industrial PC). Outputs can be sent to manufacture subsystem 203 and used, for example, by a robotic assembly cell/server/MES for the physical assembly. In various embodiments, data from assembly module 211 can sent to and stored in data vault 205 to include the generated assembly data/features in the detailed CAD for later analysis to improve system performance.

Factory Management Module 212

Factory management module 212, which may be included as part of design subsystem 201, can continually optimize for variation in product mix including cost, energy, time, specific process capacity, etc. Factory management module 212 can include, for example, various software for efficient integration of data between design subsystem 201 and manufacture subsystem 203. For example, factory management module 212 can include enterprise resource planning (ERP) software, manufacturing execution systems (MES) software, quality management system (QMS) software, and/or product lifecycle management (PLM) software. An example factory management module is described in more detail below in reference to FIG. 20.

AM Component Manufacturing Module 213

AM component manufacturing module 213, which may be included as part of manufacturing subsystem 203, can additively manufacture structures designed by design subsystem 201 to a design intent using primarily additive processes. Subtractive processes may be employed as required to achieve a tolerance or finishing requirement that cannot be achieved economically or technically directly from the AM process. AM component manufacturing module 213 can include, for example, one or more 3D printers, post-processing machines, automated machines for transporting, e.g., build plates, structures in various intermediate states of finishing, etc.

Examples of additive manufacturing techniques include freeform fabrication, fused deposition modeling, electron beam melting, laminated object manufacturing, binder jetting, selective laser sintering, laser powder bed fusion also referred to as direct metal laser sintering or melting or as selective laser melting, and stereolithography, cold spray deposition, directed energy deposition, among others.

The inputs for AM component manufacturing module 213 can be, for example, printer instructions for printing a structure, post-processing instructions for refining the structure, etc. The outputs of AM component manufacturing module 213 can include 3D printed parts that are the physical realization of the digital design to a final set of requirements either as a standalone product or for integration with other components into an assembly.

Assembly Manufacturing Module 215

Assembly manufacturing module 215, which may be included as part of manufacturing subsystem 203, can perform the physical assembly of multiple components into assemblies. In various embodiments, this can include, for example, part staging, automated assembly, machining of assemblies and finished inventory. Assembly manufacturing module 215 can include, for example, robots (which may be arranged in a robotic assembly cell, for example), automated guided vehicles (AGVs), parts tables, one or more curing ovens, etc. The inputs for assembly manufacturing module 215 can include physical parts from inventory and instructions/code from assembly module 211. In various embodiments, assembly manufacturing module 215 can receive instructions from MES/factory planning/inventory software 2003 to control various aspects of the assembly manufacturing module. In various embodiments, MES software 2003 may coordinate releasing physical parts from inventory, for example. The output of assembly manufacturing module 115 can be a completed, assembled structure, which can be, for example, bonded, baked and CNC machined, etc.

AM Powder and Material Management 214

AM powder and material management 214, which may be included as part of manufacturing subsystem 203, can include material management within the factory that can include both process feedstocks and waste/recycling portion of the lifecycle.

The inputs for AM powder and material management 214 can include virgin powder as supplied by vendors, adhesives in bulk containers (system may modify on site), COTS as supplied by vendors, used powders cycling through the AM components of the factory, waste management requirements of the printer, surface finishing, machining, coating, and bonding systems. The outputs for AM powder and material management 214 can include overall supply at the required quality and state (raw, semi-finishing, finished) within the factory to the individual sections/modules requiring these materials. An example AM powder and material management module is described in more detail below.

Test Subsystem 204

Test subsystem 204 can generate data of mechanical and physical properties of materials, components and assemblies that are used, designed, and engineered by the design subsystem 201 and manufactured by manufacture subsystem 203 through detailed testing and validation processes. An example test subsystem is described in more detail below in reference to FIG. 5.

Figure 3:
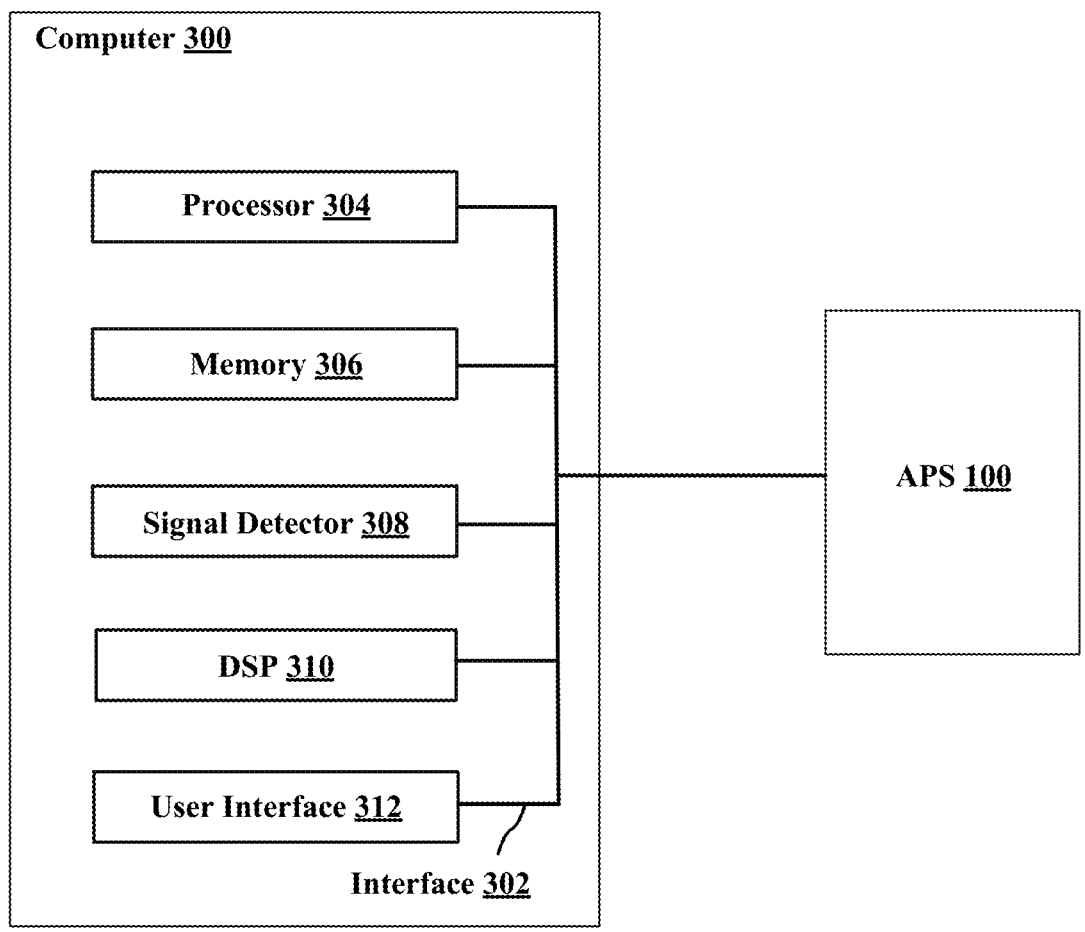
FIG. 3 illustrates a functional block diagram of a processing system in accordance with an aspect of the present disclosure.

FIG. 3 illustrates a functional block diagram of a processing system in accordance with an aspect of the present disclosure.

In an aspect of the present disclosure, control devices and/or elements, including computer software, may be coupled to APS 100 or APS 200 to control one or more components within APS 100 or APS 200. Such a device may be a computer 300, which may include one or more components that may assist in the control of APS 100 or APS 200. For ease in understanding, FIG. 3 will be illustrated as showing computer 300 being coupled to APS 100, although computer 300 may be part of APS 100 and/or APS 200, may be controlling APS 200, or may be part of or controlling any APS in accordance with an aspect of the present disclosure.

Computer 300 may communicate with APS 100, and/or portions of APS 100, via one or more interfaces 302. The computer 300 and/or interface 302 are examples of devices that may be configured to implement the various methods described herein.

In an aspect of the present disclosure, computer 300 may comprise at least one processor 304, memory 306, signal detector 308, a digital signal processor (DSP) 310, and one or more user interfaces 312. Computer 300 may include additional components without departing from the scope of the present disclosure.

Processor 304 may also be referred to as a central processing unit (CPU). Memory 306, which may include both read-only memory (ROM) and random access memory (RAM), may provide instructions and/or data to the processor 304. A portion of the memory 306 may also include non-volatile random access memory (NVRAM). The processor 304 typically performs logical and arithmetic operations based on program instructions stored within the memory 306. The instructions in the memory 306 may be executable (by the processor 304, for example) to implement the methods described herein. Memory 306, or a portion of memory 306, may be embodied as data vault 105 or data vault 205 in aspects of the present disclosure.

The processor 304 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor 304 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

Signal detector 308 may be used to detect and quantify any level of signals received by the computer 300 for use by the processor 304 and/or other components of the computer 300. The signal detector 308 may detect such signals as energy beam source power, deflector position, build floor height, amount of powder remaining in depositor, leveler position, robotic arm position, material selection, and other signals. DSP 310 may be used in processing signals received by the computer 300. The DSP 310 may be configured to generate instructions and/or packets of instructions for transmission to APS 100.

The user interface 312 may comprise a keypad, a pointing device, and/or a display. The user interface 312 may include any element or component that conveys information to a user of the computer 300 and/or receives input from the user.

The various components of the computer 300 may be coupled together by interface 302, which may include, e.g., a bus system. The interface 302 may include a data bus, for example, as well as a power bus, a control signal bus, and a status signal bus in addition to the data bus. Components of the computer 300 may be coupled together or accept or provide inputs to each other using some other mechanism.

Although a number of separate components are illustrated in FIG. 3, one or more of the components may be combined or commonly implemented. For example, the processor 304 may be used to implement not only the functionality described above with respect to the processor 304, but also to implement the functionality described above with respect to the signal detector 308, the DSP 310, and/or the user interface 312. Further, each of the components illustrated in FIG. 3 may be implemented using a plurality of separate elements.

Figure 4:
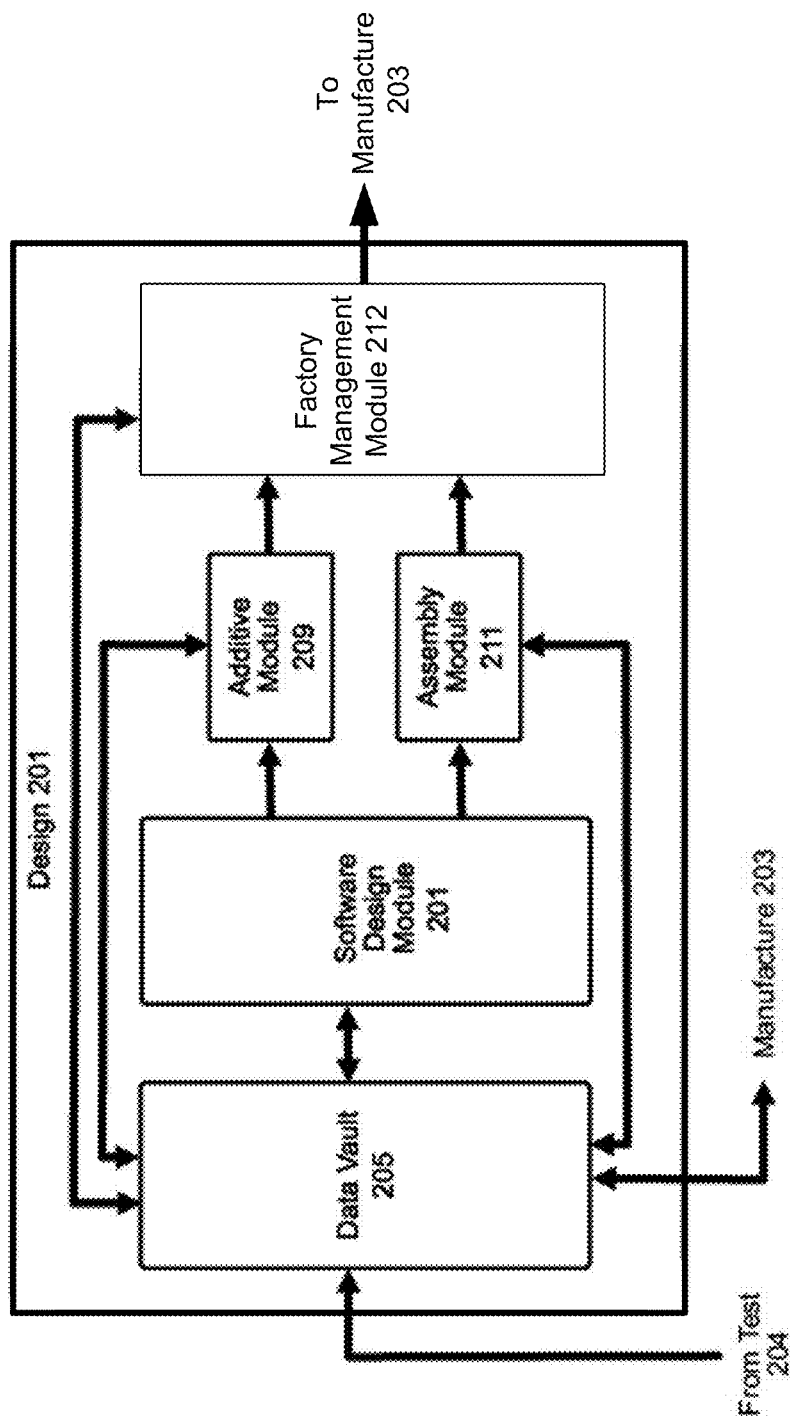
FIG. 4 illustrates an embodiment of a design subsystem in accordance with an aspect of the present disclosure.

FIG. 4 illustrates an embodiment of a design subsystem in accordance with an aspect of the present disclosure.

FIG. 4 illustrates an example of data flow between modules and subsystems within design subsystem 201 of APS 200. As illustrated in FIG. 4, data vault 205 (which may be a portion of memory 306) can receive data from many sources in APS 200. Collecting data from many aspects of the adaptive production system may improve the design capabilities of design subsystem 201, the manufacturing efficiency of manufacture subsystem 203, or the overall efficiency of APS 200.

FIG. 4 also shows other modules included in design subsystem 201, e.g., data vault 205, software design module 207, additive module 209, assembly module 211, and factory management module 212.

In an aspect of the present disclosure, data vault 205 can collect data from manufacture subsystem 203 and test subsystem 204, and can collect data from other modules within design subsystem 201, e.g., software design module 207, additive module 209, and assembly module 211.

For example, and as illustrated in FIG. 4, data vault 205 may receive data from test subsystem 204, e.g., measured tensile strength, elongation, temperature performance, or other material properties of various 3D printed or COTS materials. Further, data vault 205 may receive data from manufacture subsystem 203, such as data on operation of 3D printers and robotic assembly cells. Data vault 205 may also receive data from additive module 209, assembly module 211, and software design module 201, such that each of the modules in design subsystem 201, and other subsystems in APS 200, may use information generated by other portions of APS 200 to improve the overall design of the final product.

The data collected and stored in data vault 205 may also be analyzed by, for example, machine learning algorithms to determine correlations and relationships that may be used by APS 200 to improve design and manufacture.

Figure 5:
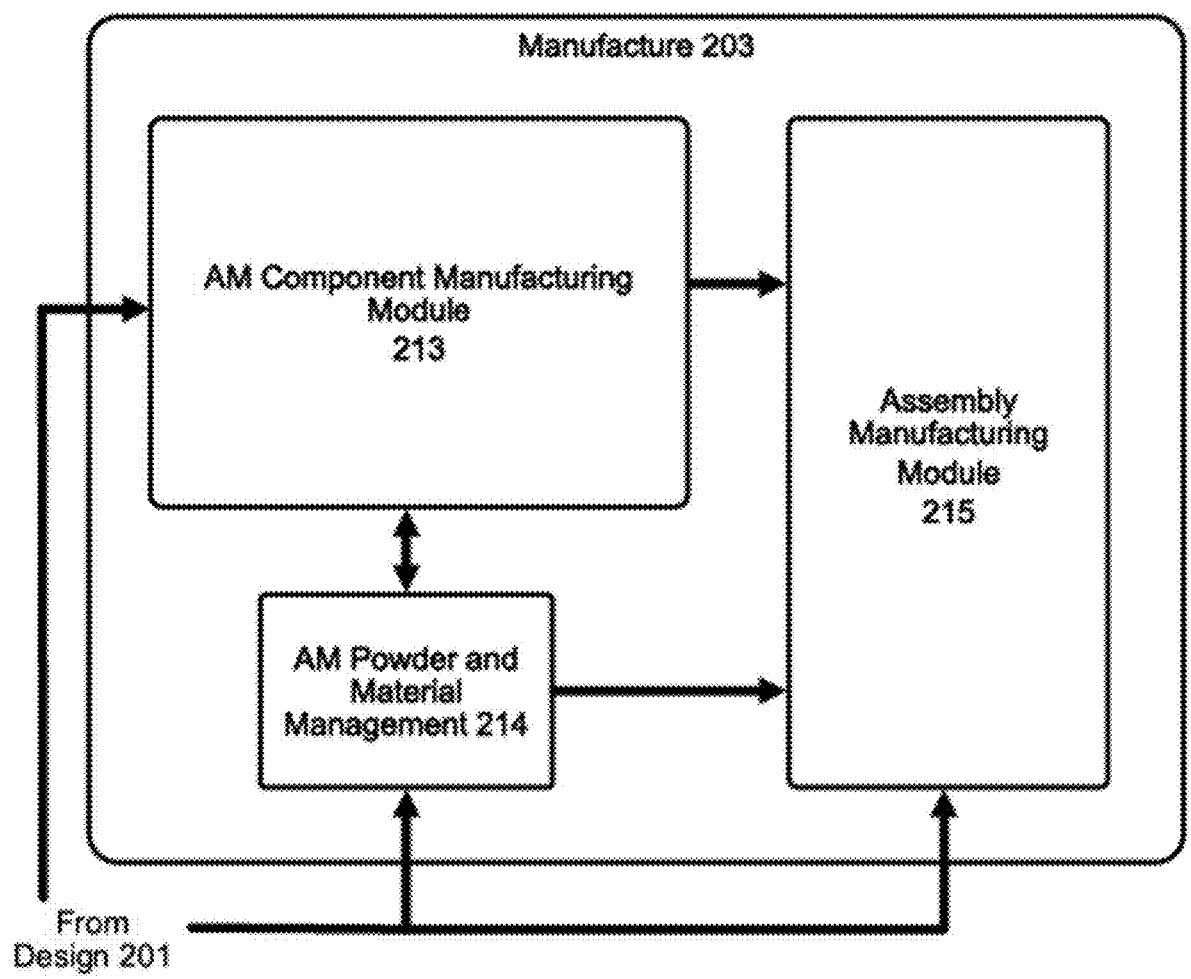
FIG. 5 illustrates an embodiment of a manufacture subsystem in accordance with an aspect of the present disclosure.

FIG. 5 illustrates an embodiment of a manufacturing subsystem in accordance with an aspect of the present disclosure.

FIG. 5, similar to FIG. 4, illustrates the flow of data and materials/parts between various modules and subsystems within APS 200, and an example of some modules that may be included in manufacture subsystem 203.

For example, and not by way of limitation, AM component manufacturing module 213 can receive printer instructions, post-processing instructions, etc. from design subsystem 201, and can receive raw materials, such as powder for printing, from AM powder and material management 214. AM powder and material management 214 can receive waste/recyclable materials, such as used powder, removed support structures, etc., from AM component manufacturing module 213. AM powder and material management 214 can receive data, such as printer instructions, from design subsystem 201. Assembly manufacturing module 215 can receive printed parts from AM component manufacturing module 213, can receive COTS parts and uncured adhesives from AM powder and material management 214, and can receive data, such as data about PLC code for assembly, from design subsystem 201.

Figure 6:
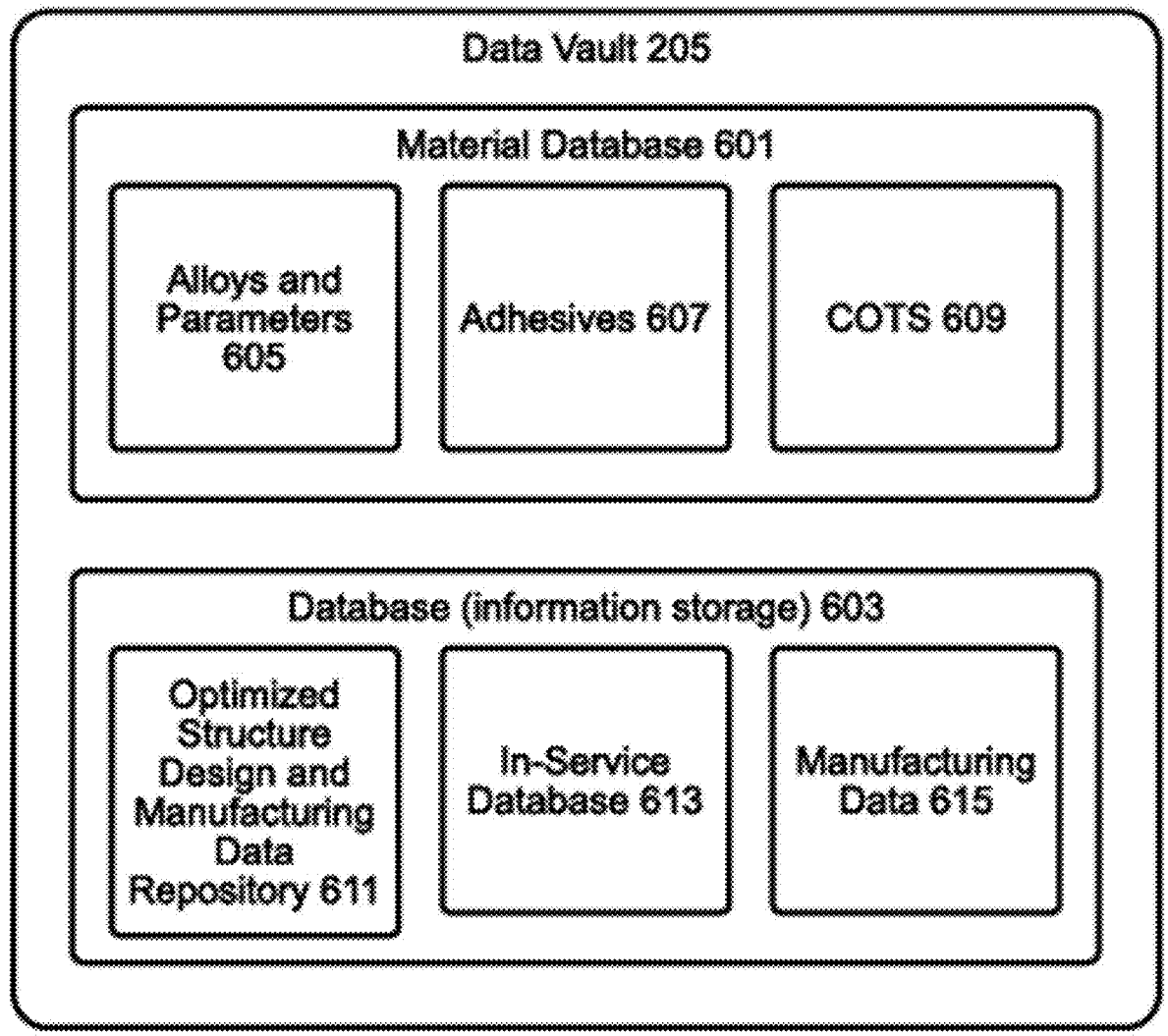
FIG. 6 illustrates an embodiment of a data vault in accordance with an aspect of the present disclosure.

FIG. 6 illustrates an embodiment of a data vault a manufacturing subsystem in accordance with an aspect of the present disclosure.

As described above, data vault 205, which may be included as part of memory 306, can serve as a central repository for data collected from various components of APS 200. Data stored in data vault 205 may be retrieved, analyzed, or stored by various subsystems within APS 200, such that a common data set is used to manufacture individual components and assemble a final product.

By storing the data for various components, assemblies, and overall assembly in a single location, the efficiency and overall design of a given product may be improved.

Data vault 205 may include, inter alia, a material database 601 and an information database 603 for use as information storage. Material database 601 may include an alloys and parameters database 605, an adhesives database 607, a COTS database 609, and other materials-specific parameters. Information database 603 may include a structure design and manufacturing data repository 611, an in-service database 613, and a manufacturing database 615.

Material Database 601

Material database 601, which may be included as part of data vault 205, may provide a menu of available elements that may be drawn upon by, for example, an architecture design/optimization module of APS 200 described below to satisfy a set of performance requirements of a design.

A set of performance requirements can encompass mechanical performance of a design, including static requirements, dynamic requirements, fatigue requirements, impact requirements, environmental (e.g. corrosion) requirements, aesthetic and finish constraints, etc. Each material within the material database 601 can be fully captured for each of these performance dimensions and the limits of real performance may be based on measured or empirical data.

The inputs for material database 601 can include a design volume and set of performance requirements requiring material selection. The outputs for material database 601 can include a design volume partitioned into the best candidate materials for the overall design of the final product.

Database (Information Storage) 603

In an aspect of the present disclosure, data vault 205 can include information database 603 as storage for data management, data analysis and machine learning of the data in material database 601. The inputs for information database 603 may include identified AM material data, and other input data for one or more of the submodules described herein. The outputs from information database 603 can include scalable indexed AM Material data for data analysis, data mining, and machine learning, and other submodule output data described below.

Alloys and Parameters Database 605

For systems that design and manufacture metal structures, material database 601 can include alloys and parameters database 605. Some systems may focus on light metals, primarily aluminum based. These have different, but fully defined sets of functional requirements with respect to operating temperature, corrosion environment, stiffness, strength, durability, etc. The additive manufacture of each alloy will carry unique processing parameters and machine settings to achieve a targeted set of properties (mechanical properties, cost productivity/economics for various layer thicknesses, etc.). Each alloy and parameter combination will further carry different, fully defined guidance for post-processing such as mass media or chemical finishing.

The inputs for alloys and parameters database 605 can include performance/functional requirements such as operating environment (temperature, corrosion), compatibility with subsequent coating processes, stiffness, strength, cost, etc. The outputs for alloys and parameters database 605 can include material selection of one or more alloys for an application.

In an aspect of the present disclosure, alloys and parameters database 605 may include an underlying structure of the base material, which may be, for example, a crystalline-type or periodic structure, such as a cubic structure, i.e., where an atom of the base material is located at each corner of a cube, a face-centered cubic structure, i.e., where an atom of the base material is located at the corners and in at least one face of a cube, etc. For example, as a base material, aluminum (Al) metal arranges in a face-centered cubic (fcc) structure, titanium arranges in a body-centered cubic (bcc) structure or a hexagonal close packed (hcp) structure, etc.

In an aspect of the present disclosure, substitutional solutes or interstitial solutes may be used with base materials to create an alloy with desired parameters. For example, and not by way of limitation, base material may be iron (Fe), and a substitutional solute may be one or more of nickel (Ni), chromium (Cr), tin (Sn), or other materials. Substitutional alloys may be formed when the solute is of approximately the same atomic size as the base material.

An interstitial solute may also be used to change the properties of the base material. For example, and not by way of limitation, the base material may be aluminum (Al), and the interstitial solute may be one or more of magnesium (Mg), zirconium (Zr), and/or manganese (Mn). Interstitial alloys may be formed when the solute is of a smaller atomic size than the base material. Combination alloys, which have both substitutional solutes and interstitial solutes, may also be formed and the properties stored in alloys and parameters database 605.

Other inclusions in alloys and parameters database 605 may include properties and costs of standardized, "named" alloys. For example, and not by way of limitation, the International Alloy Designation System (IADS) is a widely-accepted naming scheme for aluminum alloys, where each alloy is referred to using a four-digit number. The first digit of the number indicates the major solute elements included in the alloy. The second digit indicates any variants for that solute alloy, and the third and fourth digits identify a specific alloy in that series.

For aluminum alloys named (i.e., numbered) in the IADS, 1000 series alloys are essentially pure aluminum content by weight percentage (wt %), and the other digits represent various applications for such alloys. 2000 series aluminum alloys are alloyed with Cu, 3000 series aluminum alloys are alloyed with Mn, 4000 series aluminum alloys are alloyed with silicon (Si), 5000 series aluminum alloys are alloyed with Mg, 6000 series aluminum alloys are alloyed with Mg and Si, 7000 series aluminum alloys are alloyed with Zn, and 8000 series aluminum alloys are alloyed with other elements or a combination of elements that are not covered by other series designations. As an example, and not by way of limitation, a common aluminum alloy is referred to as "6061" which, per the IADS naming scheme, has Mg and Si as the major alloying solutes. However, 6061 has other alloying solutes, in various percentages, e.g., iron (Fe), copper (Cu), chromium (Cr), zinc (Zn), titanium (Ti), and manganese (Mn), and is allowed to have other solutes, which may be referred to as "impurities," of less than a certain percentage. The solutes present in 6061 may have a range of wt % depending on the application, manufacturer, alloying tolerances, and/or other reasons.

The properties of these alloys, as well as mixtures of these named alloys, may change depending on whether the alloy is manufactured through smelting, forging, and/or casting as opposed to 3-D printing. As such, different types of manufacturing techniques may be entered into alloys and parameters database 605 such that the design can select one or more appropriate materials based on properties, time to fabricate, cost, and/or other factors.

Adhesives Database 607

For an APS 200 that uses adhesives for bonding components to form assemblies, material database 601 may also include adhesives database 607. In an aspect of the present disclosure, APS 200 may use two types of adhesives: structural adhesives and retention adhesives.

Retention adhesives are typically a quick-cure adhesive used to retain (i.e., fix) two (or more) parts relative to each other so that a robot can "let go" of one the parts, and the assembly process can continue while the structural adhesive between the parts can cure over a longer time. Structural adhesives are adhesives that provide the desired strength at the joint between two parts. These adhesives may have different defined sets of functional requirements with respect to operating temperature, stiffness, strength, etc., such that APS 200 may use a desired adhesive at a desired point in the assembly process, and schedule curing/drying times/techniques accordingly, provide proper application techniques, etc.

The inputs to adhesives database 607 may include performance/functional requirements such as operating environment (temperature, corrosion), substrate compatibility, stiffness, strength, cost, etc. The outputs from adhesives database 607 may include material selection of one or more adhesives to be used at a given point in the assembly process.

Commercial Off-the-Shelf Parts Library 609

Commercial off-the-shelf (COTS) parts library 609, which may be included as part of materials database 601, may include technical specifications, performance data, dimensional data, and other data, etc., of COTS parts for use in APS 200. COTS may be elements of a multi material structure that may be less expensive to produce than a 3-D printed part, or may be simple geometrical shapes, such as tubes, beams or flat panels, etc., that do not incorporate complex geometries, interfaces, joining features or other complex functional features or shapes.

COTS parts library 609 may also be sourced as standardized materials from third party suppliers. Flat panels and tubes can be of any cross-section. Tubes can be fabricated from any material, and such materials properties may be included as data within COTS parts library 609 for use in APS 200. COTS parts library 609 may also serve as a repository for COTS parts structural performance and cost.

The input data to COTS parts library 609 can include COTS material and cost data. The output data for commercial off-the-shelf (COTS) parts library 609 can include COTS geometry, specifications, etc.

Structure Design and Manufacturing Data Repository 611

Structure design and manufacturing data repository 611, which may be an optimized design repository, may include data on one or more designs generated by APS 200 and may be part of information database 603. As designs are completed, the engineering, production and cost data generated may be compared against human designs, machine generated designs, or hybrid designs that are partially human generated and partially machine generated. Data vault 205 may use the design information stored in structure design and manufacturing data repository 611 as a revision history for given parts, as well as for input and validation of new design and manufacturing data generated by APS 200.

The input data to structure design and manufacturing data repository 611 can include final design data from various programs. The output data for structure design and manufacturing data repository 611 can include data to support machine learning.

In-Service Database 613

In an aspect of the present disclosure, APS 200 can be used to design and build vehicles, such as automobiles. As a fleet of vehicles produced by APS 200 increases, the amount of in-service data from vehicles using APS 200 technology increases proportionately.

In-service data for operating vehicles may be used for data mining to find operational performance data, failure data, and other operational service parameters. In-service database 613, which may be included as part of information database 603, can include in-service data obtained from sensors built into, e.g., vehicular structures manufactured by APS 200. Some vehicles may experience various operational scenarios, from occasional use to designs that may be pushed to or beyond their designed operational limits. For example, a truck chassis may be used by a driver that operates a vehicle on a highway, and the same chassis may be used in off-road travel in rocky terrain, mud, etc. Sensors, such as accelerometers, strain gauges, etc., are examples of engineering/performance data generating devices that could be integrated with and captured from the structure. Such data can be combined with other data, such as global positioning system (GPS) data, to populate a database of terrains by geolocation.

Such a database could allow APS 200 to manufacture a common part in different ways based on regional requirements. As part of the in-service database 613, such information would be similar to other correlation testing performed for design improvement. The input data to in-service database 613 may include data from sensors on vehicle structures. The output data from in-service database 613 can include empirical data regarding actual performance of structures in-service.

Manufacturing Data 615

Manufacturing data 615 may store data generated during the manufacturing process. Most manufacturing equipment includes integrated sensors that can provide real time data to manufacturing data 615, which may be included as part of information database 603. As multiple production runs are completed, manufacturing data 615 stores historic information for recording and system performance improvement purposes. When APS 200 has a database of ample size, correlations can be drawn, neural networks can be created, or other data prediction/analysis algorithms to predict/suggest parameters that could be altered to improve performance of APS 200 in one or more subsystems or modules.

The inputs to manufacturing data 615 can include AM data and assembly data. Data input may be recorded from sensors in the factory as a historical record and for system improvement. Input to AM data can include AM print build data. Input to assembly data can include programmable logic controller (PLC) and robotic assembly cell (non-design specific, flexible robot farm system) server time log of all activity associated with the robotic assembly cell, including cycle time, metrology data, any faults, adhesive dispense data (volume, temperature, etc.), cure time, predicted cycle time, any variances, robot motion paths, maintenance indicators, etc.

In an aspect of the present disclosure, APS 200 may begin with a design that is produced and digital data relating to the materials, dimensions, construction techniques, etc. may be entered into data vault 205. Data vault 205 may interact with software design module 207 to determine which parts are to be 3D printed, and which parts can be purchased as COTS parts, and provide code to additive module 209, assembly module 211, factory management module 212, and manufacturing module 203. A prototype model using materials from materials database 601 may be constructed and tested in test module 204 to determine that the design meets the desired parameters, e.g., safety, performance, etc.

APS 200 may then use data from data vault 205, such as data from information database 603, to generate an initial build plan for the design. The build plan may then be iterated by part, by process, or a combination of parts and processes, to improve the design in one or more parameters, e.g., weight, cost, performance, build time, etc. The descriptions of the various details of each of the modules within APS 200 allow for analysis and control of the various portions of APS 200, e.g., design parameters, manufacturing parameters, cost parameters, etc., to improve the manufacturing efficiency of a given design.

If changes are made to the design, APS 200 can provide various solutions on how to implement such changes, while reducing the costs in time and effort of implementation. Decisions on "make or buy?" or precision needed for a given part can, in an aspect of the present disclosure, be displayed as to how those decisions affect the overall manufacturing process. Further, interruptions in parts availability, changes in material, etc., can be flagged and adapted to by having APS 200 generate workarounds for such delays.

Figure 7:
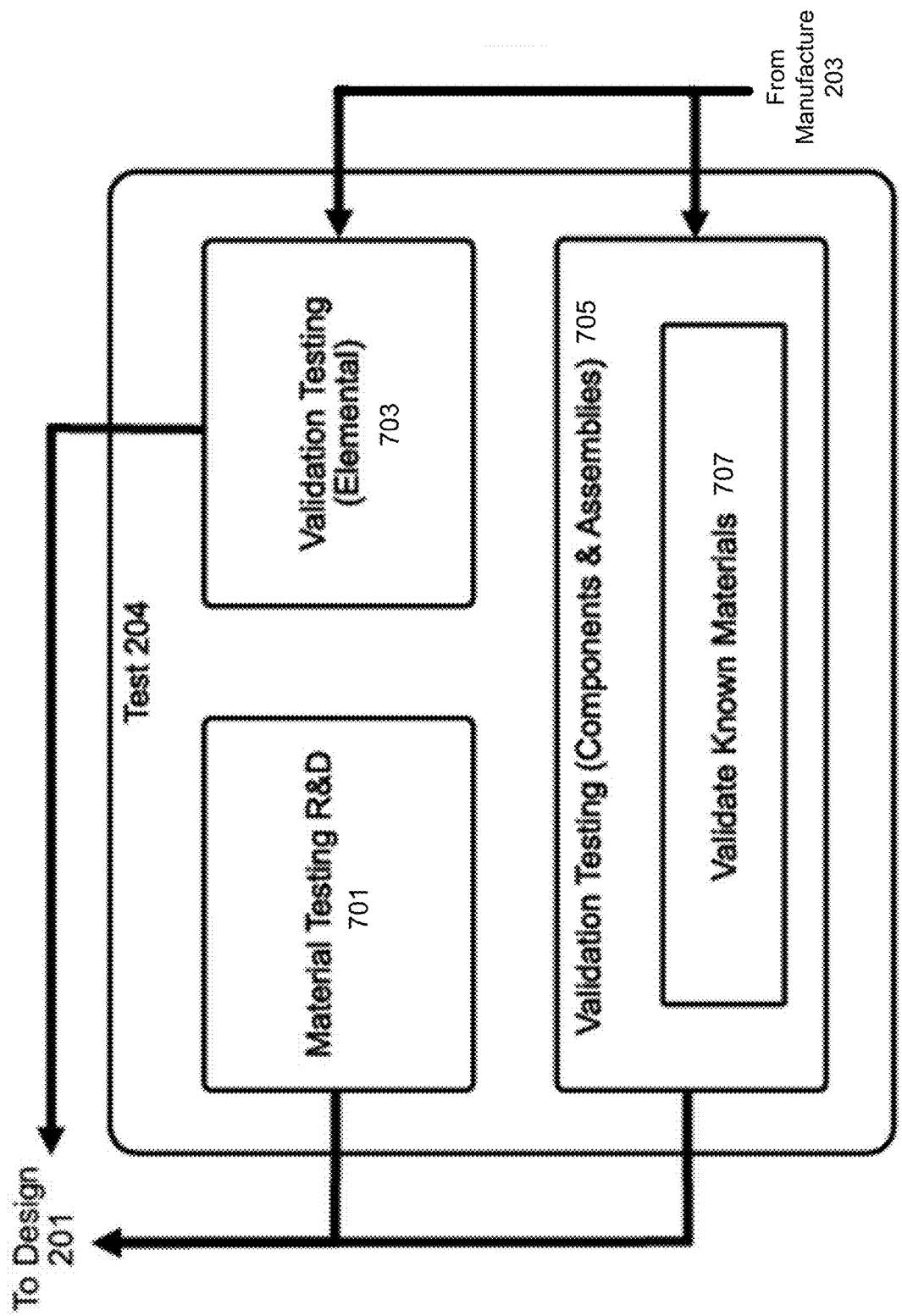
FIG. 7 illustrates further details of test subsystem in accordance with an aspect of the present disclosure.

FIG. 7 illustrates further details of test subsystem 204 in accordance with an aspect of the present disclosure.

Test subsystem 204 can perform testing at various levels of material granularity, from raw materials to fully assembled structures. Testing can include, for example, determining basic material properties, properties of printed structures, properties of COTS structures, and properties of assembled structures with printed and/or COTS parts. In various embodiments, printed structures for testing and assembled structures for testing can be received from manufacture subsystem 203. Test subsystem can include a material testing R&D module 701, a validation testing (elemental) module 703, and a validation testing (components and assemblies) 705, which can include a validate known materials module 707.

Material Testing R&D (New Alloy Development) 701

Material testing R&D 701 can include material testing conducted, for example, when developing new alloys. This testing can begin at the very early stages of powder procurement and continues through the fine tuning of the various processing parameters involved with APS 200. The resulting properties can be compiled into a comprehensive datasheet that is used during the optimization and detailed engineering modules of APS 200.

AM processability of a material is a general first step, to assess whether the material can tolerate the very rapid cooling process ($10^5$ to $10^6$ deg./sec type rates) associated with some kinds of 3D printing—various types of cracking are common with conventional alloys designed for slow cooling processes such as casting. An experimental survey of the processability design space generally entails a sweep for a wide variety of parameters such as power, hatch spacing, velocity, layer thickness, various offset factors, etc. This can provide an indication of economic viability in terms of a "pure" laser processing/build rate, typically expressed as a volumetric rate in ml/h.

The inputs for material testing R&D (e.g., new alloy development) can include powder, such as powder samples for given specification, printed density cubes, printed tensile bars at various print orientations, and printed fatigue bars. The outputs for material testing R&D (e.g., new alloy development) can include powder data, such as humidity, oxygen content, particle size distribution, sphericity/circularity, chemistry, and flow time. Other outputs can include data such as given density/porosity, grain size, and micrographs, which can be obtained from printed density cubes. Other outputs can include data such as stress vs strain curves and hardness, which can be obtained from printed tensile bars. Other output can include data such as S/N curves, which can be obtained from printed fatigue bars. Other outputs can include engineering datasheets.

Validation Testing (Elemental—Adhesive/Coating) 703

Validation testing (elemental—adhesive/coating) 703 can include many different kinds of testing. For example, adhesive specific properties can be gathered through rheometer, GIC and GIIC testing for a given adhesive, testing to characterize the shear properties for a given adhesive, substrate and coating specification. This testing is conducted at room temperature, as well as in the minimum ambient temperature condition, and maximum ambient temperature condition. This testing is also conducted after exposure to industry standard accelerated aging and corrosion tests. The fatigue properties of the joint can be characterized for a given adhesive, substrate and coating configuration. This testing is conducted by using a fully reversed axial-axial load profile. The resulting properties can be compiled into a comprehensive datasheet that is used during the optimization and detailed engineering modules of APS 200.

The inputs for validation testing (elemental—adhesive/coating) 703 can include, for example, bonded double lap shear test coupons, bonded tongue and groove test coupons, GIC and GIIC test coupons, and adhesive. The outputs for validation testing (elemental—adhesive/coating) 703 can include, for example, force/displacement curves from −40 C to 150 C, accelerated corrosion force/displacement curves, fatigue curves from −40 to 150 C, and rheometer data, such as complex modulus vs temperature and viscosity vs temperature.

Validation Testing (Components & Assemblies) 705

Validation testing (components & assemblies) 705 can include conducting component level tests, including for example, suspension control arms, knuckles, brakes, hinges, steering wheels, steering columns, crash rails, etc. This component level testing can be used to correlate models and further validate the component for production use.

The inputs of validation testing (components & assemblies) 705 can include components to be tested. Input can also include information of static loads & vectors of the components, such as expected strain (at given x,y,z coordinates), expected deflection (at given x,y,z coordinates), and expected failure load and failure location. Inputs can also include information of dynamic loads, vectors and repetition factors of the components, such as expected number of cycles to failure. Inputs can also include information of impact loads of the components, such as expected failure mode and impact energy and expected acceleration v time curve. Input can also include information of corrosion exposure requirements of the components.

The outputs for validation testing (components & assemblies) 705 can include measured data of static loads & vectors, such as measured strain (at given x,y,z coordinates), measured deflection (at given x,y,z coordinates), and measured failure load and failure location. Output can include measured data of dynamic loads, vectors and repetition factors, such as measured number of cycles to failure. Output can also include measured data of impact loads, such as measured failure mode and impact energy and measured acceleration versus time curve. Output can also include measured data of corrosion exposure, such as assessment of corrosion effects on part, whether it effected the stiffness of the part.

Validate Known Materials (Tensile Samples, Etc.) 707

Validate known materials (tensile samples, etc.) 707 can include, for example, developing the engineering properties through internal testing for all materials used in APS 200. This includes the commercially off-the-shelf materials including carbon fiber panels and tubes, as well as extruded metals.

The inputs for validate known materials (tensile samples, etc.) 707 can include tensile samples, compression samples, in-plane shear samples, CTE test coupons, and density test coupons for composites, such as laminates. Other inputs can include tensile test coupons for extrusions or other COTS metals.

The outputs for validate known materials (tensile samples, etc.) 707 can include, for laminates, modulus of elasticity (longitudinal and lateral), Poisson's ratio, stress vs strain curves, which can be obtained from tensile samples, density, modulus of elasticity, dampening coefficient, fiber volume fraction, fiber weight fraction, which can be obtained from compression samples, transverse stress vs shear, in-plane stress vs shear, which can be obtained from shear samples, and other data obtained from interlamina shear samples, and for extrusions (or other COTS metals), can include grain size and direction, and engineering and true stress vs strain curves (for each orientation compared to grain size), which can be obtained from tensile test coupons.

Figure 8:
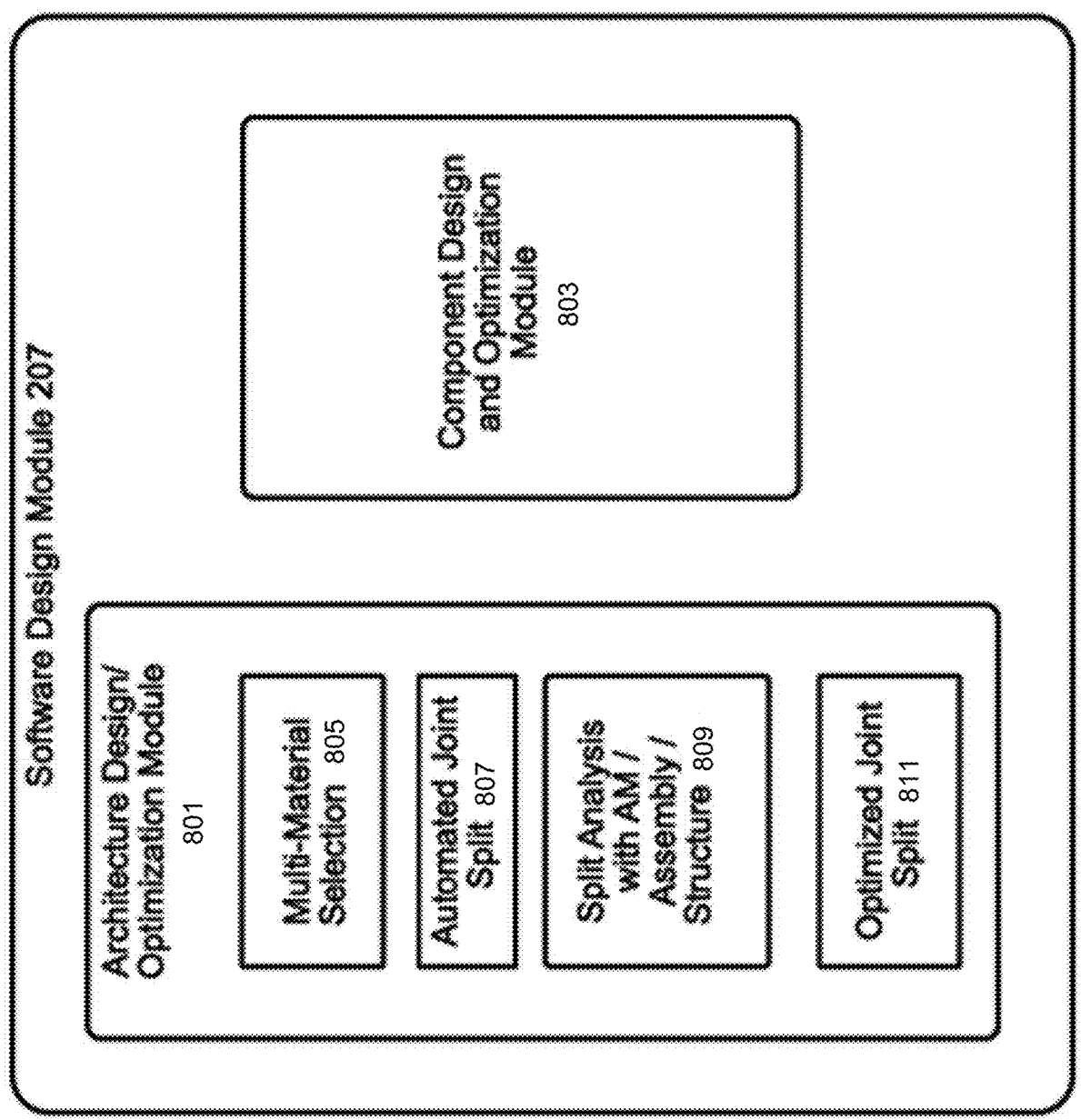
FIG. 8 illustrates further details of a software design module in accordance with an aspect of the present disclosure.

FIG. 8 illustrates further details of a software design module in accordance with an aspect of the present disclosure.

In an aspect of the present disclosure, a software design module, which may be software design module 207, may include one or more modules. For example, and not by way of limitation, a software design module in accordance with an aspect of the present disclosure may include an architecture design module 801 and a component design and optimization module 803. Other modules may be included within software design module 207 without departing from the scope of the present disclosure.

Architecture design module 801, which may be an architecture design/optimization module as shown in FIG. 8, may include a multi-material selection module 805, an automated joint split module 807, a split analysis with AM/assembly/structure module 809, and an optimized joint split module 811.

Architecture Design Module 801

Architecture design/optimization module 801 may generate architectural design options, which may include quantitative metrics for performance, material selection, manufacturing costs, life cycle analysis, and other parameters. Designers may review outputs from architecture design module 801 to modify, refine, or otherwise change designs based on changing design requirements or other changing inputs to a given design.

An output design from architecture design module 801 may serve as an initial design for a given product, which can then be discussed, updated, changed, etc., and iterated to see how changes to one part of a given design may affect other portions of the design. This iterative process may be performed by component design/optimization module 803, eventually resulting in a more finalized, "high-fidelity" architecture output from the architecture design/optimization module 801.

For example, architecture design module 801 may analyze an initial structural design of a chassis that includes 3D printed components. The analysis of an initial design may locate a 3D printed component that can be replaced with a COTS component, and can provide the designer with a cost-benefit analysis in terms of time, material cost, ease of assembly, etc. if such a replacement were to take place in the design.

The inputs to architecture design module 801 can include design input data (FEM, CAD), and design objectives. Input can also include high level requirements on vehicle specifications (e.g. sports car, supercar, or passenger car, expected costs, expected sales price, etc.) and APS 200 proprietary load cases. The outputs from architecture design module 801 can include low fidelity design output for vehicle/substructure: BOM consisting of component CAD and COTS selections), design validation, metrics for design objectives). This module can perform low-fidelity design optimization for components and can loop with component design/optimization module 803.

Component Design Module 803

Component design module 803, which may be a component design/optimization module 803, may capture the APS 200 manufacturing processes (design, AM, assembly and testing) and partially or completely automate these processes. Component design module 803 may use geo-kernel technology, topology optimization, bidirectional evolutionary structural optimization (BESO), high-performance computing (HPC), or other computational techniques, to generate component designs quickly. The design algorithms may be further enhanced by machine learning and analysis of the data present in data vault 205.

The inputs to component design module 803 can include design optimization input data (FEM, CAD), and optimization objectives (performance objective, print cost objective, assembly objective). The input can also include data from material database 601. The outputs from component design module 803 can include simulation data (topology optimization, free shape optimization, fatigue analysis, crashworthiness analysis, thermal analysis, etc.). The output can also include design output (CAD, design validation, metrics for design objectives), such as proposed joints for each design options (if applicable) and nominal assembly sequence and costs (if applicable).

Multi-Material Selection (MMSO) 805

Multi-material selection 805 can choose materials and/or COTS that meet the requirements such as performance or cost, and may also compute metrics of each material selection proposal. MMSO 805 can, for example, determine that COTS aluminum tubes could be used for part of a design, and those tubes can be assembled together with 3D printed parts, e.g., nodes. MMSO 805 may also provide a comparison between COTS aluminum tubes and 3D printed tubes of one or more materials in terms of cost, performance, crashworthiness, etc., such that a more thorough understanding of the overall design can be obtained.

The inputs to MMSO 805 can include design input data (e.g., FEM, CAD), and design objectives for multi-material selection such as maximizing usage of COTS, maximizing safety, etc. The input can also include data from COTS database 609 of data vault 205. The outputs for MMSO 805 can include CAD files, specifications of identified COTS usage, design validation, and metrics for design objectives, as well as comparisons between materials at given locations of the final product.

Automated Joint Split 807

Automated joint split 807 can propose how to split a component or substructure while still meeting one or more overall design requirements, e.g., performance, cost, safety, etc. Automated joint split 807 may also computes metrics of each proposal, e.g., overall efficiency, change in cost or schedule of replacing a COTS part with a 3D printed part, weight penalties for changing parts, etc. The inputs to automated joint split 807 can include design input data (FEM, CAD), and design objectives for multi-material selection such as maximizing usage of COTS, minimizing material weight, etc. The outputs for automated joint split 807 can include CAD data with splits, specifications of joints, design validation, metrics for design objectives including splitting proposals and other factors.

Split Analysis with AM/Assembly/Structure 809

Split analysis with AM/assembly/structure 809 may evaluate each joint split proposal from automated joint split 807 against the design requirements. For example, the changes in performance, cost, time to manufacture, crashworthiness, etc. between various designs or individual changes in a given design can be compared by entering each of the various designs into split analysis with AM/assembly/structure 809. Designers, cost analysts, and management can then compare the differences in each design in an overall perspective instead of looking at individual part costs or performance issues. As such, any downstream selection processes can be performed using human interaction, automated selection, or a hybrid human-automated selection of various design parameters, which may be based on machine learning in optimized joint/split module 811.

The inputs for split analysis with AM/assembly/structure 809 can include CAD with splits, specifications of joints. The input can also include data from alloys and parameters database 605, adhesives database 607, and COTS database 609 of data vault 205. The outputs for split analysis with AM/assembly/structure 809 can include metrics for design objectives including splitting proposals and structure performance/mass, print costs, assembly costs and life cycle analysis.

Optimized Joint Split 811

Optimized joint split 811 may sample the various solutions of automated joint split 807 and split analysis with AM/assembly/structure 809 to produce one or more solutions as to where joints between parts may be located. Since each part in an assembly is affected by a number of variables, an overall review of how each joint or connection between parts may be helpful in terms of how locating a joint at a given location affects the overall design in terms of cost, performance, manufacturing efficiency, and other factors.

The inputs to optimized joint split 811 can include design optimization input data (FEM, CAD), and optimization objectives (performance objective, print cost objective, assembly objective). The input can also include data from alloys and parameters database 605, adhesives database 607, and COTS database 609 of data vault 205. The outputs for optimized joint split 811 can include multiple solutions (different split proposals) to meet the various design objectives (performance, print cost, assembly cost, etc.).

Figure 9:
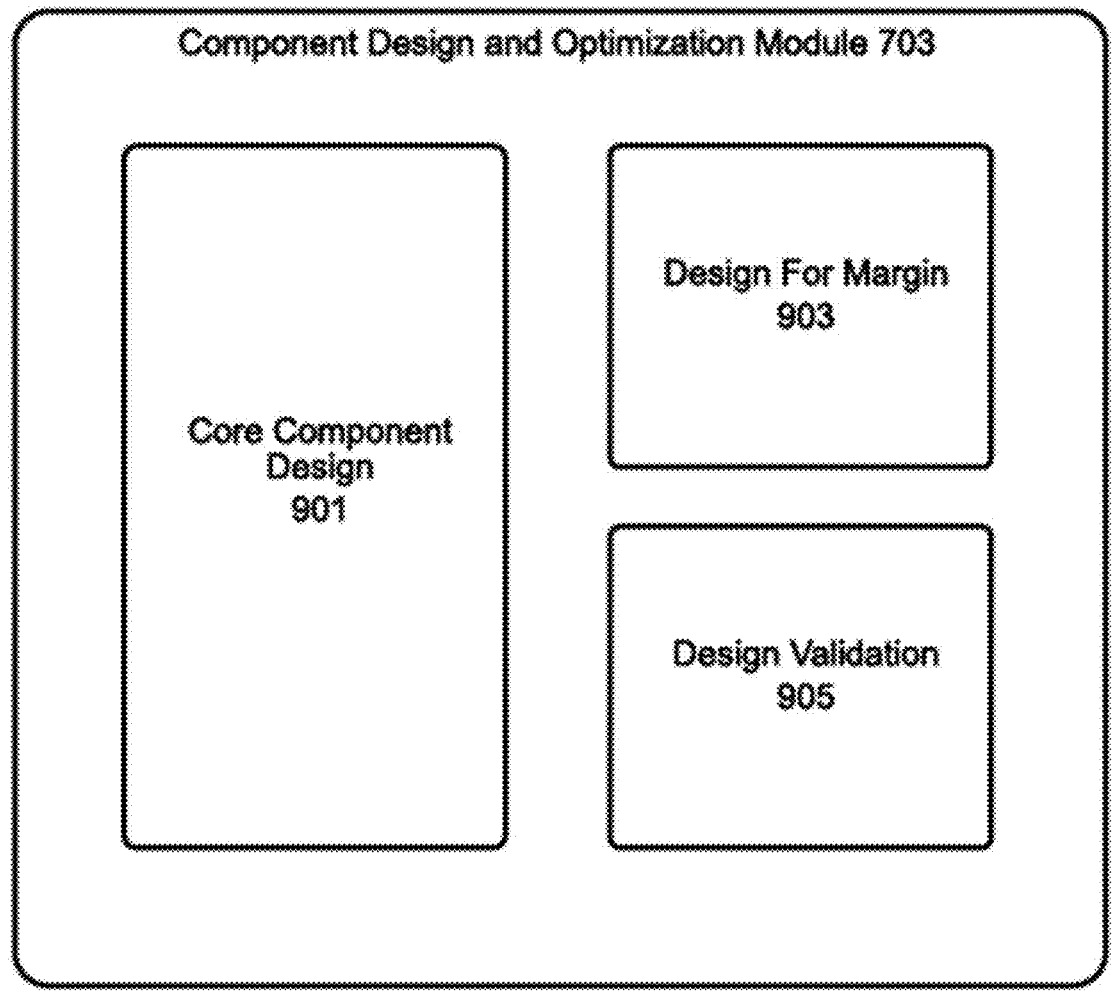
FIG. 9 illustrates further details of component design module in accordance with an aspect of the present disclosure.

FIG. 9 illustrates further details of component design module 703 in accordance with an aspect of the present disclosure.

Component design module 703 may include one or more modules, e.g., a core component design module 901, a design for margin module 903, and a design validation module 905.

Core Component Design 901

Core component design 901 may generate an initial design of a part. Core component design 901 is described in detail in FIG. 10 below.

Design for Margin 903

Design for margin 903 may analyze data from data vault 205 and correlate the parameters from data vault 205 to testing data from test subsystem 204 to adjust the internal design margin to achieve the expected design margin. The inputs to design for margin 903 can include structures from architecture design module 801, a desired design margin, AM data from data vault 205, and testing data from data vault 205. The outputs from design for margin 903 can include a design with an expected safety factor that may be different than the safety factor used as input to design for margin 903.

Design Validation 905

Design validation 905 can use software tools, which may be commercially available software tools, to assess the design. For example, and not by way of limitation, design validation 905 may ensure compliance to one or more standards, such as safety, crashworthiness, etc. The inputs to design validation 905 can include structures generated by architecture design module 801. The outputs from design validation 905 can include static analysis, fatigue analysis, crashworthiness analysis, and thermal analysis, which can be used to validate a design solution.

Figure 10:
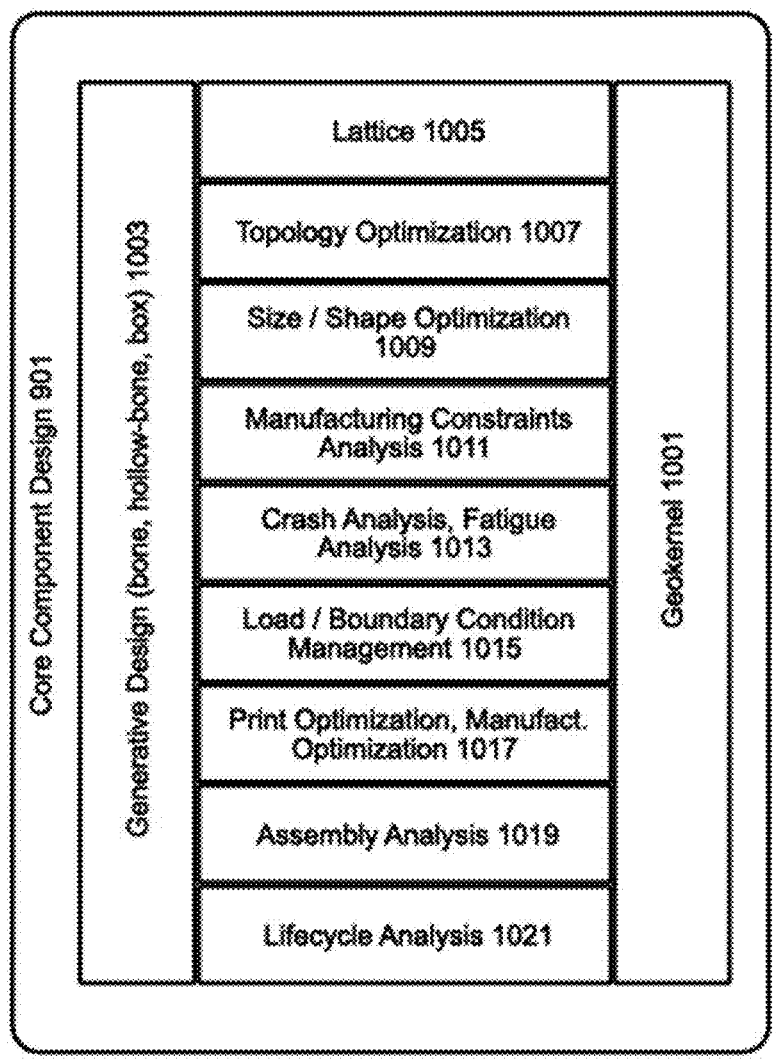
FIG. 10 illustrates further details of core component design module in accordance with an aspect of the present disclosure.

FIG. 10 illustrates further details of a core component design module in accordance with an aspect of the present disclosure.

In an aspect of the present disclosure, core component design module 901 may include a geokernel 1001, a generative design module 1003, a lattice module 1005, a topology optimization module 1007, a size/shape optimization module 1009, a manufacturing constraints analysis module 1011, a crash analysis, fatigue analysis module 1013, a load/boundary condition management module 1015, a print optimization, manufacturing optimization module 1017, an assembly analysis module 1019, and a lifecycle analysis module 1021.

Geokernel 1001

Geokernel 1001 may provide geometric and meshing manipulation technologies such as mesh smoothing, mesh healing, and remeshing, thin-region and thin-bone detection and fixing, fusion, or hollowing operations, for use in the design of a component. The inputs to geokernel 1001 can include design optimization input data (FEM, CAD), geometry/mesh operation directives such as smoothing, fusion, thickening, or cleaning-up. The outputs from geokernel 1001 can include the resultant mesh, which will enable the downstream optimization processes such as topology result interpretation, free shape optimization, hollow bone design, etc.

Generative Design (Bone, Hollow-Bone, Box) 1003

Generative design 1003 can generate structures by leveraging geokernel and BESO technology. Generative design 1003 can generate different design options, for example, bone, hollow-bone, or box, with/without interior lattice, for use in component design as well as overall product design. The design options produced by generative design 1003 may be further evaluated and ranked against the design requirements for the overall product.

Lattice Module 1005

Lattice module 1005, which may be included as part of geokernel 1001 and/or generative design 1003, may be used to design lattice structures, which may provide more efficient energy absorption of impact energy in crash structures. Additionally, lattice features may simultaneously serve as integrated build-support during additive manufacturing.

The inputs for lattice module 1005 can include engineering requirements (loads, impact performance targets, etc.). The outputs for lattice module 1005 can include lattice features incorporated into additively manufactured structures.

Topology Optimization 1007

Topology optimization 1007, which may be included as part of geokernel 1001 and/or generative design 1003, can provide topology improvement capability via BESO and other analysis tools. During design validation, APS 200 can use, for example, commercial topology software such as OptiStruct or other commercial software, to run topology comparisons or other computer-aided engineering (CAE) analyses. BESO technology can extend the bi-directional evolutionary structural performance further by using gradient based improvements and GPU to improve the topology solution quality and the computation time efficiency.

The inputs to topology optimization 1007 can include input FEM with load cases and optimization constraints. The outputs from topology optimization 1007 can include structures for comparison on various performance metrics.

Size/Shape Optimization 1009

Size/Shape optimization 1009, which may be included as part of geokernel 1001 and/or generative design 1003, can further improve the size and/or shape of the design. Comparisons between various component designs may result in mass reduction of a design without significantly reducing performance of the design. APS 200 can use outputs from size/shape optimization 1009 to reduce or change the size/shape of one or more given components and can report the effect on the overall finished product. The inputs to size/shape optimization 1009 can include input FEM with load cases and optimization constraints. The outputs from size/shape optimization 1009 can include modified and/or improved structures, with varying improvements in selected performance parameters, e.g., weight reduction, aerodynamic drag, etc.

Manufacturing Constraints Analysis 1011

Manufacturing constraints analysis 1011, which may be included as part of geokernel 1001 and/or generative design 1003, can analyze manufacturing constraints and apply these constraints to the design. For example, manufacturing constraints analysis 1011 can detect thin-regions, thin bones, powder trapping regions, and thermal distortion issues in the design, and may adjust these regions in the design to reduce or eliminate problems in the manufacturability of the component and/or final product. Manufacturing constraints analysis 1011 may adjust various regions by making them thicker or thinner, automatically generate holes to the hollow regions to evacuate powder, compensate the model to mitigate thermal distortion, etc., while maintaining other design constraints such as strength, crashworthiness, overall weight, etc.

Manufacturing constraints analysis 1011 can analyze AM manufacturing constraints and/or assembly manufacturing constraints, and make or provide information on choices to be made for a given component, joint, node, etc. For example, an initial design of a 3D printed part may include a thin region designed to reduce the weight of the part. However, manufacturing constraints analysis 1011 may determine that the thin region could bend during assembly of that part with other parts. Manufacturing constraints analysis 1011 could base this determination on AM constraints and assembly constraints. Because the strength of the printed thin region can depend on the material printed, the printer parameters and settings, etc. Similarly, the forces applied to the thin region during assembly can depend on the sequence of assembly, the motions of the robots, etc. Thus, the determination of whether the thin region will bend, and therefore must be modified, can depend on AM constraints and assembly constraints. Once manufacturing constraints analysis 1011 determines that the thin region may bend during assembly, the analysis can determine that a modification should be made to the AM process, the assembly process, or both. For example, manufacturing constraints analysis 1011 could modify the AM process by modifying the design of the part to make the thin region thicker to resist the forces the region will endure while being assembled and prevent bending. In addition to or instead of modifying the AM process, manufacturing constraints analysis 1011 may modify the assembly process by, for example, changing the order of assembly so that the part with the thin region is added to the assembly in a different order, and is added in an orientation that does not put as much stress on the thin region.

Crash Analysis, Fatigue Analysis 1013

Crash analysis, fatigue analysis 1013 can perform crash analysis and/or fatigue analysis on proposed designs to ensure the designs meet performance requirements. The inputs for crash analysis, fatigue analysis 1013 can include optimized structures generated by architecture design/optimization 701. The outputs for crash analysis, fatigue analysis 1013 can include use both crash analysis (for example with LS-Dyna) and durability/fatigue NVH analysis (for example nCode) to ensure the design pass the criteria of crashworthiness and fatigue.

Load/Boundary Condition Management 1015

Load/Boundary Condition (LBC) Management 1015 can perform mesh manipulation in a robust manner by projecting the LBC onto a new design without any manual work. As a result, the LBC is accurately transferred to the new generated design, and LBC management 1015 can maintain the accuracy in the design optimization simulation.

Print Optimization, Manufacturing Optimization 1017

Print optimization, manufacturing optimization 1017 can optimize the print preparation process by computing the best orientation to minimize the support, compensating the model for the thermal distortion to improve print accuracy, and optimizing packing/nesting to improve the productivity. The inputs for print optimization, manufacturing optimization 1017 can include optimized structures generated by architecture design/optimization 701 and AM data from data vault 205. The outputs for print optimization, manufacturing optimization 1017 can include print orientation, packing/nesting, thermal compensation.

Assembly Analysis 1019

Assembly analysis 1019 can perform utilization efficiency analysis and sensitivity analysis for a given model (connectivity and joint definition) and a robotic assembly cell configuration. The analysis can be used to try a different joint definition and a different robotic assembly cell configuration. The inputs for assembly analysis 1019 can include optimized structures generated by architecture design/optimization 701, joint definition, and robotic assembly cell configuration. The outputs for assembly analysis 1019 can include robot utilization, assembly time, sensitivity analysis.

Lifecycle Analysis 1021

Lifecycle analysis 1021 can perform the cost analysis from primary resources to end of cycle (cradle to grave) and preferably include upgrading of the end of cycle output stream (cradle to cradle). The inputs for lifecycle analysis 1021 can include optimized structures generated by architecture design/optimization 701. The outputs for lifecycle analysis 1021 can include adjustments to the optimized structures to improve lifecycle characteristics.

Figure 11:
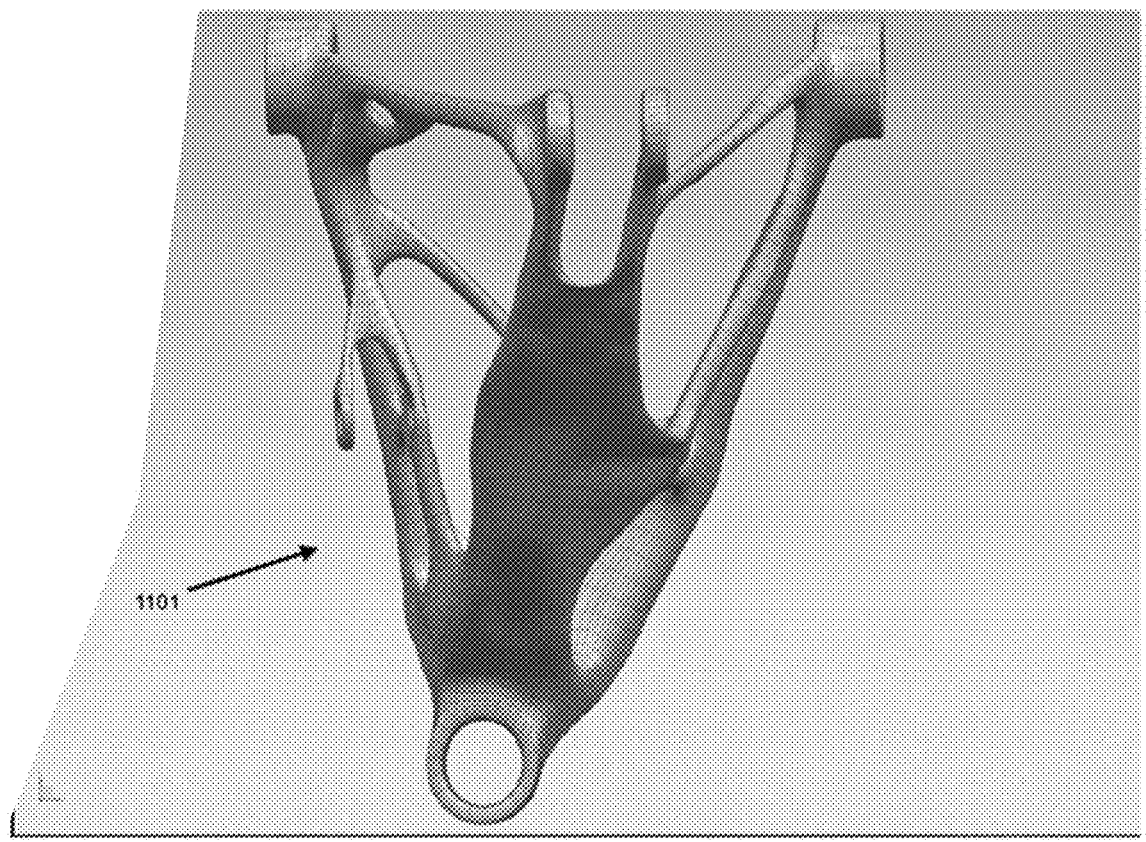
FIGS. 11-13 illustrate some examples of the types of results that can be generated by a generative design module in accordance with an aspect of the present disclosure.
Figure 12:
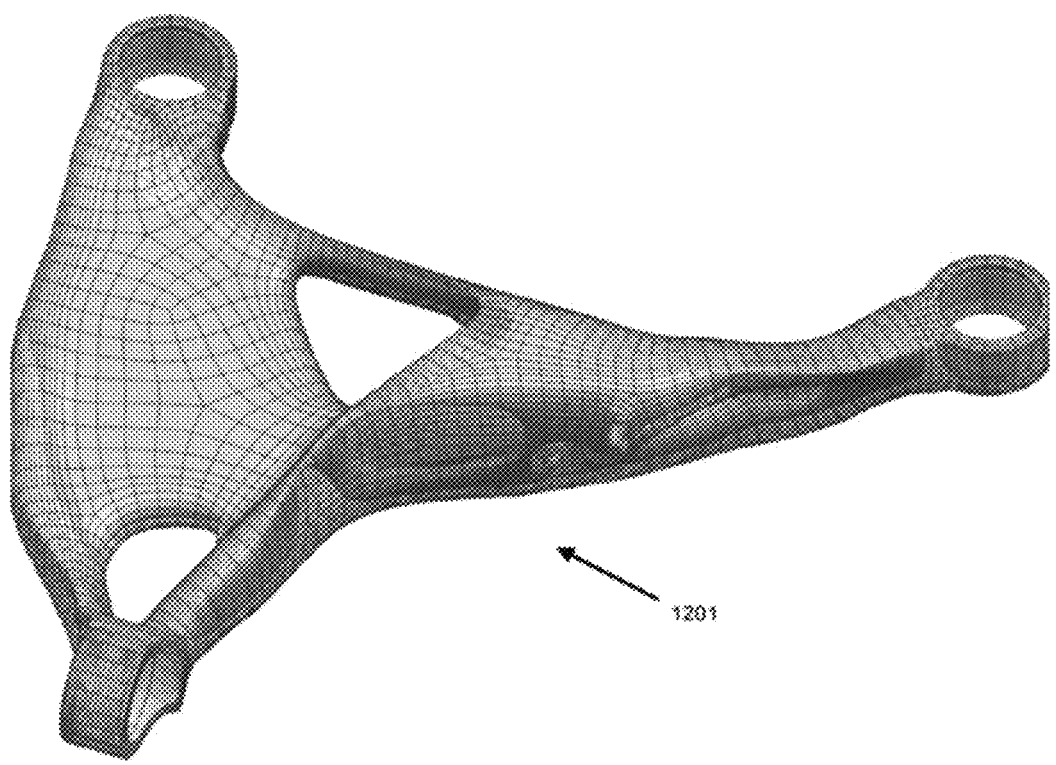
Figure 13:
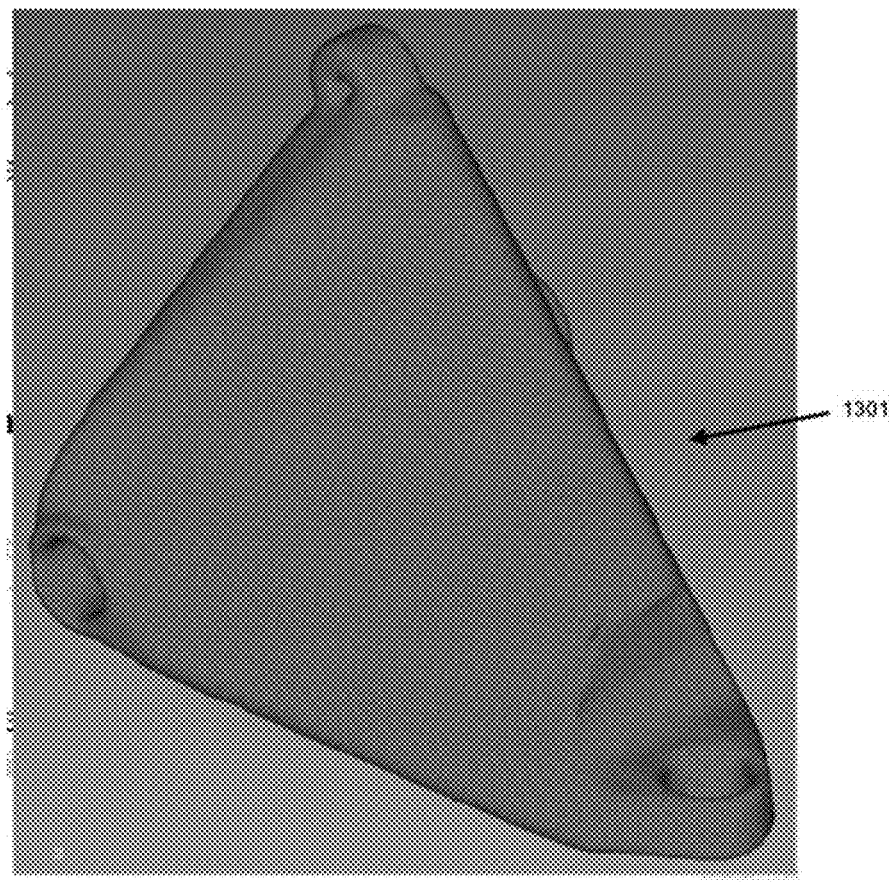

FIGS. 11-13 illustrate results that can be generated by a generative design module in accordance with an aspect of the present disclosure.

FIG. 11 illustrates an example bone design 1101 according to various embodiments. Bone design 1101 can have a solid interior, which can have the desired properties of high performance, no need to remove interior powder, and generally high print speed.

FIG. 12 illustrates an example hollow bone design 1201 according to various embodiments. Hollow bone design 1201 can be similar to bone design 1101, but can include portions that are hollow, which can include internal structures such as lattices, ribs, etc. Hollow bone structures can have the characteristics of high performance for certain load cases, but can require interior powder removal, and potential have low print speed.

FIG. 13 illustrates an example box-like design 1301 according to various embodiments. Box-like structures can have characteristics such as the ability to have thin walls, and a high performance for certain load cases. However, box-like structures may require interior powder removal, and may have potentially low print speed.

The inputs for generative design (bone, hollow-bone, box) 1003 can include design optimization input data (FEM, CAD), and design objectives (performance objective, print cost objective, assembly objective). The outputs for generative design (bone, hollow-bone, box) 1003 can include a highly optimized structure that meets the design objectives.

Figure 14:
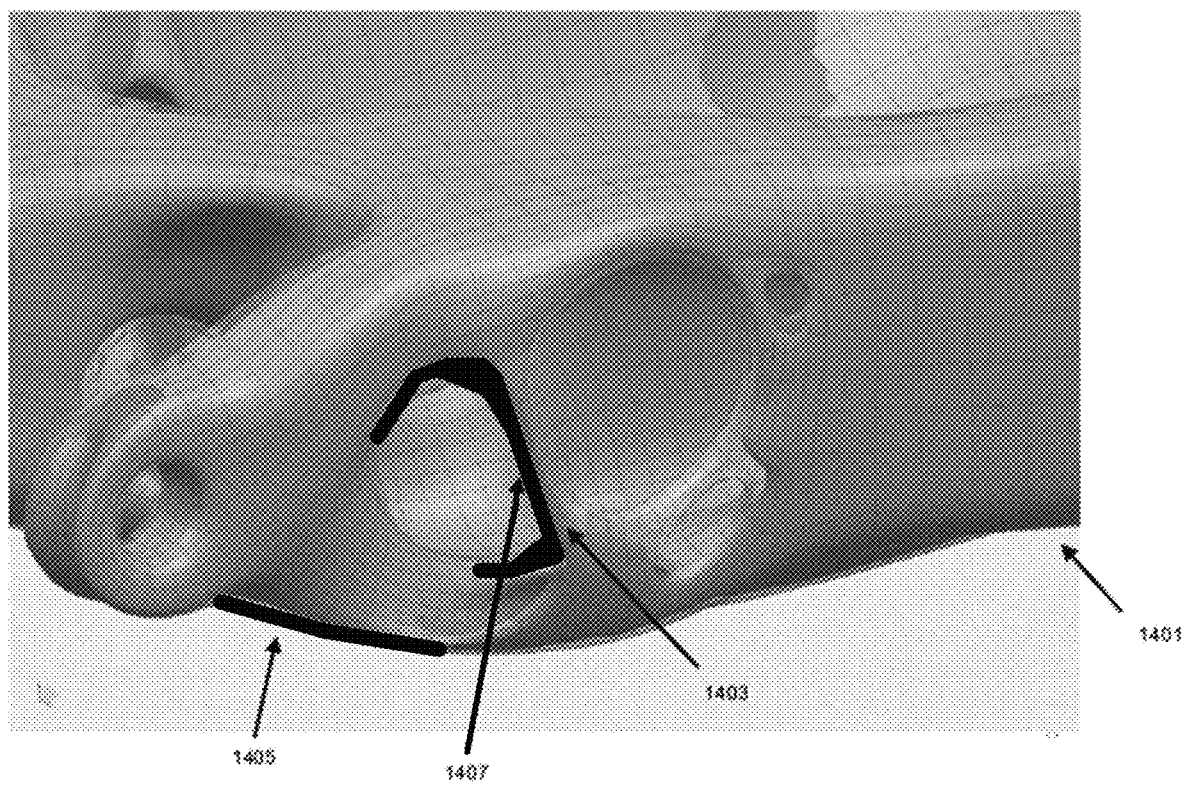
FIG. 14 illustrates an example modification made by manufacturing constraints analysis 1011 in accordance with an aspect of the present disclosure.

FIG. 14 illustrates an example modification made by manufacturing constraints analysis 1011 in accordance with an aspect of the present disclosure.

FIG. 14 shows an initial design 1401. Initial design includes a thin bone region 1403. Manufacturing constraints analysis 1011 can determine the thin bone region may bend during assembly with other parts. Manufacturing constraints analysis 1011 can adjust initial design 1401 to create adjusted design 1405 shown in a darker shade. Adjusted design 1405 may also include a thicker bone region 1407 that can improve printability and performance.

The inputs for manufacturing constraints analysis 1011 can include optimized structures. The outputs for manufacturing constraints analysis 1011 can include improved structures that satisfy the manufacturing constraints such as thickness, extra stockings, and thermal compensation.

Figure 15:
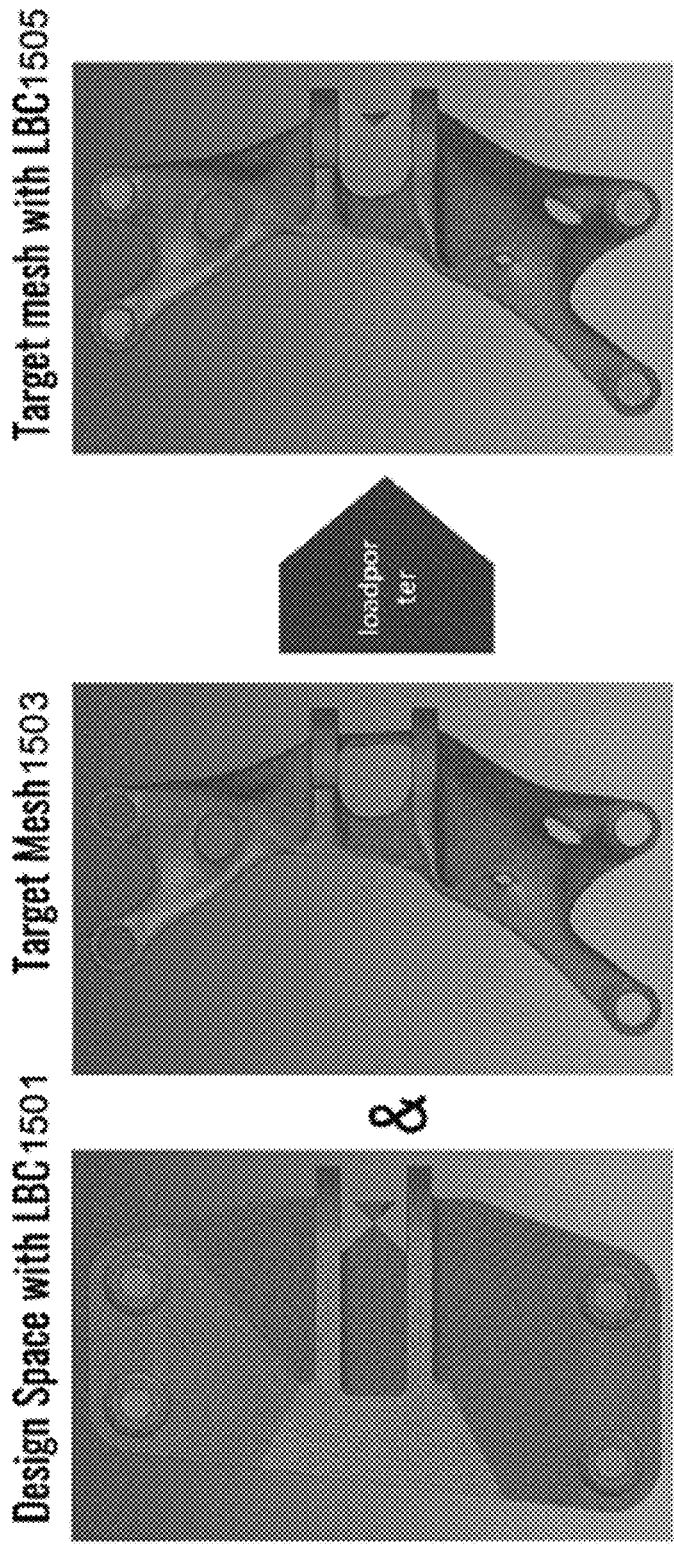
FIG. 15 illustrates an example operation of a load/boundary condition (LBC) management module in accordance with an aspect of the present disclosure.

FIG. 15 illustrates an example operation of LBC management 1015 in accordance with an aspect of the present disclosure.

LBC management 1015 can receive a design space with LBC 1501 and a target mesh 1503. LBC management 1015 can then generate a target mesh with LBC 1505 based on the input.

The inputs for Load/Boundary Condition Management 1015 can include load cases and boundary conditions (LBC) in a design input model. The outputs for Load/Boundary Condition Management 1015 can include high level representation of LBC so that APS 200 can transfer LBC accurately during series of design optimization processes.

Figure 16:
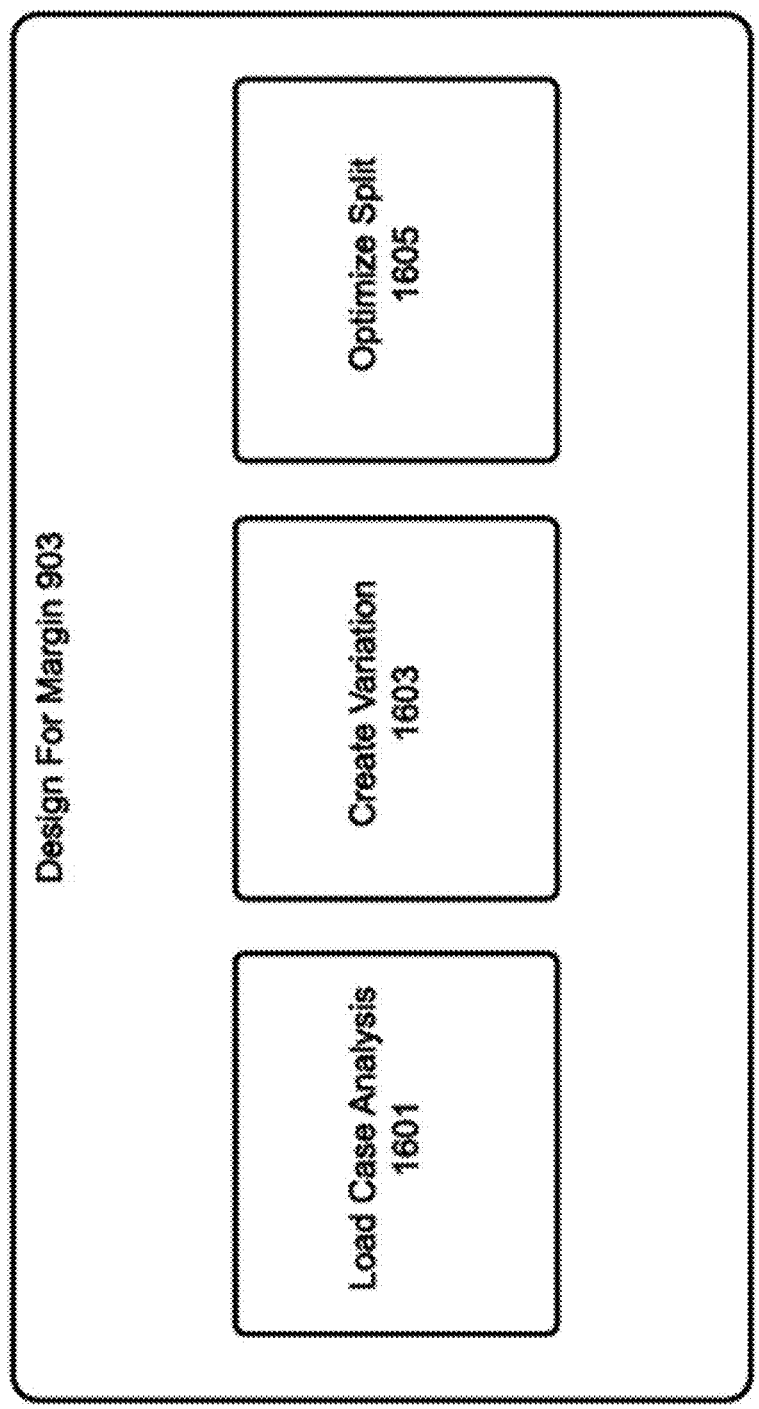
FIG. 16 illustrates further details of a design for margin module in accordance with an aspect of the present disclosure.

FIG. 16 illustrates further details of design for margin 903 in accordance with an aspect of the present disclosure.

Design for margin 903 can include load case analysis module 1601, create variation module 1603, and optimize split module 1605.

Load Case Analysis 1601

Load case analysis 1601 can perform sensitivity analysis of the identified load cases (e.g. different values of certain forces or pressure applied, or different directions of applied forces) to improve the design robustness. The inputs for load case analysis 1601 can include load cases and boundary conditions (LBC) in design input model. The outputs for load case analysis 1601 can include identify critical load cases and sensitivity analysis of critical load cases.

Create Variation 1603

Create variation 1603 may use knowledge, machine learning, and data from data vault 205 to produce a set of representative variations on a design. These variations may allow for more efficient overall design based on the design requirements and constraints. By creating variations on a given design, create variation 1603 my reduce costs, time to manufacture, or place weightings on certain constraints within the design such that computational analysis can produce a number of designs focused on particular design characteristics. Create variation 1603 can be used by many of the modules within APS 200, e.g., component design module 803, optimized split 811, split analysis 809, MMSO 805, etc., to generate different proposals for the design.

The inputs for create variation 1603 can include design optimization input data (FEM, CAD), and design objectives (performance objective, print cost objective, assembly objective), and design variation rule definitions that define how to choose COTS material selection, print material selection, joint splitting strategy, assembly strategy selection, print strategy selection and other manufacturing process strategies. The outputs for create variation 1603 can include a list of variations of the end-to-end specification (design, assembly and print) so that the system can evaluate the variations based on a set of requirements.

Optimize Split 1605

Optimize split 1605 can analyze different splitting strategies to achieve multiple design objectives: reduction in print time or cost, assembly time or cost, structure performance, and other criteria. The inputs for optimize split 1605 can include, a list of variations generated by create variation 1603 and objective functions for evaluating splitting: print cost, assembly cost, structure performance and other criteria. The outputs for optimize split 1605 can include optimized splitting of the component/substructures.

Figure 17:
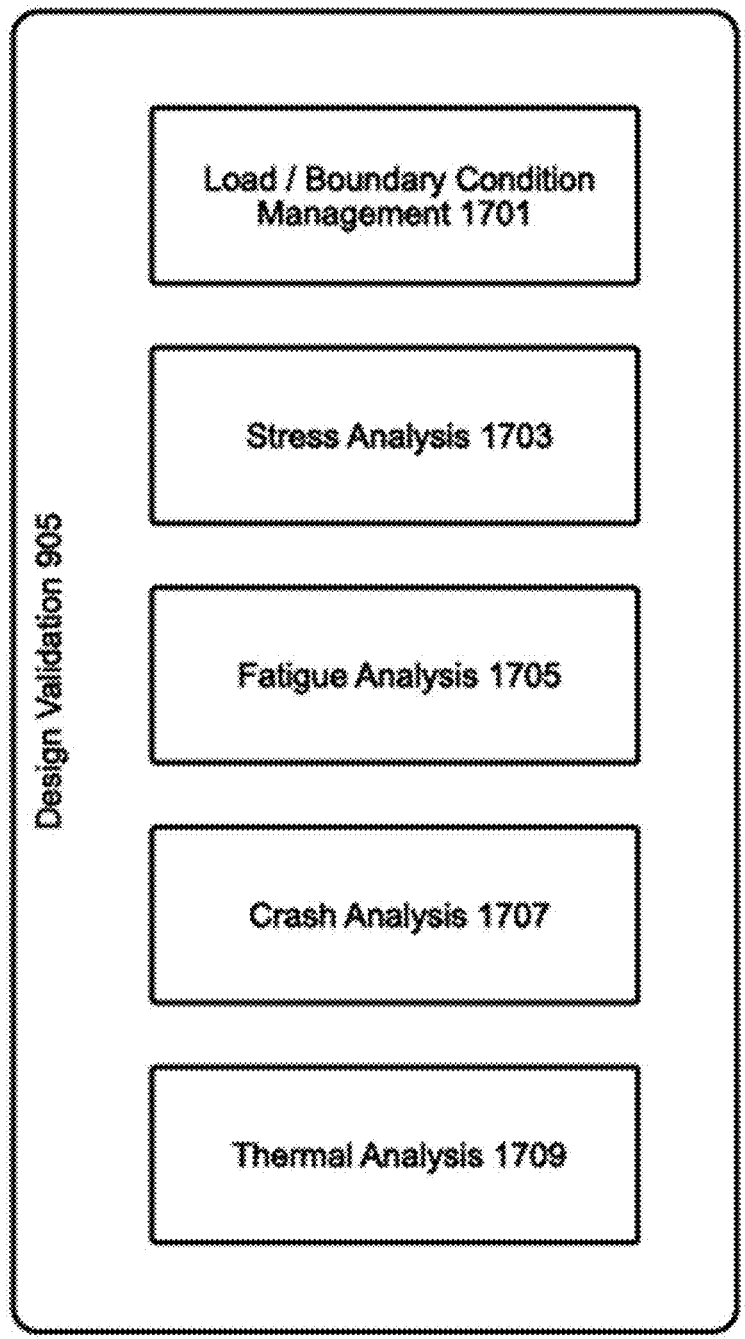
FIG. 17 illustrates further details of a design validation module in accordance with an aspect of the present disclosure.

FIG. 17 illustrates further details of design validation module 905 in accordance with an aspect of the present disclosure.

Design validation module 905 can include, inter alia, load/boundary condition (LBC) management module 1701, stress analysis module 1703, fatigue analysis module 1705, crash analysis module 1707, and thermal analysis module 1709.

Load/Boundary Condition Management 1701

LBC Management 1701 may apply mesh manipulation techniques to a design by projecting the LBC onto a design. In other words, LBC management 1701 may create a design having certain design constraints in a mesh construction, with load and boundary conditions applied to the overall design. As a result, these conditions may be transferred to a design, and APS 200 may maintain the boundary condition accuracy in design simulations. The inputs to LBC management 1701 can include load cases and boundary conditions in a design input model. The outputs for LBC management 1701 can include high level representations of LBC so that APS 200 can transfer LBC accurately during the series of design improvement/optimization processes.

Stress Analysis 1703

Stress analysis 1703 can determine stresses for structures. Stress analysis 1703 may produce design solutions that are comprehensive or localized, as well as producing solutions that can be scaled. Scaling of designs can be done with respect to one or more variables, can be linear or nonlinear, can be performed in static and dynamic conditions, and/or take into account acoustics, fatigue, crashworthiness, material changes, or other factors. Stress analysis 1703 can modify, improve, or optimize structures for a variety of performance metrics such as weight, strength, stiffness, vibration and fatigue characteristics, etc., to determine the effects of changes in materials, design philosophy, manufacturing techniques, etc. In an aspect of the present disclosure, commercial software such as Optistruct can be used as part of or all of stress analysis 1703. The inputs to stress analysis 1703 can include finite element model inputs. The outputs from stress analysis 1703 can include FEM analysis results such as displacement, stress, and moment values.

Fatigue Analysis 1705

Fatigue analysis 1705 can provide for digital signal processing, acoustic and vibration analysis, fatigue life prediction, durability analysis, engineering data management, and reporting. Fatigue analysis 1705 can identify critical stress points within a design and may calculate fatigue lives of various components. These analyses may include finite element (FE) analysis results for various materials, including metals and composites. In an aspect of the present disclosure, commercial software, such as nCode, can be used. The inputs to fatigue analysis 1705 can include structures generated by architecture design module 801, fatigue load cases, data from alloys and parameters database 605, adhesives database 607, COTS parts library 609, or other data in data vault 205. The outputs from fatigue analysis 1705 can include fatigue life analysis of a structure of a component, subassembly, or final product.

Crash Analysis 1707

Crash analysis 1707 can perform simulations on subassemblies, components, or products. These simulations may include, inter alia, nonlinear transient dynamic finite element analysis (FEA) using explicit time integration, failure analyses, fatigue analyses from fatigue analysis 1705, or other simulations. In an aspect of the present disclosure, commercial software such as LS-DYNA can be used. The inputs to crash analysis 1707 can include structures from architecture design/optimization 801. The outputs from crash analysis 1707 can include crashworthiness analysis of the optimized structure.

Thermal Analysis 1709

Thermal analysis 1709 can perform thermal analysis of designs. In an aspect of the present disclosure, commercial software such as Altair, MSC Software, or other standard CAE software packages can be used. The inputs to thermal analysis 1709 can include structures from architecture design/optimization 801 and thermal analysis input. The outputs from thermal analysis 1709 can include thermal analysis of the optimized structure.

Figure 18:
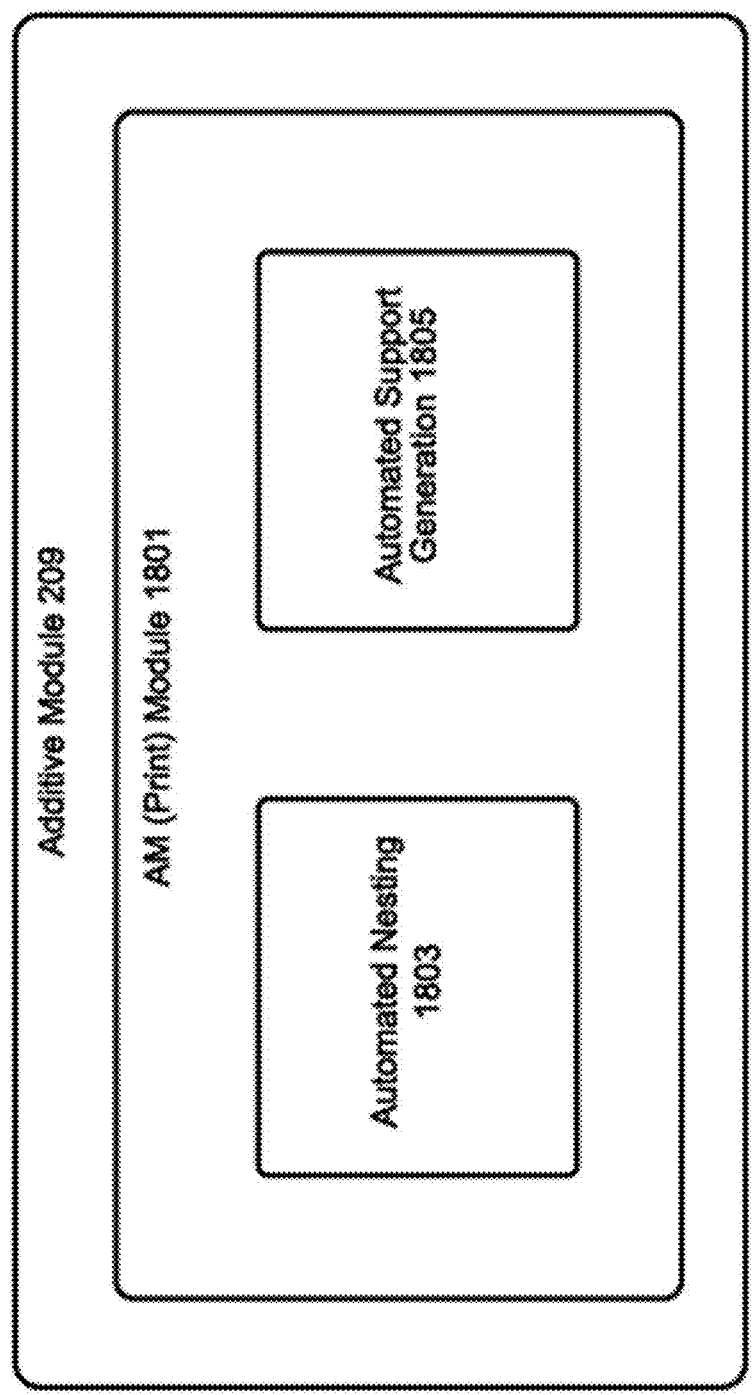
FIG. 18 illustrates further details of an additive module in accordance with an aspect of the present disclosure.

FIG. 18 illustrates further details of additive module 209 in accordance with an aspect of the present disclosure.

Additive module 209 can include an AM (print) module 1801, which can include an automated nesting module 1803 and an automated support generation module 1805.

AM Module 1801

In AM module 1801, a three-dimensional structure is decomposed into a series of instructions governing welding, micro-welding, depositing, binding, fusing or otherwise piece-wise joining of feedstock material into a larger whole. Commonly referred to as additive manufacturing as opposed to subtractive manufacturing wherein a larger substrate is reduced by a series of processes to a final geometry.

The inputs for AM module 1801 can include a prepared digital design model with features required for printing, generally entailing deconstruction into a series of slices which may be of fixed or varying thickness, and may include supporting structures for thermal and stress management to facilitate a successful build. The outputs for AM module 1801 can include, generally, a semi-finished product/structure attached to a build substrate plate, directly and/or with associated support structures, partially sintered or bound powder, etc. This product may be exposed to subsequent processing before final use.

Automated Nesting 1803

In automated nesting 1803, a group or pool of digital design models with a set of characteristics such as bounding envelope, shape complexity/concavity value, critical features, etc., may be analyzed. These models may be characterized and interpreted by a set of algorithms in accordance with a set of production requirements, e.g., quantity, schedule, associated equipment capabilities, etc. The algorithm seeks to improve or maximize the factory operating efficiency by combining complementary and similar activities to reduce waste in materials, build time, down time, etc.

The inputs to automated nesting 1803 can include a group/pool of digital design models with a set of characteristics required for nesting analysis. The outputs from automated nesting 1803 can include an optimized set of build definitions that maximizes the factory operating efficiency objective function and defines the required position and orientation of each item to be co-manufactured in the additive process.

Automated Support Generation 1805

Automated support generation 1805 may generate support structure designs for AM designs that may employ support structures during printing. For any given digital design model with a defined build vector, the model can be modified with features used during the printing process. The outputs of automated support generation 1805 may change depending on the machines used for printing, as well as the angle or rotation of the part during printing, splits in the part generated by other modules in APS 200, etc.

Selective laser melting or powder bed fusion technologies generally deconstruct a design into a series of slices of fixed or variable thicknesses, and such designs may employ supporting structures for thermal and stress management to facilitate a successful build. These thermo-mechanical structures are used to increase the probability of a successful build within the limiting requirements of the AM technology selected, such as build angle, residual from process settings, pre-heat/ambient conditions, etc. A knowledge base from AM process simulation software and a growing database of previous products manufactured, as well as other characteristics such as dimensional accuracy to the input model, enables this process to be increasingly automated over time and increase the yield of the printing process.

The inputs to automated support generation 1805 can include a prepared digital design model and an associated build vector/orientation, if applicable. The outputs from automated support generation 1805 can include a model modified with any thermo-mechanical structures required for an increased probability of successful printing.

Figure 19:
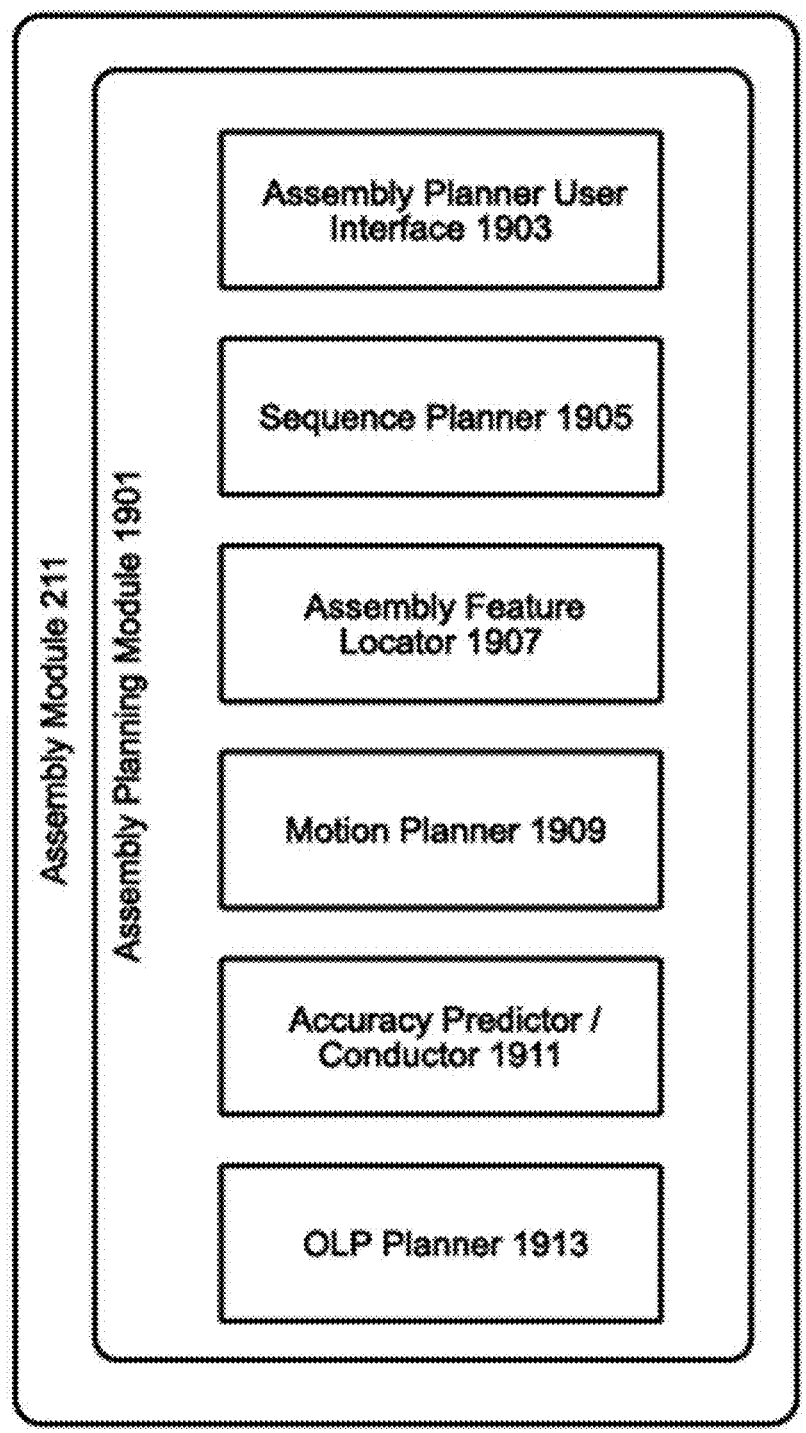
FIG. 19 illustrates further details of an assembly module in accordance with an aspect of the present disclosure.

FIG. 19 illustrates further details of assembly module 211 in accordance with an aspect of the present disclosure.

Assembly module 211 can include, inter alia, an assembly planning module 1901, which can include an assembly planner user interface 1903, a sequence planner 1905, an assembly feature locator 1907, a motion planner 1909, an accuracy predictor/conductor 1911, and an off-line programming (OLP) planner 1913. These components can loop with each other to converge on an optimized assembly solution.

Assembly Planner User Interface 1903

Assembly planner user interface 1903 can include a graphical user interface (GUI) of the assembly planner, which can be a user interface of the robotic assembly cell/automated assembly process. The assembly planner user interface 1903 can be graphical and intuitive such that it can be operated without specialized training.

The assembly planner user interface 1903 may display a simulated assembly process in an intuitive manner, highlighting parts and steps of an assembly or subassembly as the manufacturing process moves forward. Outputs to a user may include cycle time of a machine, predicted assembly accuracy, and robot utilization.

Assembly planner user interface 1903 may include one or more pieces of software, which may include commercially available software or proprietary software, geometry-based simulations, processors to evaluate sensor inputs, and other items. The inputs to assembly planner user interface 1903 can include structure CAD and assembly layouts, sensor outputs from automated equipment, part locators, and other inputs. The outputs from assembly planner user interface 1903 can include a graphical interface.

Sequence Planner 1905

Sequence planner 1905 can receive a structure's CAD and the assembly layout and outputs an assembly sequence for a given subassembly or product. The assembly sequence describes the order that parts or subassemblies are assembled or joined in order to create the final assembly or final product. Sequence planner 1905 describes and maintains the sequence and location of each robot in the overall assembly line/cell, which robot is holding/assembling which parts, the order of operation of each robot, what part table starts out with what part, etc.

The sequence generated by sequence planner 1905 may be a basis for the development of larger robot programs and the PLC/IPC code. A sequence produced by sequence planner 1905 illustrates the order of assembly to be followed by assembly manufacturing module 215. The assembly process may also be integrated with the architecture design module 801 to determine the best splits for the assembly overall. Such splits may include information output from the assembly sequence planner to compare accuracy, cycle time, efficiency, etc., between different assembly sequences. This sequence planner 1905 may also be integrated with and interface with assembly feature locator 1907, motion planner 1909 and accuracy planner 1911. When interfacing with the various planning modules within assembly planning module 1901, a final assembly sequence is generated by sequence planner 1905 to be used as the baseline for the OLP planner 1913.

The inputs for sequence planner 1905 can include structure CAD, assembly layout, loops with the assembly feature locator, motion planner, and accuracy predictor, and loops with the architecture design/optimization module. The outputs for sequence planner 1905 can include assembly sequence, loops with the assembly feature locator, motion planner, and accuracy predictor, and loops with the architecture design/optimization module.

Assembly Feature Locator 1907

Assembly feature locator 1907 can determine the location of all the assembly features on the part, subassembly, or final product. These locations can then be used to automatically design in the assembly features. Assembly feature locator 1907 can involve multiple analyses to determine the best locations while accounting for the entire APS 200 cost and efficiency performance.

Assembly feature locator 1907 may focus on join position, quality control (QC) features, ultraviolet (UV) features, and metrology features, but other feature locator positions may be taken into account by assembly feature locator 1907.

Assembly feature locator 1907 module interfaces with sequence planner 1905 as changes in sequence and location affect each other, and also interfaces with architecture design module 801 and component design module 803 to account for changes in splits and CAD design features.

The inputs for assembly feature locator 1907 can include structure CAD, assembly layout, sequence planner 1905, motion planner 1909, and accuracy predictor 1911, and architecture design/module 801 and component design module 803. The outputs for assembly feature locator 1907 can include join position selection or location, QC (robot gripper) location determined, UV feature location determined, metrology features located, sequence planner changes, motion planner changes, and accuracy predictor changes, and architecture design module 801 and component design module 803 inputs.

Motion Planner 1909

Motion planner 1909 can use the inputs of the assembly feature locator 1907 to determine motion paths for each robot in the assembly cell or assembly line. This path may be improved based on one or more parameters, e.g., cycle time, process, assembly line safety (robot collision control, etc.), or other parameters. The inputs to motion planner 1909 can include assembly sequence, assembly feature locations, loops with sequence planner, assembly feature locator, and accuracy predictor, and loops with the architecture design/optimization module and core component design module. The outputs from motion planner 1909 can include motion paths for each robot, data for sequence planner 1905, assembly feature locator 1907, and accuracy predictor 1911, and data for architecture design module 801 and component design module 803.

Accuracy Predictor/Conductor 1911

Accuracy predictor/conductor 1911 may provide a prediction of the accuracy of the final assembly/product, and may also be used to improve assembly accuracy during the manufacturing process. Accuracy predictor/conductor 1911 may use a software module to predict manufacturing accuracy based on the structure CAD, the assembly sequence, assembly feature locations, etc. Accuracy predictor/conductor 1911 may interface with sequence planner 1905, assembly feature locator 1907, and motion planner 1909 to improve the accuracy of each step in the manufacturing/build process, and may provide tradeoffs based on build time, cost, or other factors with respect to build accuracy. Accuracy predictor/conductor 1911 may also interface with the architecture design module 801 and component design module 803 to inform on desired or improved splits and geometry with respect to manufacturing accuracy.

The inputs to accuracy predictor/conductor 1911 can include assembly sequence, assembly feature locations, sequence planner 1905, assembly feature locator 1907, and motion planner 1909, and inputs from architecture design module 801 and component design module 803. The outputs from accuracy predictor/conductor 1911 can include a prediction of assembly accuracy, options for live control of physical assembly process, machine learning (feedback to robots), etc., to adjust positions and improve overall assembly accuracy.

OLP Planner 1913

The OLP planner 1913 creates structured OLPs that can be sent to the IPC/PLC/cell server and downloaded to the robots. The OLP planner 1913 compiles the outputs of the assembly module 211 into a form that is compatible with the assembly cell hardware, such that the assembly module 211 outputs can be received by the assembly cell to construct subassemblies/products. The inputs for OLP planner 1913 can include robot motion paths, assembly sequence (e.g., a Gantt log for IPC/PLC), and assembly feature locations. The outputs for OLP planner 1913 can include structured OLPs as well as functional, I/O, and other communications to be used by the assembly cell.

Figure 20:
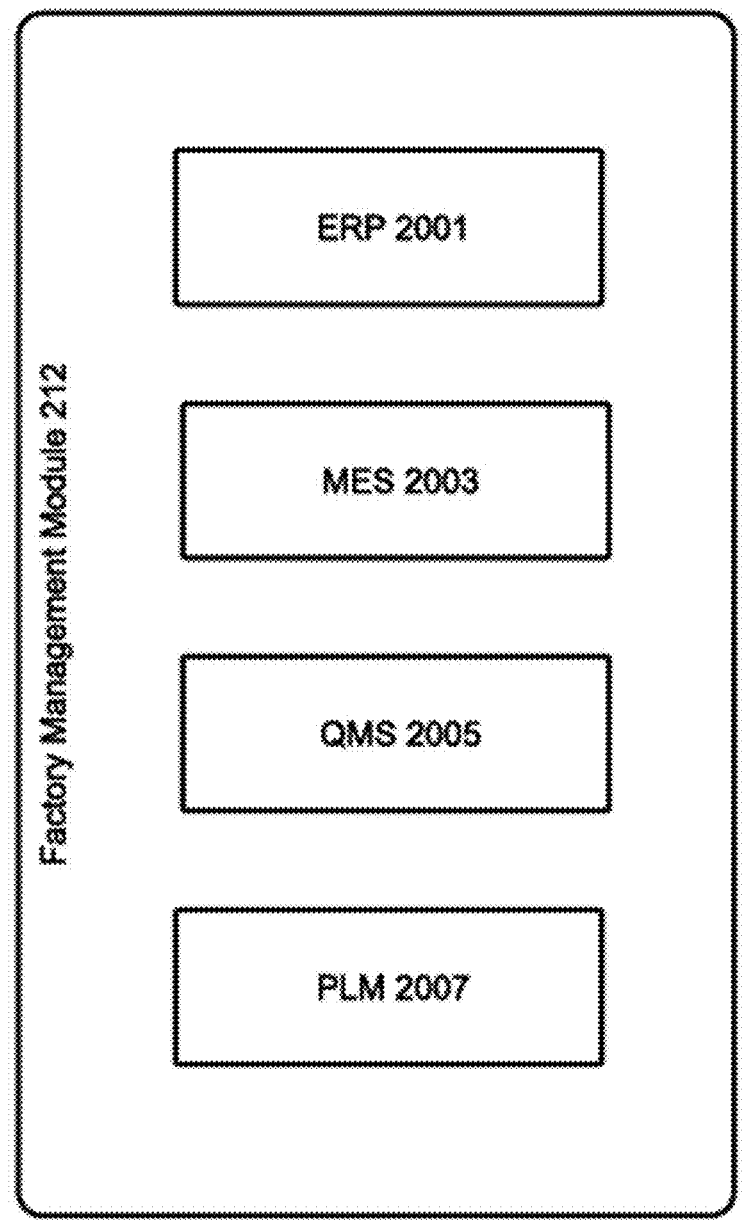
FIG. 20 illustrates further details of a factory management module in accordance with an aspect of the present disclosure.

FIG. 20 illustrates further details of a factory management module in accordance with an aspect of the present disclosure.

Factory management module 212 can include an enterprise resource planner (ERP) 2001, a manufacturing execution system (MES) 2003, a quality management system (QMS) 2005, and a product lifecycle management (PLM) system 2007.

Enterprise Resource Planner (ERP) 2001

ERP 2001 may perform inventory control and automated procurement. ERP 2001 may be commercially available software, such as Oracle, or may be proprietary software for some or all of the assembly process. The inputs for ERP 2001 can include MES 2003 data and PLM 2007 integration. The outputs for ERP 2001 can include inventory control and automated purchasing based on supplied data from MES 2003 and PLM 2007.

MES 2003

MES 2003 can act as a high-level controller to schedule/sequence activities or manufacturing steps. MES 2003 may also be used to validate data, record data, and display data generated during the manufacturing process. MES 2003 may integrate and provide inputs to design choices or design subsystem 201. MES 2003 takes into account factory capacity, scheduling, and other factors, and can determine if excess capacity is available and any costs associated with excess capacity.

MES 2003 can provide data to allow for intricate design choices, e.g., where a design may be more heavily weighted on performance than on cycle time (i.e., where there is excess capacity in the factory), or other trade-offs that may be impacted by changes in capacity or schedule. MES 2003 can be connected to the APS 200, through sensors on specific machines, PLCs/IPCs in the system, etc. The MES can also be connected to ERP 2001, sharing data that is relevant to inventory management and material procurement.

The inputs to MES 2003 can include manufacturing instructions from design subsystem 201 portion and manufacturing subsystem 203 of APS 200. The outputs from MES 2003 can include production schedule, e.g., detail of scheduling each manufacturing step/process, etc., validated production data to ISO standards, controlled production data, recorded data, and data for integration with ERP 2001 for procurement and inventory management.

Quality Management System (QMS) 2005

QMS 2005 can provide a set of policies, processes and procedures that are used in the development of the APS 200 technology and the execution of production programs. These policies, processes and procedures can document and provide improvement opportunities, aid in defect prevention, and reduce variation and waste during production and in the supply chain. The inputs for QMS 2005 can include customer requirements, Process Requirements, and Technology Requirements. The outputs for QMS 2005 can include lessons learned, standardized forms, standard operating procedures, work instructions, training material, risk assessments and response, non-conformance reports and corrective actions, and measured data from performance monitoring and execution including maintenance logs, end of line or in-situ quality monitoring tests.

Product Lifecycle Management (PLM) System 2007

PLM system 2007 can provide standard product lifecycle management functions, management of design and process documents, BOM, classification and other metadata, and compliance data such as export control data. The inputs to PLM system 2007 can include lists of products and processes. The outputs from PLM system 2007 can include lifecycle managed product data.

Figure 21:
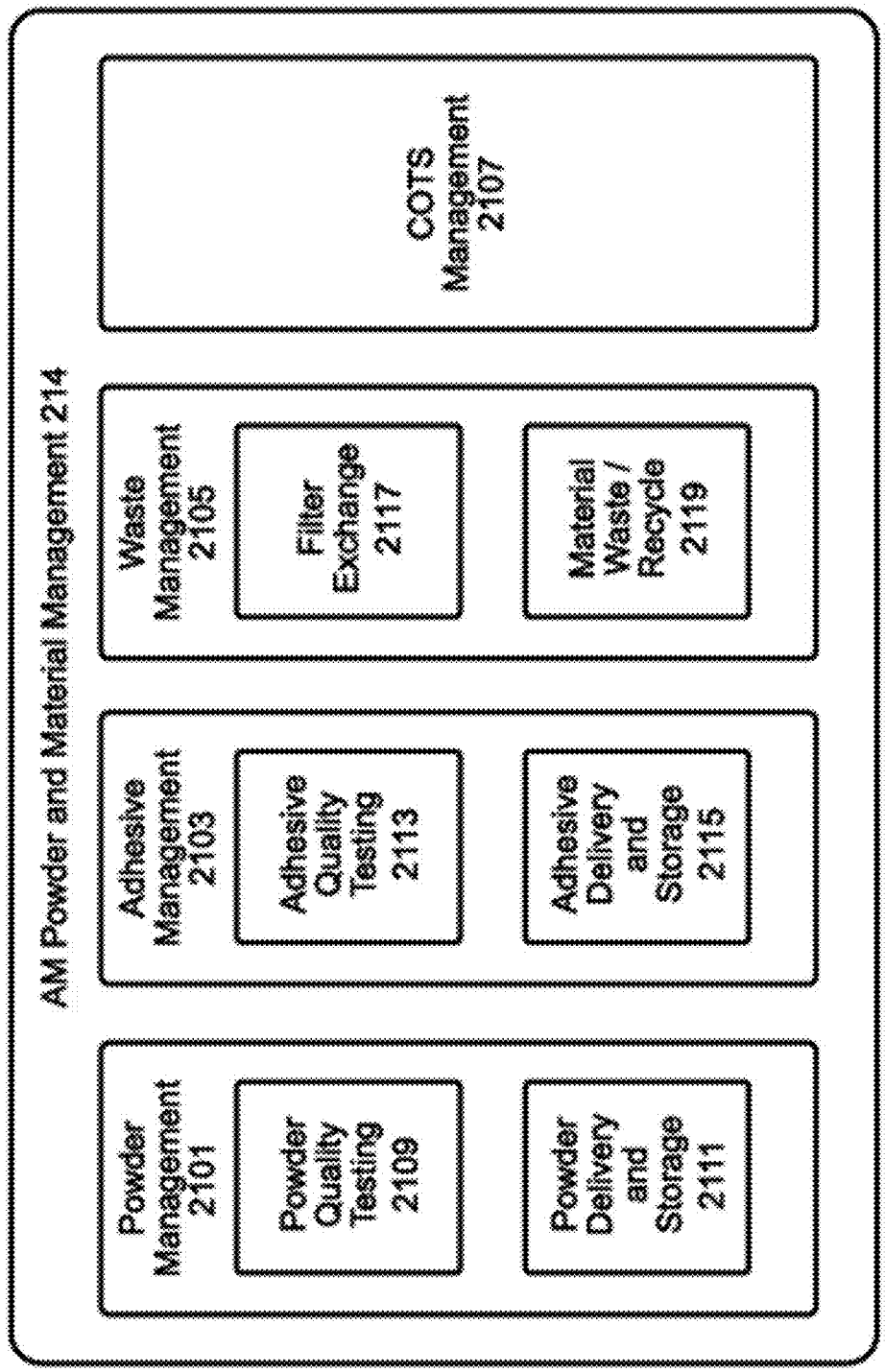
FIG. 21 illustrates further details of an AM powder and material management module in accordance with an aspect of the present disclosure.

FIG. 21 illustrates further details of an AM powder and material management module 214 in accordance with an aspect of the present disclosure.

AM powder and material management module 214 can include a powder management module 2101, an adhesive management module 2103, a waste management module 2105, and a COTS management module 2107. Powder management module 2101 can include a powder quality testing module 2109 and a powder delivery and storage module 2111. Adhesive management module 2103 can include an adhesive quality testing module 2113 and an adhesive delivery and storage module 2115. Waste management module 2105 an include a filter exchange module 2117 and a material waste/recycle module 2119.

Powder Management Module 2101

Powder management module 2101 can manage the testing, storage, and delivery of powder and other feedstock for 3D printers used in manufacturing parts for assembly. The inputs for powder management module 2101 can include virgin and used powders, recycling of supports back into useable stock, and newly received powders in stock. The outputs for powder management module 2101 can include feedstock for AM operations.

Adhesive Management Module 2103

Adhesive management module 2103 can provide information on storage of adhesives under suitable conditions, e.g., temperature control, refrigeration, etc., and can supply the adhesives to the robotic assembly cell, .e.g., retention adhesives, structural adhesives, amount to be dispensed, etc., for loading into purpose-designed dispensing systems for application to the part bond lines.

Adhesive management module 2103 manages the dosages, applications, and types of adhesives used in an assembly cell or robot, as well as the curing of the adhesives once applied. Adhesive management module 2103 may also control the waste of adhesives used and manage the waste per applicable regulatory standards. The inputs to adhesive management module 2103 can include the adhesives that are delivered to the robotic assembly cell (type of adhesive, amount, usage rate, etc.) for part bonding. The outputs for adhesive management module 2103 can include the rates of adhesive supplied for assembly cell operation.

Waste Management Module 2105

Waste management module 2105 can manage waste/recyclable materials generated by APS 200. Waste management module 2105 may manage waste generated by factory processes such as filters, exposed powder, supports, coating rinse material, used bath material, neutralizers, exposed adhesive in nozzle, off-gassing, machining chips, used tumbling media and waste water, as well as other waste materials. The inputs for waste management module 2105 can include all waste requiring disposal, remediation, or recycling. The outputs for waste management module 2105 can include data related to waste, including reports addressing proper waste disposal in compliance with all regulatory requirements.

COTS Management Module 2107

COTS management module 2107 can manage COTS requirements for manufacture subsystem 203. For example, COTS management module 2107 can include an inventory of COTS parts. These COTS parts can be delivered to assembly manufacturing module 215 as needed to be assembled in a multi-material assembly. Inputs to COTS management module 2107 can include COTS requirements for assemblies. Outputs of COTS management module 2107 can include COTS parts for assembly by assembly manufacturing module 215.

Powder Quality Testing Module 2109

Powder quality testing module 2109 can provide powder testing, for example, checking each critical to quality (CTQ) parameter, e.g. powder flow rate, humidity, chemistry, etc. Powder quality testing module 2109 may confirm the type and quality of material delivered and introduced into the central powder handling and distribution system that maintains powder within defined control limits for a plurality of AM systems. Powder quality testing module 2109 may confirm and inspect the powder periodically and/or randomly at various intervals based on usage and environmental variables such as powder life/degradation models.

The inputs for powder quality testing module 2109 can include as-received powder with vendor certification and tests and used powder cycling within the system(s) to be verified for continued use. The outputs for powder quality testing module 2109 can include approved powder/feedstock for use in the AM systems that are part of APS 200.

Powder Delivery and Storage Module 2111

Powder delivery and storage module 2111 can provide data on storage and delivery of powder and other feedstock for 3D printers. Powder delivery and storage module 2111 may provide instructions and locations of approved powder that is stored in a location per safety regulations, e.g., reactivity, pyrophoricity, etc., that may be unique to each powder. Powder delivery and storage module 2111 may also introduce approved powder into the central powder handling and distribution system. The inputs to powder delivery and storage 2111 can include powder/feedstock deliveries and suitably storage instructions and validation and acceptance criteria and instructions. The outputs for powder delivery and storage module 2111 can include powder/feedstock being supplied to the AM systems per demand requirements of factory management tools such as ERP 2001 and QMS 2005.

Adhesive Quality Testing Module 2113

Adhesive quality testing module 2113 can test adhesives that are in stock to ensure quality requirements of the adhesives have been satisfied. Various quality measures can be implemented to verify that the adhesives are of sufficient quality to be used within the APS 200, such as curing profile, lap shears, and other testing techniques. The inputs for adhesive quality testing module 2113 can include adhesives in stock requiring evaluation and confirmation. The outputs for adhesive quality testing module 2113 can include those adhesives in stock that have been confirmed for use in APS 200.

Adhesive Delivery and Storage Module 2115

Adhesive delivery and storage module 2115 can provide tracking for the storage and deliver of adhesives to the robot assembly cells. Adhesive delivery and storage module 2115 provides data on approved adhesives, e.g., storage location, delivery status, safety regulations, environmental control requirements, etc., until demand at point of use reaches a threshold such that additional adhesive material may be needed to complete assembly operations. The inputs for adhesive delivery and storage module 2115 can include data that a given adhesive has been delivered and suitably stored upon validation and acceptance. The outputs for adhesive delivery and storage module 2115 can include data related to a given adhesive being supplied to the robotic cell systems per demand requirement of factory management tools such as ERP 2001 and QMS 2005.

Filter Exchange Module 2117

Filter exchange module 2117 can manage filter requirements for 3D printers that require filters, such as powder bed fusion printers. Filter exchange module 2117 can monitor filters that require operation within a certain range of cleanliness to assure process stability across a wide range of parameters.

The inputs for filter exchange module 2117 can include filters requiring exchange or replacement. The outputs for filter exchange 2117 can include filters meeting backpressure requirement, filters in stock, and filters to be ordered for upcoming use.

Material Waste/Recycle Module 2119

Material waste/recycle module 2119 can receive waste and/or recyclable material from various modules in manufacture 203 and process the materials for disposal and/or recycling. Material waste/recycle module 2119 can manage waste/recyclable functions such as support material recycling, ball milling of supports, regeneration of electropolishing waste, reclamation of filter material, etc. Material waste/recycle module 2119 may also mange phase change recycling or disposal, e.g., solid recyclables converted to liquid, re-plating metal out of solution or other recycling or disposal processes. The inputs for material waste/recycle module 2119 can include various waste streams that are candidates for recycling. The outputs for material waste/recycle module 2119 can include recycled material that can be converted back into feedstock for APS 200.

Figure 22:
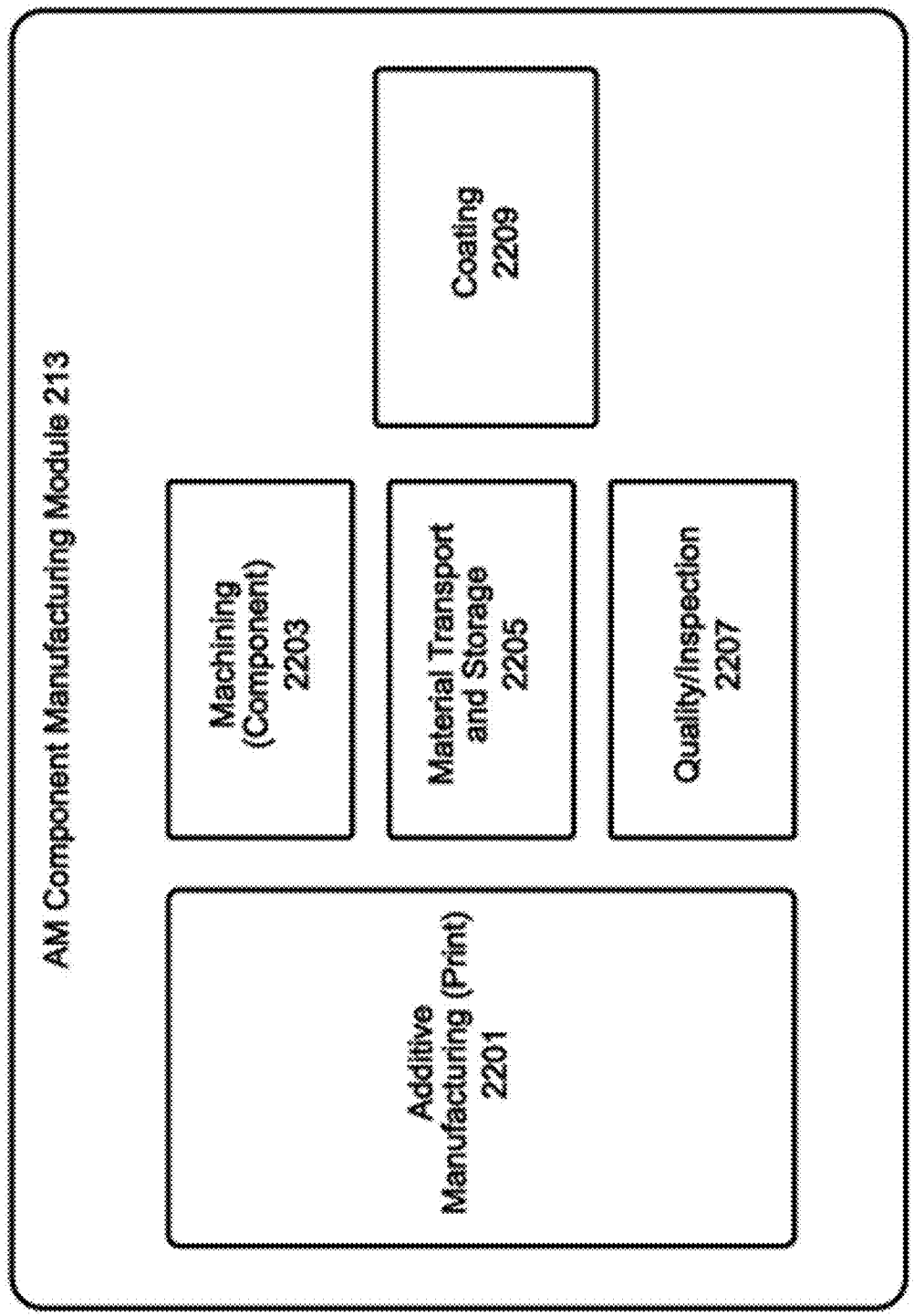
FIG. 22 illustrates further details of an AM component manufacturing module in accordance with an aspect of the present disclosure.

FIG. 22 illustrates further details of AM component manufacturing module 213 in accordance with an aspect of the present disclosure.

AM component manufacturing module 213 can include an additive manufacturing (print) module 2201, a machining (component) module 2203, a material transport and storage module 2205, a quality/inspection module 2207, and a coating module 2209.

Additive Manufacturing (Print) Module 2201

Additive manufacturing (print) module 2201 can manage and operate 3D printers and post-processing machinery to additively manufacture parts. Additive manufacturing (print) module 2201 may track or print completed parts or parts used for assemblies to be assembled by assembly manufacturing module 215. Additive manufacturing (print) module 2201 can manage the AM process chain from feedstock to semi-finished or finished output, excluding machining and assembly operations if applicable to the component under consideration. The inputs for additive manufacturing (print) module 2201 can include powder and/or feedstock for the 3D printers, etc. The outputs for additive manufacturing (print) module 2201 can include 3D printed parts.

Machining (Component) Module 2203

Machining (component) module 2203 can manage conventional subtractive methods, most generally involving CNC cutting and drilling tools. Machining (component) module 2203 may also manage other methods such as EDM depending on material involved to machine 3D printed parts. The inputs for Machining (component) module 2203 can include semi-finished or finished parts, with or without tumbled surfaces. The outputs for Machining (component) module 2203 can include finished machined components.

Material Transport and Storage Module 2205

Material transport and storage module 2205 can manage and track component movement within facility from station to station, including temporary stock locations, as governed by work instructions/traveler. Material transport and storage module 2205 may include extra-facility transport if any outsourced processes are used. Material transport and storage module 2205 can include quality hold/quarantine areas, parts or material that require rework/repair, etc., to complete processing. The inputs for material transport and storage module 2205 can include the location of components requiring movement within facility from station to station to complete processing or assembly. The outputs for material transport and storage module 2205 can include completed processing of parts or material and delivery to final inventory location.

Quality/Inspection Module 2207

Quality/Inspection module 2207 can manage and track those parts requiring quality testing to validate suitability of those parts. Quality/Inspection module 2207 may be employed to avoid investing time and manufacturing resources in unusable hardware. Quality tests can be performed at a frequency informed by process capability and nature of defects. The inputs for Quality/Inspection module 2207 can include parts that require quality testing. The outputs for Quality/Inspection module 2207 can include inspected parts that have passed quality testing and parts that require rework, repair, or return to the manufacturer.

Coating Module 2209

Coating Module 2209 may manage and track parts that may be coated during the manufacturing process. Coatings may be applied to meet a wide variety of characteristics but most commonly for tribological, corrosion, or aesthetic purposes. Coating Module 2209 may manage the selection of suitable coatings based on application requirements and with consideration of the substrate performance. Besides e-coating, anodizing, self-assembled monolayer, paints, organic coatings and others are possible. The inputs for coating module 2209 can include parts requiring coating. The outputs for coating module 2209 can include parts that have been successfully coated, and the amount of coating that has been used, is in stock, or needs to be ordered.

FIG. 23 illustrates further details of an AM print module 2201 in accordance with an aspect of the present disclosure.

Additive manufacturing (print) module 2201 can include, inter alia, build cylinder re-merge module 2301, build plate/cylinder preheat module 2203, printing module 2305, build package unmerge module 2307, build package cooldown module 2309, powder recovery module 2311, automated build plate separation module 2313, build plate resurface (CNC) module 2315, build plate shot peen module 2317, heat treat module 2319, support removal module 2321, and surface treatment module 2323.

Build Cylinder Re-Merge Module 2301

Build cylinder re-merge module 2301 can include specialized equipment that can mechanically interlock and seal a build plate package to the build cylinder to form an overall build package. Build cylinder re-merge module 2301 may construct a build package, which may be a hermetic vessel to surround a completed build with unmelted powder. Build cylinder re-merge module 2301 may further add a sealing element for the top surface, such as a lid to preclude powder contamination, inadvertent spilling of loose powder, exposure to atmosphere, etc. The inputs for build cylinder re-merge module 2301 can include an assembled build plate package [this may be automated] and a suitably prepared build cylinder. The outputs for build cylinder re-merge module 2301 can include a fully merged assembly for installation within a printer and associated processing.

Build Plate/Cylinder Preheat Module 2303

Build plate/cylinder preheat module 2303 can include instructions for preheating of the build plate/cylinder. Each material being manufactured has a specific plate preheat that is integral to the parameter settings and other machine settings. Build plate/cylinder preheat module 2303 may also maintain a preheat temperature during AM processing within an allowed range of variation to ensure consistency across the build volume. Build plate/cylinder preheat module 2303 may also monitor and control plate preheating to improve for overall factory cycle time and utilization by occurring at a specialized set of stations outside of the printers, which may be a function of machine use time value vs cost of separate station, total mass being preheated, preheat temperature delta to ambient conditions, etc. The inputs for build plate/cylinder preheat module 2303 can include material-specific preheat setting. The outputs for build plate/cylinder preheat module 2303 can include preheat temperature maintained throughout the build job.

Printing Module 2305

Printing module 2305 can monitor and track the manufacture of parts, including 3D printing parts. Printing module 2305 may monitor and control different AM processes having slightly different process chains, which entails monitoring and controlling a layer-by-layer manufacturing process. Each layer is monitored by printing module 2305 for a set of quality characteristics. Printing module 2305 may monitor layers in an open loop or a closed loop process, and may involve balancing stopping a build in a partial state or allowing it to run to completion for ex situ verification of potential defect(s) or intervening when process issues are identified. The inputs for printing module 2305 can include feedstock, process gas, a build file with associated parameters and machine settings to achieve a set of engineering requirements (material performance, dimensional, other function such as heat exchanging or flow capacity, etc.). The outputs for printing module 2305 can include as-printed parts, process waste (filters, gas, oversize powder).

Build Package Unmerge Module 2307

Build package unmerge module 2307 may monitor and control equipment that mechanically separates the build package into constituents for subsequent processes. The inputs for build package unmerge module 2307 can include a clean build package. The outputs for build package unmerge module 2307 can include an assembled build plate package with part(s) included and a used build cylinder.

Build Package Cooldown Module 2309

Build package cooldown module 2309 may include monitoring and control of the cooling of a build package. Build package cooldown module 2309 may monitor and control the overall build package, which may include the external cylinder and the plate package. The build plate package may include the plate plus mated plates containing heating and/or cooling elements. Build package cooldown module 2309 may monitor and control sensors in the build package for various purposes, such as temperature monitoring. Extra hardware may be included such that the printer operations would not be limited by cooldown time, which may involve stations in the AM portion of the factory. The inputs for build package cooldown module 2309 can include build package(s) at temperatures not suitable for subsequent safe handling. The outputs for build package cooldown module 2309 can include build package(s) at temperatures suitable for subsequent safe handling.

Powder Recovery Module 2311

Powder recovery module 2311 can include monitoring and control of the recovery of powder in 3D printing processes in APS 200 that utilize powder. Powder recovery module 2311 may recovery powder by draining under agitation, which may include high and low frequency agitation, continuously varying the part attitude, or include a detailed cleaning at a build plate level on a separate piece of equipment. The rotation of the part may proceed in at least one axis, and preferably three axes to facilitate removal from complex internal passages. The inputs for powder recovery module 2311 can include build package contaminated with powder. The outputs for powder recovery module 2311 can include clean build package.

Automated Build Plate Separation Module 2313

Automated build plate separation module 2313 can include monitoring and control of separating the parts from the build plate. For aluminum alloys, generally mechanical cutting methods can be used, and for other materials, other strategies may be more economical, such as electro-discharge machining. Automated build plate separation module 2313 can include monitoring and control of build plate separation at the assembly cell or individual robot levels, and may also include QC features, dedicated cutting robots, or other monitoring and control processes. The inputs for automated build plate separation module 2313 can include build plate with parts attached by supports. The outputs for automated build plate separation module 2313 can include build plate requiring resurfacing due to residual supports on semi-finished parts with supports that remain attached.

Build Plate Resurface (CNC) Module 2315

Build plate resurface (CNC) module 2315 can include monitoring and control of surface grinding or machining (milling) of the build plate. Build plate resurface (CNC) module 2315 can include monitoring and control of various techniques, e.g., grinding may be less preferable than machining for aluminum due to dressing intervals for grinding stones as aluminum is relatively soft material. Build plate resurface (CNC) module 2315 can include monitoring and control of standardized methods that may be adequate at various steps in the manufacturing process, however, unique methods such as laser ablation could be considered if economics are supported for a particular material or process in the assembly process. The inputs for build plate resurface (CNC) module 2315 can include build plate requiring resurfacing due to residual supports (or scrap if too thin). The outputs for build plate resurface (CNC) module 2315 can include build plate within thickness and flatness/finish requirement or requiring subsequent roughening to promote adherence of first layer.

Build Plate Shot Peen Module 2317

Build plate shot peen module 2317 can include monitoring and control of shot peening or bead blasting to roughen the plate surface. Shot peening or bead blasting of the plate surface may promote superior attachment of supports to the plate surface. Build plate shot peen module 2317 may change the parameters of plate surface roughness for AM materials that may be printable without plate surface roughening. For example, and not by way of limitation, some materials, such as titanium, can solidly attached to the plate and be subsequently removed without roughening of the plate surface, while others require a rougher plate surface to adhere properly during the printing process. The inputs for build plate shot peen module 2317 can include build plate within thickness and flatness/finish requirement or requiring subsequent roughening to promote adherence of first layer. The outputs for build plate shot peen module 2317 can include the build plate readiness to use for next job.

Heat Treat Module 2319

Heat treat module 2319 can include monitoring and control of heat treating of the build package. Heat treat module 2319 can include monitoring and control of stress relief of residual stresses such that part distortion prior to separation from plate is reduced. Heat treat module 2319 can include monitoring and control of the heat treatment of a particular part to achieve desired set of mechanical properties and associated microstructure, e.g. precipitation hardening heat treatment, aging, etc. The inputs for heat treat module 2319 can include build package or components requiring thermal treatment. The outputs for heat treat module 2319 can include thermally treated/stress relieved assemblies or component.

Support Removal Module 2321

Support removal module 2321 can include monitoring and control of the support removal process from parts meeting a desired finish criteria. Support removal module 2321 can include monitoring and control of parts that require additional material removal, as well as monitoring and control of parts that are ready for subsequent processing or delivery. Support removal module 2321 can include monitoring and control of various mechanical means, including use of powered or unpowered hand tools, thermal energy methods, or electrochemical methods such as electropolishing. The inputs for support removal module 2321 can include semi-finished parts with supports attached. The outputs for support removal module 2321 can include semi-finished or finished parts with little/no supports.

Surface Treatment Module 2323

Surface treatment module 2323 can include monitoring and control of the surface treatment of semi-finished or finished parts. Surface treatment module 2323 can include monitoring and control of parts having various surface finishes, such as uniformity of finish, smoothness, comparison between upskin and downskin surfaces, supported and unsupported regions, etc. Surface treatment module 2323 can include monitoring and control of one or more processes, such as an abrasive process using media in a wetted condition to remove rough areas over minutes or hours, and may be performed before machining and possibly in combination with other finishing processes such as chemical or other mechanical/abrasive processes. The inputs for surface treatment module 2323 can include semi-finished or finished parts with little/no supports. The outputs for surface treatment (tumble) [mass media finishing] module 2323 can include semi-finished or finished parts with tumbled surfaces.

Figure 24:
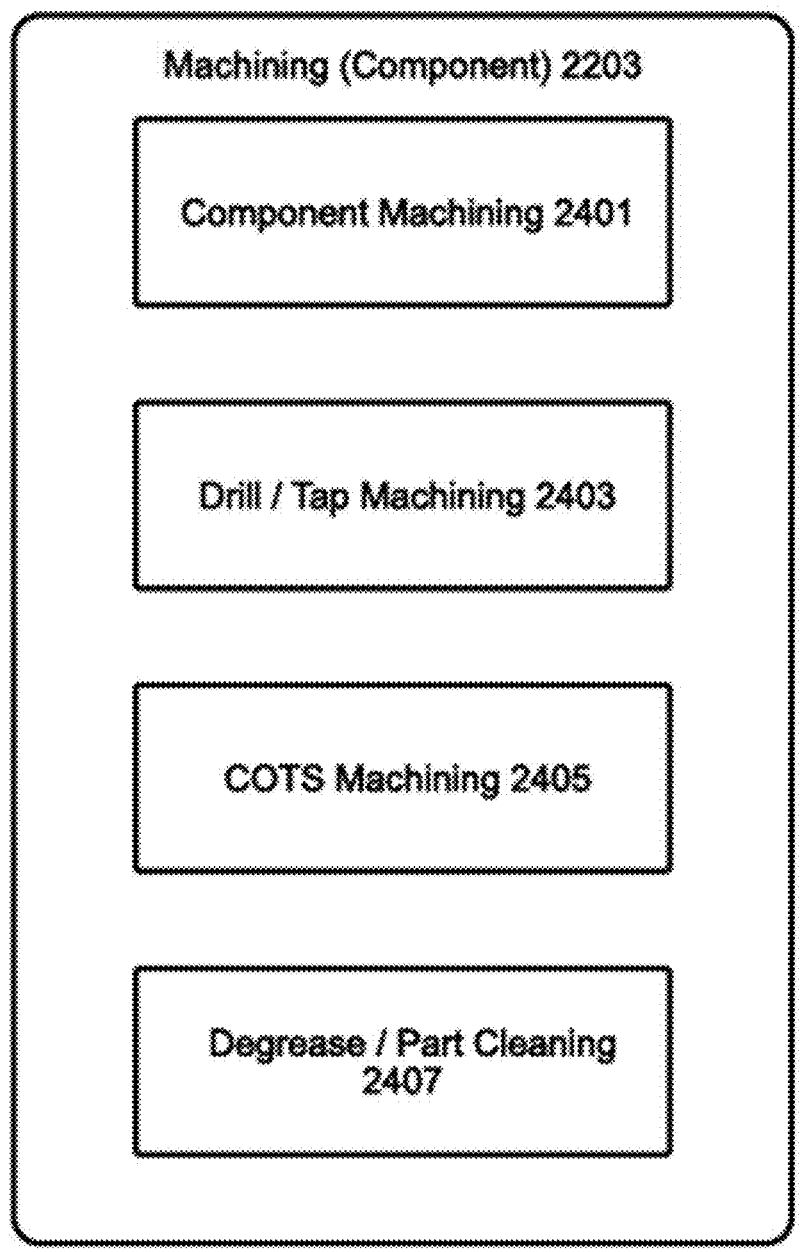
FIG. 24 illustrates further details of machining (component) module in accordance with an aspect of the present disclosure.

FIG. 24 illustrates further details of machining (component) module 2203 in accordance with an aspect of the present disclosure.

Machining (component) module 2203 can include a component machining module 2401, a drill/tap machining module 2403, a COTS machining module 2405, and a degrease/part cleaning module 2407.

Component Machining Module 2401

Component machining module 2401 can include monitoring, control, and design of workholding considerations for complex components, fixtures for number of machining set-ups to address all required surfaces, and/or specialized workholding features. Component machining module 2401 can include monitoring, control, and design of component design to facilitate secure and accurate machining. The inputs for component machining module 2401 can include semi-finished or finished parts with or without tumbled surfaces. The outputs for component machining module 2401 can include the location and status of finished machined components.

Drill/Tap Machining Module 2403

Drill/tap machining module 2403 can include monitoring and control of laser drilling, hole popper/sinker, electrical discharge machining (EDM), chemical milling or any other methods used in APS 200. Drill/tap machining module 2403 can include monitoring and control of machining based on substrate. The inputs for drill/tap machining module 2403 can include semi-finished or finished parts with or without tumbled surfaces. The outputs for drill/tap machining module 2403 can include the location and status of finished machined components.

COTS Machining Module 2405

COTS machining module 2405 can include monitoring and control of the machining of COTS parts. COTS machining module 2405 may include the geometric requirements or parameters of various COTS parts. COTS machining module 2405 can monitor and control various features to facilitate subsequent processing and attachment within the assembly cell and/or multi-material structure. The inputs for COTS machining module 2405 can include semi-finished COTS components such as extrusions, castings, sheets, etc. The outputs for COTS machining module 2405 can include the location and status of finished machined COTS components.

Degrease/Part Cleaning Module 2407

Degrease/part cleaning module 2407 can include monitoring and control of the cleaning methods used within APS 200. Degrease/part cleaning module 2407 can include monitoring and control of solvents, surfactants, and processes used in cleaning parts, such as ultrasonic agitation, thermal application, dry ice blasting, material composition, etc. The inputs for degrease/part cleaning module 2407 can include contaminated components (AM, COTS) including machining chips, residual powder, cutting fluids and other lubricants, etc. The outputs for degrease/part cleaning module 2407 can include the location and status of parts clean within permissible limits of contamination for subsequent processing or delivery.

Figure 25:
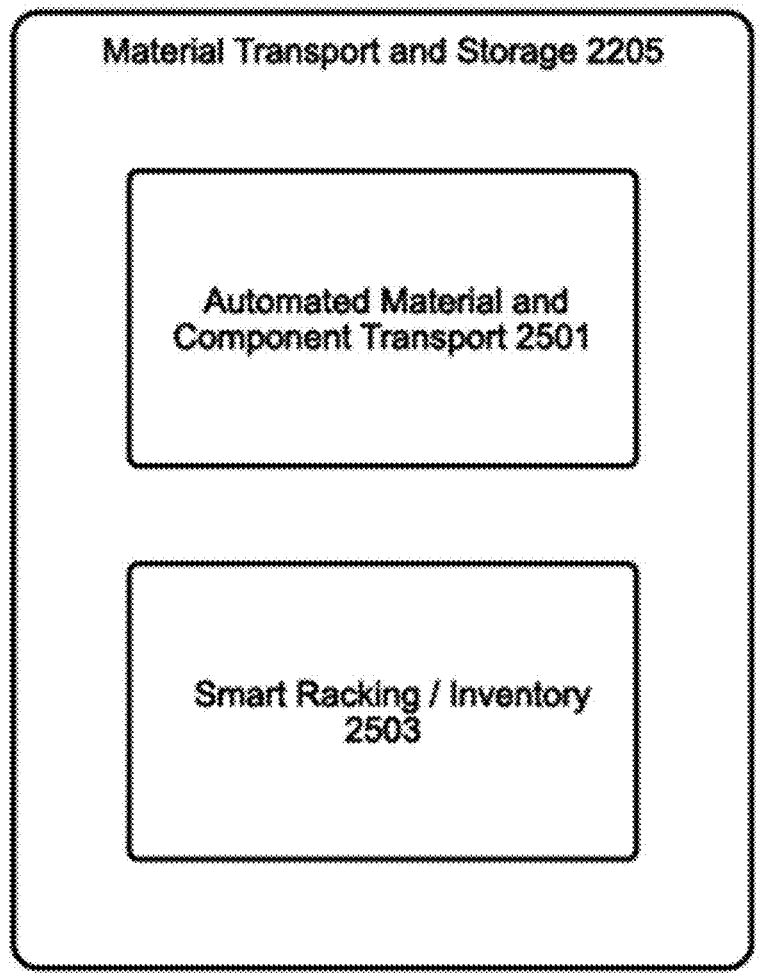
FIG. 25 illustrates further details of material transport and storage module in accordance with an aspect of the present disclosure.

FIG. 25 illustrates further details of material transport and storage module 2205 in accordance with an aspect of the present disclosure.

Material transport and storage module 2205 can include an automated material and component transport module 2501 and a smart racking/inventory module 2503.

Automated Material and Component Transport Module 2501

Automated material and component transport module 2501 can include monitoring and control of the AGVs and robotic carts, conveyors, gantry transport, etc., to transport materials and components to locations within the APS 200. The inputs for automated material and component transport module 2501 can include the location of components as components move within facility from station to station to complete assembly or part processing. The outputs for automated material and component transport module 2501 can include completed processing and delivery to final inventory location/delivery.

Smart Racking/Inventory Module 2503

Smart racking/inventory module 2503 can include monitoring and control of a warehousing and racking system. Smart racking/inventory module 2503 can include monitoring and control of part traceability after separation from the build plate and completion of the individual finishing operations required.

In an aspect of the present disclosure, smart racking/inventory module 2503 can include recognizing parts using a UID or visual based system and orient the part in a manner suitable for subsequent robotic pick-up. Smart racking/inventory module 2503 can facilitate proper orientation on the robotic assembly cell parts tables, which may decrease assembly times. The inputs for smart racking/inventory module 2503 can include parts with known processing history and traceability and features for orientation if applicable to the design. The outputs for smart racking/inventory module 2503 can include inventoried part for subsequent uses such as dispatch to customers, outside vendor services, and supply to other factory modules.

Figure 26:
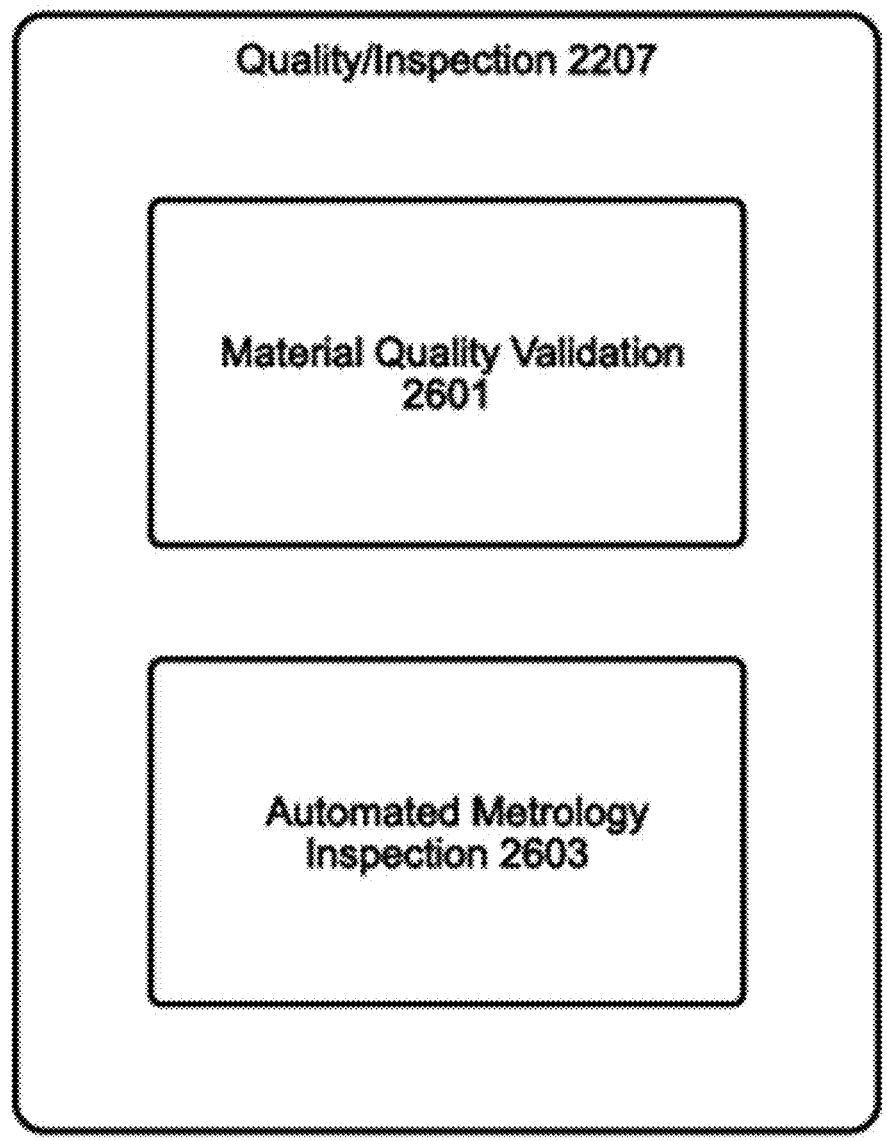
FIG. 26 illustrates further details of quality/inspection module in accordance with an aspect of the present disclosure.

FIG. 26 illustrates further details of quality/inspection module 2207 in accordance with an aspect of the present disclosure.

Quality/inspection module 2207 can include a material quality validation module 2601 and an automated metrology inspection module 2603.

Material Quality Validation Module 2601

Material quality validation module 2601 can include monitoring and control of various material validation tests at a range of levels. Material quality validation module 2601 can include monitoring and control of commonly performed quality tests, such as material composition, hardness, strength at temperatures ranges of interest, application relevant data, fatigue values, toughness, wettability, coating/material thicknesses, rheology, viscosity, flow, volumetric analysis, X-ray/CT of material powder, parts, adhesives, COTS, etc. The inputs for material quality validation module 2601 can include parts requiring material quality testing. The outputs for material quality validation module 2601 can include data related to inspected parts with validated material.

Automated Metrology Inspection Module 2603

Automated metrology inspection module 2603 can include monitoring and control of dimensional inspection of parts. Automated metrology inspection module 2603 can include monitoring and control of dimensional inspection performed using probing apparatus, structured light scans, etc. Dimensional inspection may be automated as part of the assembly process, e.g., by programming features on parts or subassemblies for inspection. The inputs for automated metrology inspection module 2603 can include part requiring metrological evaluation. The outputs for automated metrology inspection module 2603 can include validated part meeting target dimension (or quality rejected for applicable disposition).

Figure 27:
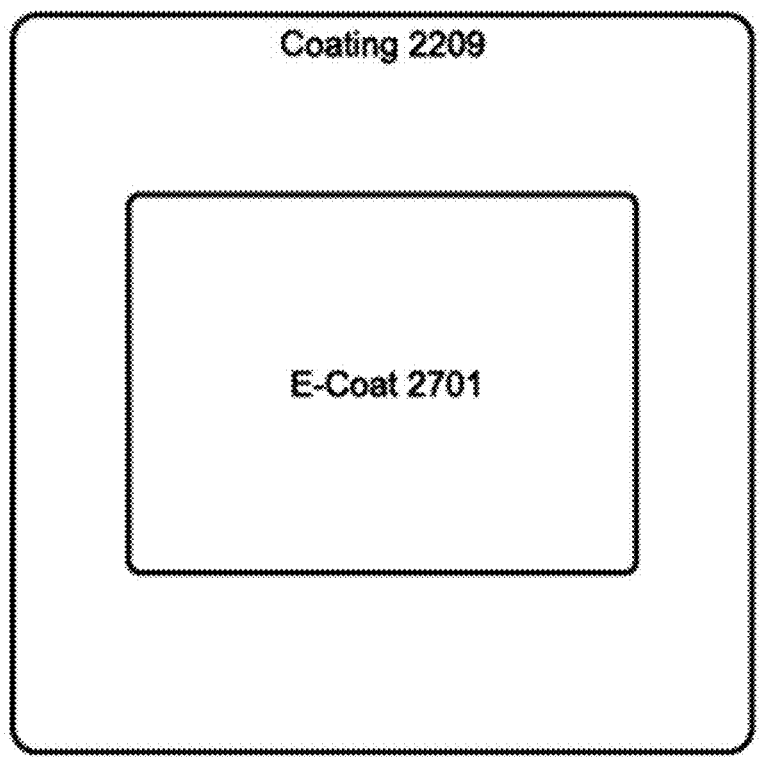
FIG. 27 illustrates further details of coating in accordance with an aspect of the present disclosure.

FIG. 27 illustrates further details of coating 2209 in accordance with an aspect of the present disclosure.

Coating 2209 can include an e-coat module 2701.

E-Coat Module 2701

E-Coat module 2701 can include monitoring and control of electrocoating of parts. E-Coat module 2701 can include monitoring and control of electrocoating or electroplating, which may be used as a corrosion protection to reduce environmental corrosion. E-Coat module 2701 can include monitoring and control of egress of the bath solution upon completion of the cycle, which may include throwing power to effectively coat internal complex features or specialized holding of the part, and may also monitor node level coating, subassembly level coating, or full assembly coating. The inputs for E-Coat module 2701 can include those parts or subassemblies that are to be electrocoated. The outputs for E-Coat module 2701 can include the location and status of those parts or subassemblies that are to be electrocoated.

FIGS. 28A-D illustrate respective side views of an exemplary 3-D printer system.

In this example, the 3-D printer system is a powder-bed fusion (PBF) system 2800. FIGS. 28A-D show PBF system 2800 during different stages of operation. The particular embodiment illustrated in FIGS. 28A-D is one of many suitable examples of a PBF system employing principles of this disclosure. It should also be noted that elements of FIGS. 28A-D and the other figures in this disclosure are not necessarily drawn to scale, but may be drawn larger or smaller for the purpose of better illustration of concepts described herein. PBF system 2800 can include a depositor 2801 that can deposit each layer of metal powder, an energy beam source 2803 that can generate an energy beam, a deflector 2805 that can apply the energy beam to fuse the powder material, and a build plate 2807 that can support one or more build pieces, such as a build piece 2809. Although the terms "fuse" and/or "fusing" are used to describe the mechanical coupling of the powder particles, other mechanical actions, e.g., sintering, melting, and/or other electrical, mechanical, electromechanical, electrochemical, and/or other chemical coupling methods are envisioned as being within the scope of the present disclosure.

PBF system 2800 can also include a build floor 2811 positioned within a powder bed receptacle. The walls of the powder bed receptacle 2812 generally define the boundaries of the powder bed receptacle, which is sandwiched between the walls 2812 from the side and abuts a portion of the build floor 2811 below. Build floor 2811 can progressively lower build plate 2807 so that depositor 2801 can deposit a next layer. The entire mechanism may reside in a chamber 2813 that can enclose the other components, thereby protecting the equipment, enabling atmospheric and temperature regulation and mitigating contamination risks. Depositor 2801 can include a hopper 2815 that contains a powder 2817, such as a metal powder, and a leveler 2819 that can level the top of each layer of deposited powder.

Figure 28A:
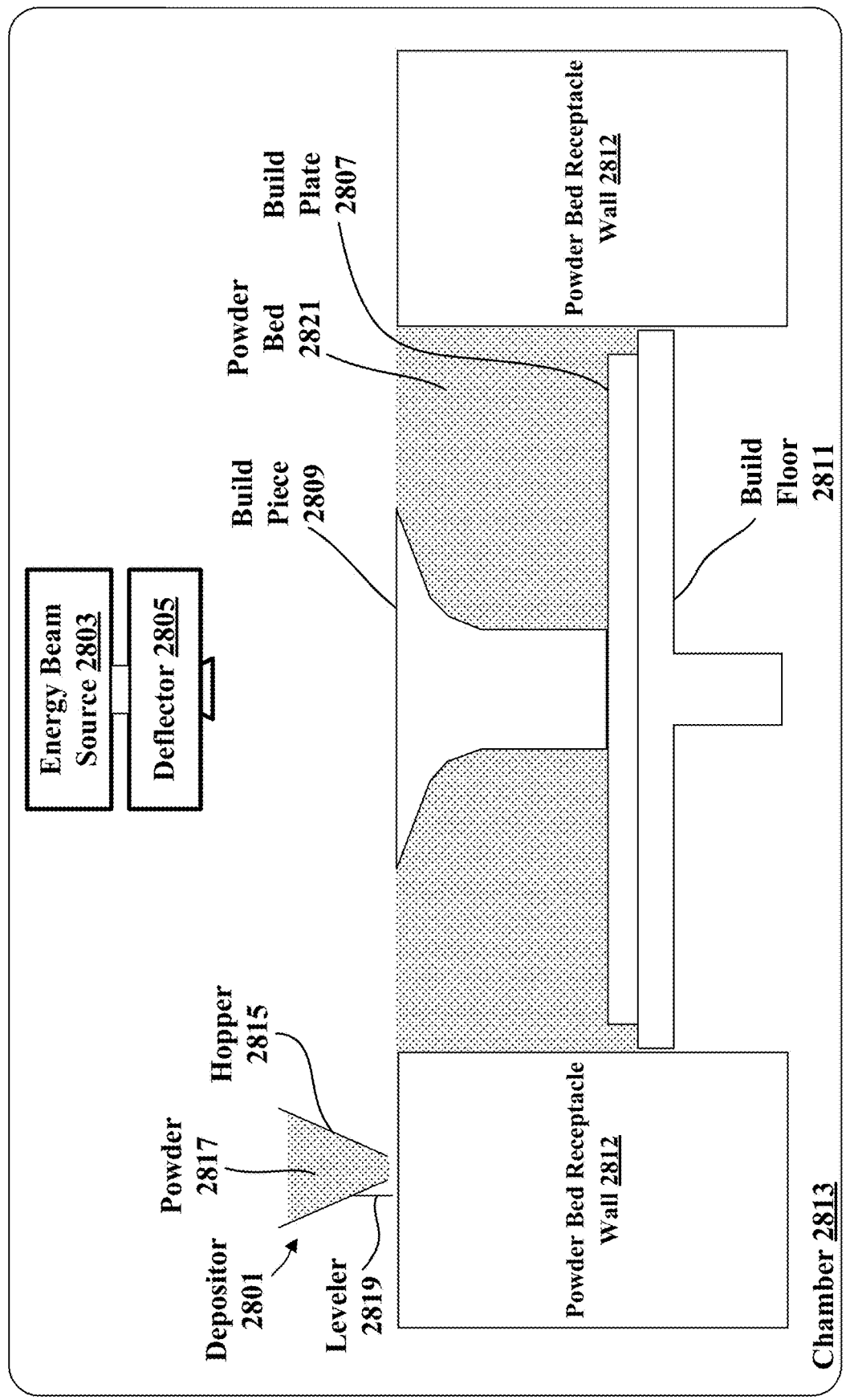
FIGS. 28A-28D illustrate respective side views of a 3-D printer system in accordance with an aspect of the present disclosure.

Referring specifically to FIG. 28A, this figure shows PBF system 2800 after a slice of build piece 2809 has been fused, but before the next layer of powder has been deposited. In fact, FIG. 28A illustrates a time at which PBF system 2800 has already deposited and fused slices in multiple layers, e.g., 2850 layers, to form the current state of build piece 2809, e.g., formed of 2850 slices. The multiple layers already deposited have created a powder bed 2821, which includes powder that was deposited but not fused.

Figure 28B:
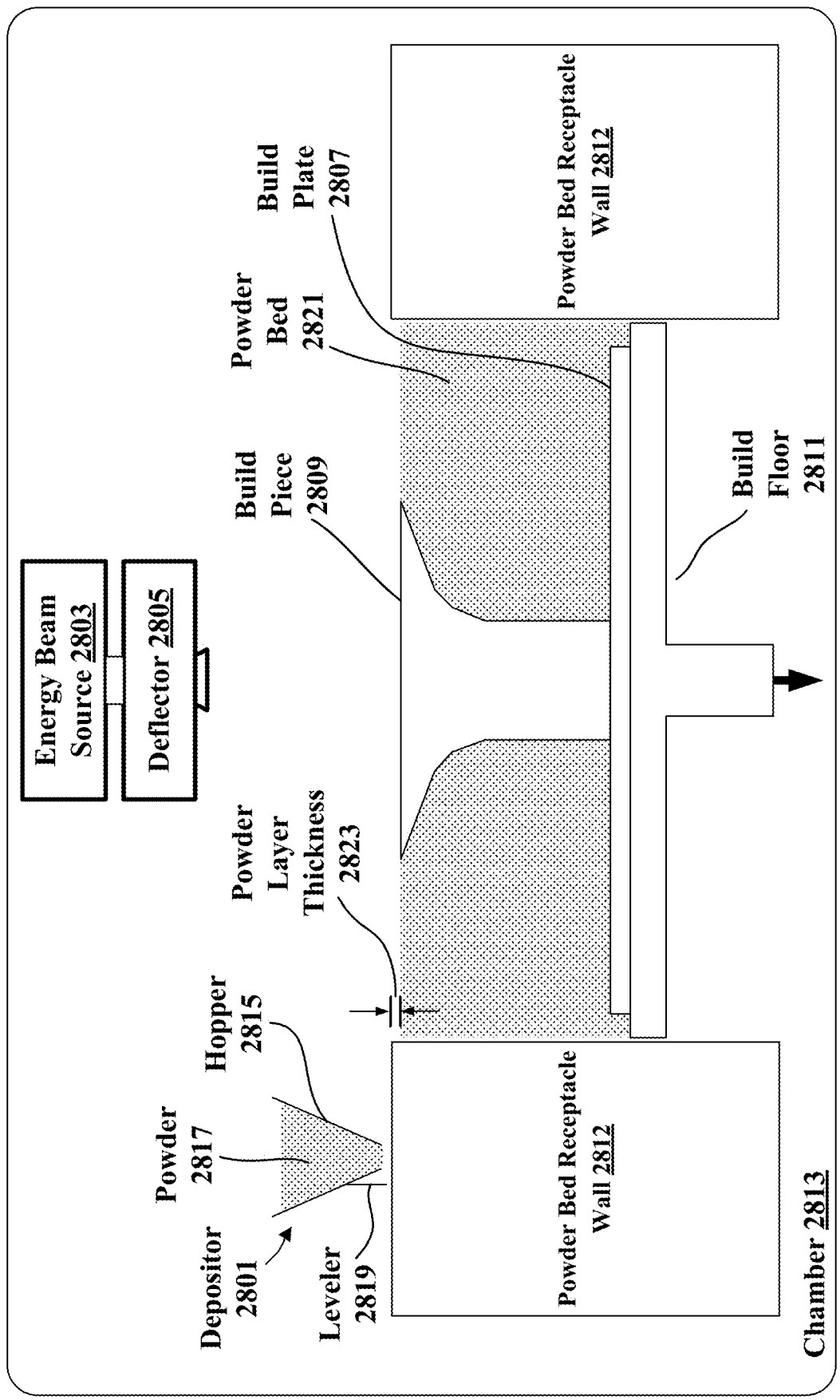

FIG. 28B shows PBF system 2800 at a stage in which build floor 2811 can lower by a powder layer thickness 2823. The lowering of build floor 2811 causes build piece 2809 and powder bed 2821 to drop by powder layer thickness 2823, so that the top of the build piece and powder bed are lower than the top of powder bed receptacle wall 2812 by an amount equal to the powder layer thickness. In this way, for example, a space with a consistent thickness equal to powder layer thickness 2823 can be created over the tops of build piece 2809 and powder bed 2821.

Figure 28C:
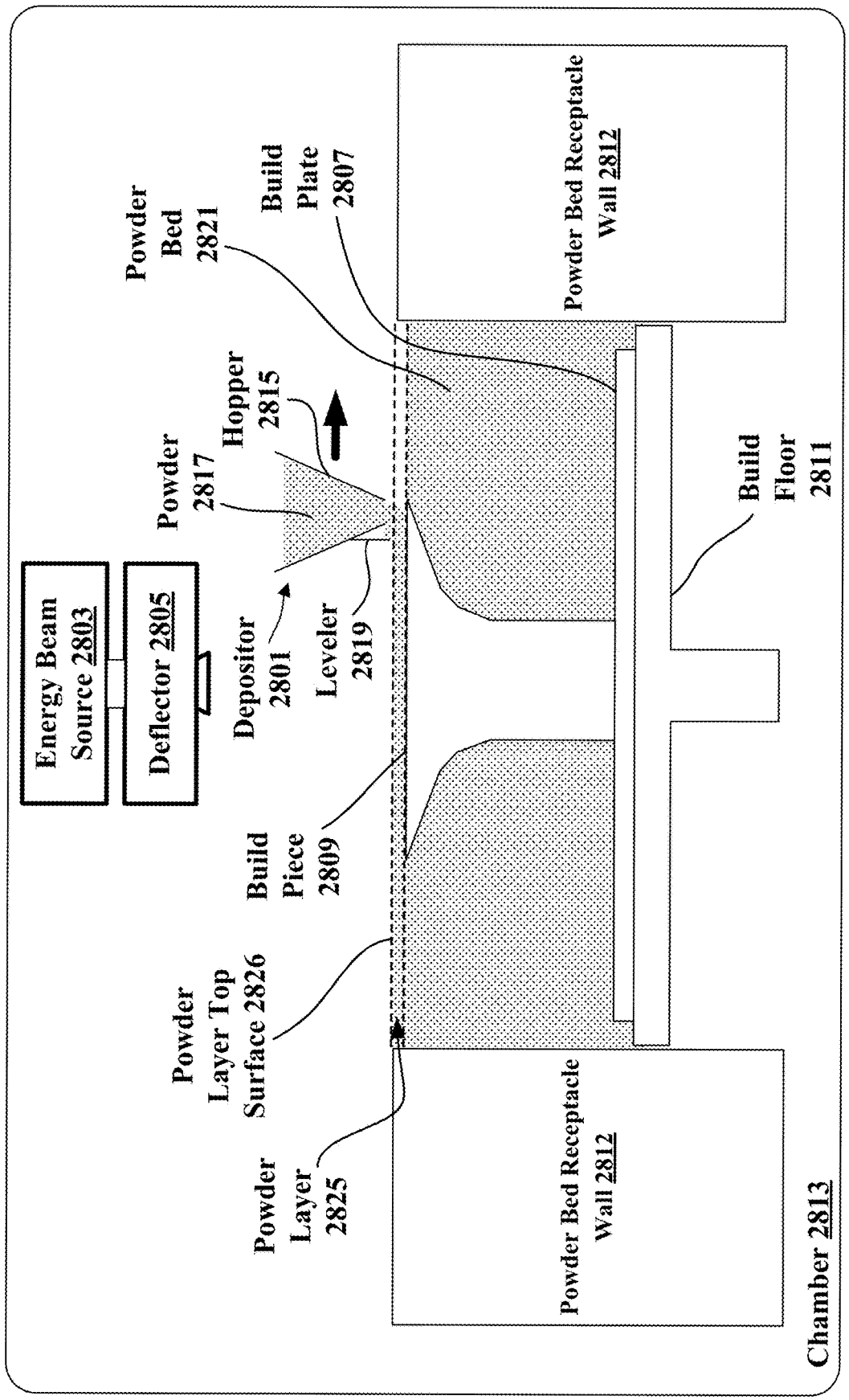

FIG. 28C shows PBF system 2800 at a stage in which depositor 2801 is positioned to deposit powder 2817 in a space created over the top surfaces of build piece 2809 and powder bed 2821 and bounded by powder bed receptacle walls 2812. In this example, depositor 2801 progressively moves over the defined space while releasing powder 2817 from hopper 2815. Leveler 2819 can level the released powder to form a powder layer 2825 that has a thickness, that is defined by the powder layer top surface 2826, and may be substantially equal to the powder layer thickness 2823 (see FIG. 1B). Thus, the powder in a PBF system can be supported by a powder material support structure, which can include, for example, a build plate 2807, a build floor 2811, a build piece 2809, walls 2812, and the like. It should be noted that the illustrated thickness of powder layer 2825 (i.e., powder layer thickness 2823 (FIG. 1B)) is greater than an actual thickness used for the example involving 2850 previously-deposited layers discussed above with reference to FIG. 28A.

Figure 28D:
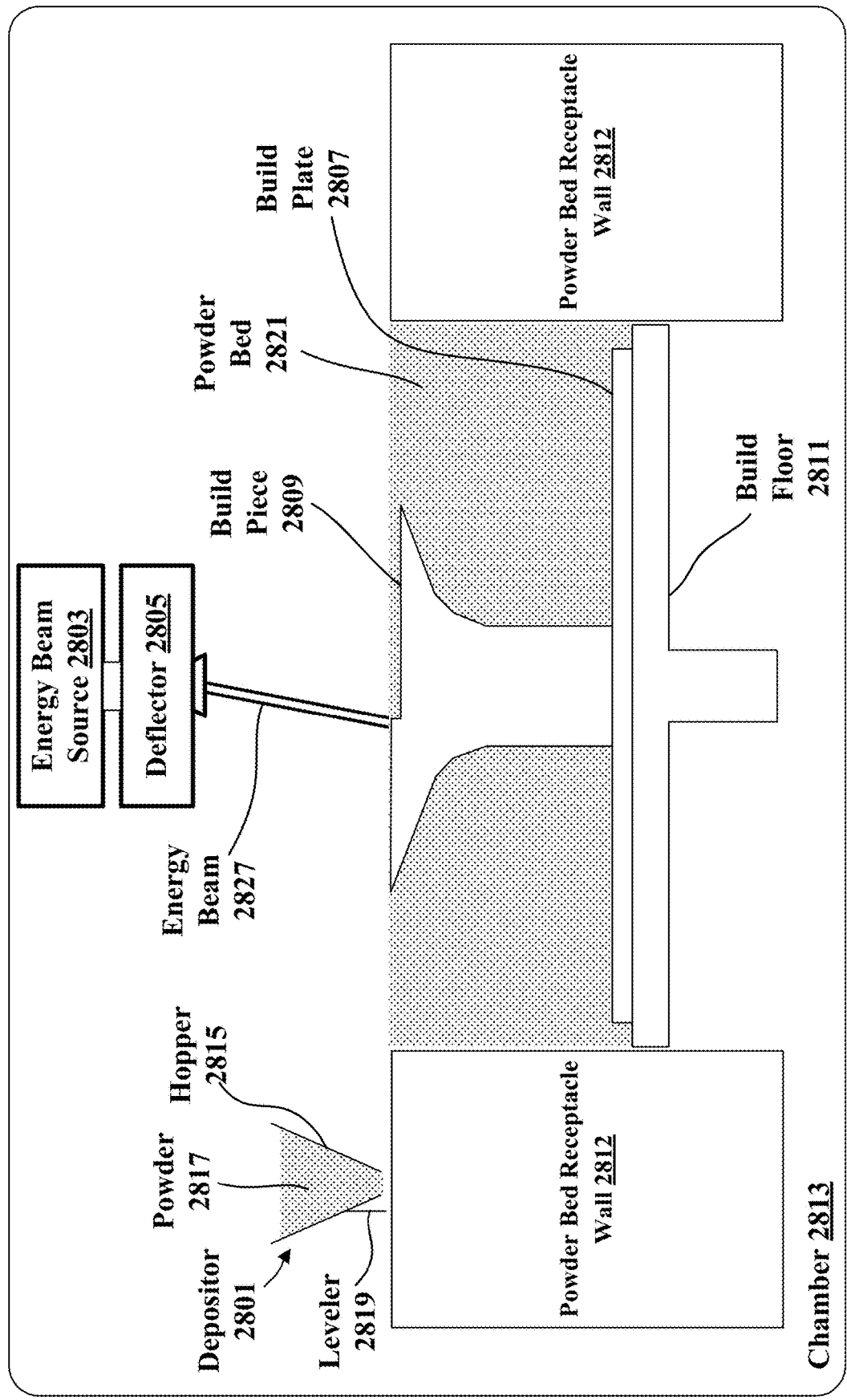

FIG. 28D shows PBF system 2800 at a stage in which, following the deposition of powder layer 2825 (FIG. 28C), energy beam source 2803 generates an energy beam 2827 and deflector 2805 applies the energy beam to fuse the next slice in build piece 2809. In various exemplary embodiments, energy beam source 2803 can be an electron beam source, in which case energy beam 2827 constitutes an electron beam. Deflector 2805 can include deflection plates that can generate an electric field or a magnetic field that selectively deflects the electron beam to cause the electron beam to scan across areas designated to be fused. In various embodiments, energy beam source 2803 can be a laser, in which case energy beam 2827 is a laser beam. Deflector

2805 can include an optical system that uses reflection and/or refraction to manipulate the laser beam to scan selected areas to be fused.

In various embodiments, the deflector 2805 can include one or more gimbals and actuators that can rotate and/or translate the energy beam source to position the energy beam. In various embodiments, energy beam source 2803 and/or deflector 2805 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 28E:
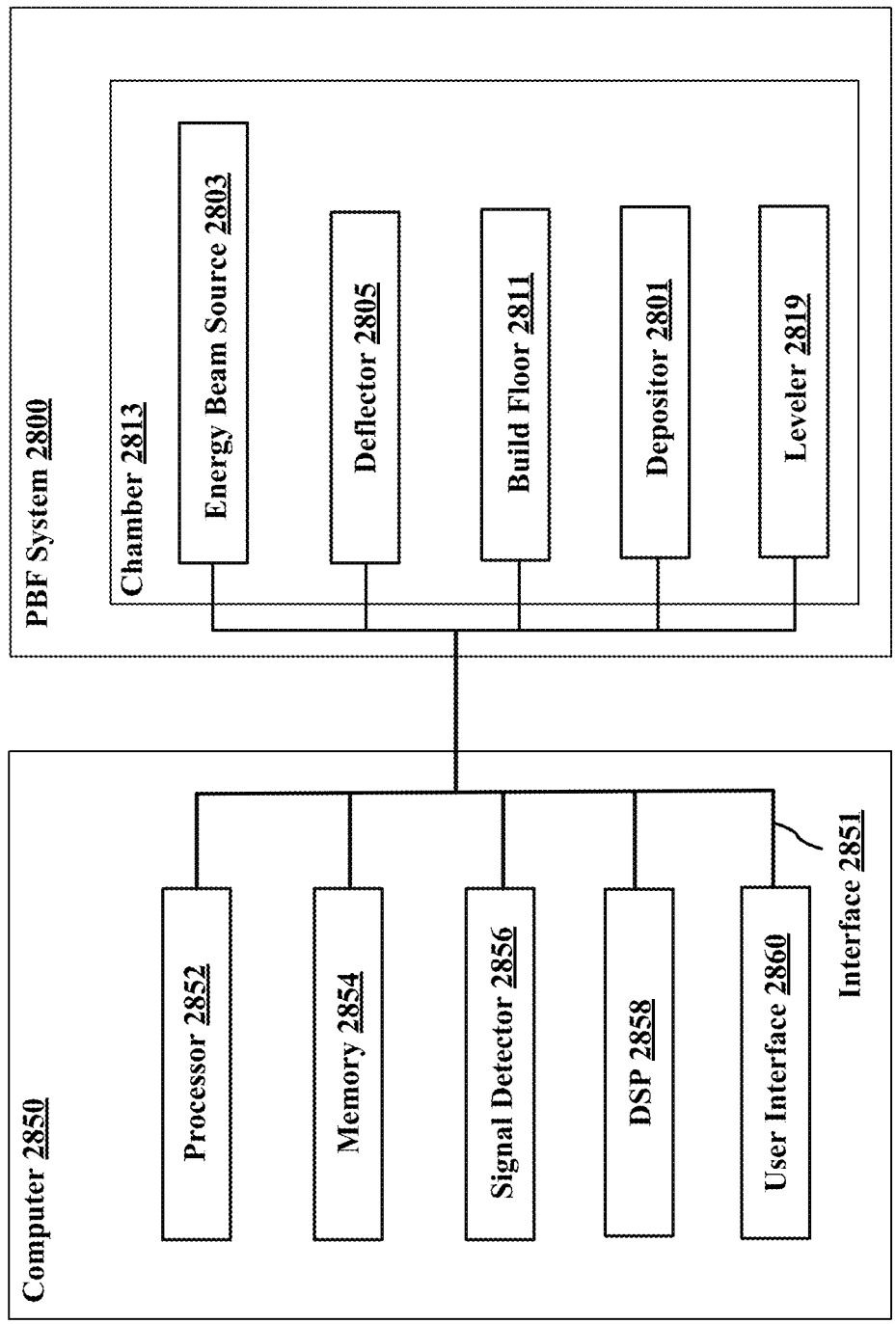
FIG. 28E illustrates a functional block diagram of a 3-D printer system in accordance with an aspect of the present disclosure.

FIG. 28E illustrates a functional block diagram of a 3-D printer system in accordance with an aspect of the present disclosure.

In an aspect of the present disclosure, control devices and/or elements, including computer software, may be coupled to PBF system 2800 to control one or more components within PBF system 2800. Such a device may be a computer 2850, which may include one or more components that may assist in the control of PBF system 2800. Computer 2850 may communicate with a PBF system 2800, and/or other AM systems, via one or more interfaces 2851. The computer 2850 and/or interface 2851 are examples of devices that may be configured to implement the various methods described herein, that may assist in controlling PBF system 2800 and/or other AM systems.

In an aspect of the present disclosure, computer 2850 may comprise at least one processor 2852, memory 2854, signal detector 2856, a digital signal processor (DSP) 2858, and one or more user interfaces 2860. Computer 2850 may include additional components without departing from the scope of the present disclosure.

Processor 2852 may assist in the control and/or operation of PBF system 2800. The processor 2852 may also be referred to as a central processing unit (CPU). Memory 2854, which may include both read-only memory (ROM) and random access memory (RAM), may provide instructions and/or data to the processor 2852. A portion of the memory 2854 may also include non-volatile random access memory (NVRAM). The processor 2852 typically performs logical and arithmetic operations based on program instructions stored within the memory 2854. The instructions in the memory 2854 may be executable (by the processor 2852, for example) to implement the methods described herein.

The processor 2852 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor 2852 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

Signal detector 2856 may be used to detect and quantify any level of signals received by the computer 2850 for use by the processor 2852 and/or other components of the computer 2850. The signal detector 2856 may detect such signals as energy beam source 2803 power, deflector 2805 position, build floor 2811 height, amount of powder 2817 remaining in depositor 2801, leveler 2819 position, and other signals. DSP 2858 may be used in processing signals received by the computer 2850. The DSP 2858 may be configured to generate instructions and/or packets of instructions for transmission to PBF system 2800.

The user interface 2860 may comprise a keypad, a pointing device, and/or a display. The user interface 2860 may include any element or component that conveys information to a user of the computer 2850 and/or receives input from the user.

The various components of the computer 2850 may be coupled together by interface 2851, which may include, e.g., a bus system. The interface 2851 may include a data bus, for example, as well as a power bus, a control signal bus, and a status signal bus in addition to the data bus. Components of the computer 2850 may be coupled together or accept or provide inputs to each other using some other mechanism.

Although a number of separate components are illustrated in FIG. 28E, one or more of the components may be combined or commonly implemented. For example, the processor 2852 may be used to implement not only the functionality described above with respect to the processor 2852, but also to implement the functionality described above with respect to the signal detector 2856, the DSP 2858, and/or the user interface 2860. Further, each of the components illustrated in FIG. 28E may be implemented using a plurality of separate elements.

Figure 29:
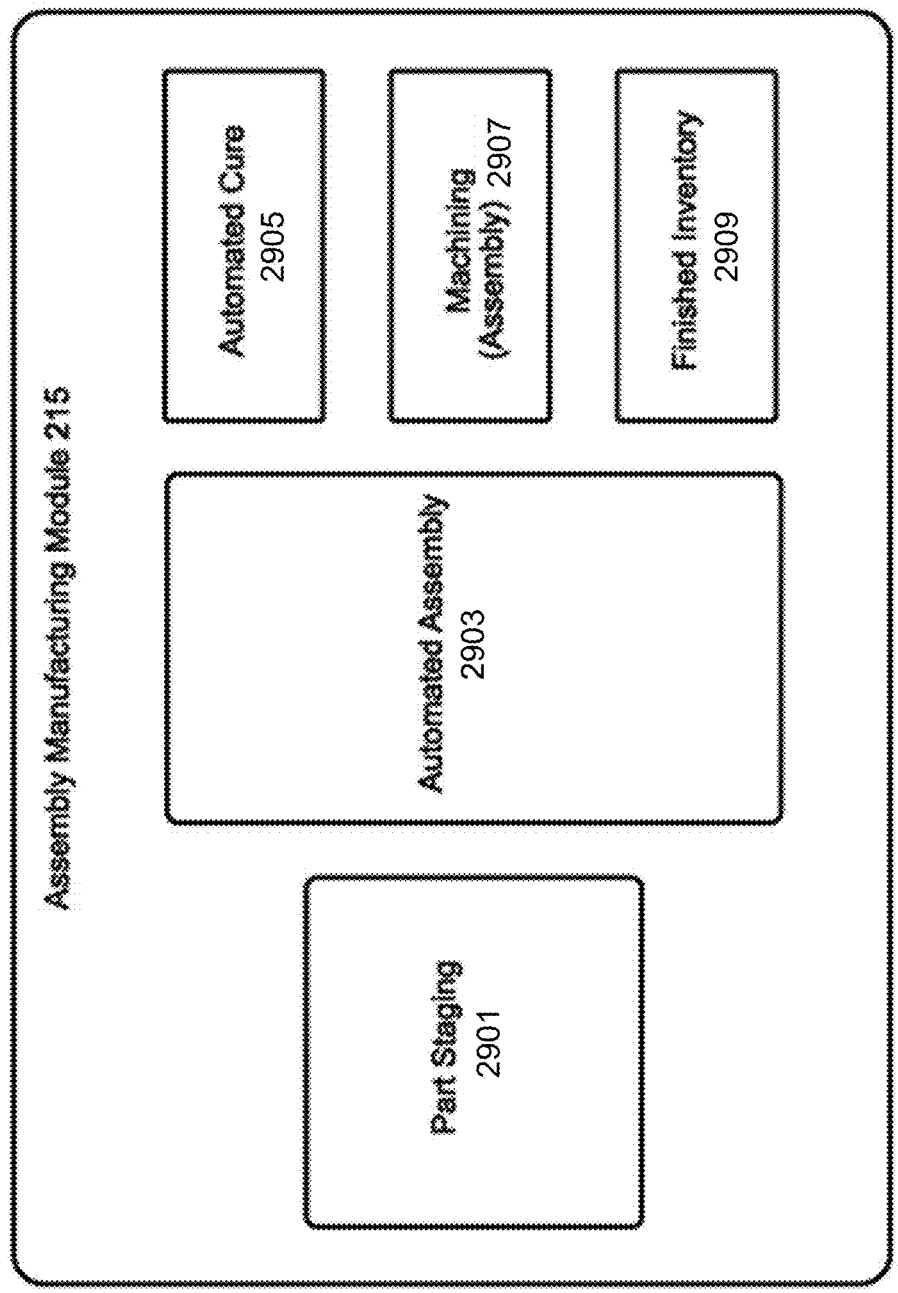
FIG. 29 illustrates further details of an assembly manufacturing module in accordance with an aspect of the present disclosure.

FIG. 29 illustrates further details of an assembly manufacturing module in accordance with an aspect of the present disclosure.

Assembly manufacturing module 215 can include a part staging module 2901, an automated assembly module 2903, an automated cure module 2905, a machining (assembly) module 2907, and a finished inventory module 2909.

Part Staging Module 2901

Part staging module 2901 can include the monitor and control the reception of parts from inventory and monitor, control, and load parts onto parts tables. The parts tables are mobile and flexible to any structure, and can be moved into and out of the assembly cell. The inputs for part staging module 2901 can include the identification and location of physical parts from inventory, which may be controlled by MES 2003. The parts can be "kitted/grouped" per part table. Input can include instructions from assembly module 211, for example, identification of parts to release for the given build, which parts go on what table, and instructions for putting those parts on the tables, e.g., position, orientation. The outputs for part staging module 2901 can include part tables that are to be loaded or loaded with parts to begin or continue the automated assembly process of a given structure.

Automated Assembly Module 2903

Automated assembly module 2903 can include monitoring and control of the physical process of automated structure assembly. Automated assembly module 2903 can include monitoring and control of loaded parts tables, and code from assembly module 211, and other inputs into the assembly cell, and automated assembly module 2903 can also include monitoring and control of bonded structure/assemblies from the assembly cell. The inputs for automated assembly module 2903 can include loaded parts tabled from part staging module 2901 and instructions from assembly module 211, as well as there may be input from the MES 2003. The outputs for automated assembly module 2903 can include the status and location of assembled or bonded structures/assemblies from the assembly cell.

Automated Cure Module 2905

Automated cure module 2905 can include monitoring and control of the transport of assemblies to the oven, loading of assemblies into an oven, timing and control of the curing process, and unloading of assemblies from oven. Automated cure module 2905 can include monitoring and control of structural adhesive curing, and obtaining final adhesive properties. The inputs for automated cure module 2905 can include the assembly, AGV or other transport methods to transport assemblies from assembly cell to oven, oven sensor inputs, instructions from assembly module 211, and robot OLP and IPC/PLC code specific to adhesive curing. Material properties (used to determine cure cycle) can also be input. The outputs for automated cure module 2905 can include the status and location of cured or partially cured assemblies.

Machining (Assembly) Module 2907

Machining (assembly) module 2907 can include monitoring and control of machining of the assembly. Machining (assembly) module 2907 can include monitoring and control of printing which may be used to aid CNC processes, and also include analysis of data generated from the assembly process, such as join frames, location of metrology features etc., to improve or modify the assembly process. The inputs for machining (assembly) module 2907 can include the status and location of bonded assemblies from completed curing processes, assembly fixture/holder locations on AGV or other transport devices, instructions from assembly module 211, CNC code, and MES 2003. The outputs for machining (assembly) module 2907 can include the status and location of assemblies.

Finished Inventory Module 2909

Finished inventory module 2809 can include monitoring and control of inventory of the completed assemblies. Finished inventory module 2809 can include monitoring and control of APS 200 software modules with MES 2003 and ERP 2001, which can allow for the automatic procurement of necessary BOM parts, inventory tracking, delivery timing, etc. The inputs for finished inventory module 2909 can include the status and location of finished assemblies, data from an MES 2003 inventory control system which can be integrated with APS 200 servers, and data from an ERP 2001 inventory control system. The outputs for finished inventory module 2909 can include status and location of the finished parts inventory, which can be integrated with procurement to trigger ERP 2001 system.

Figure 30:
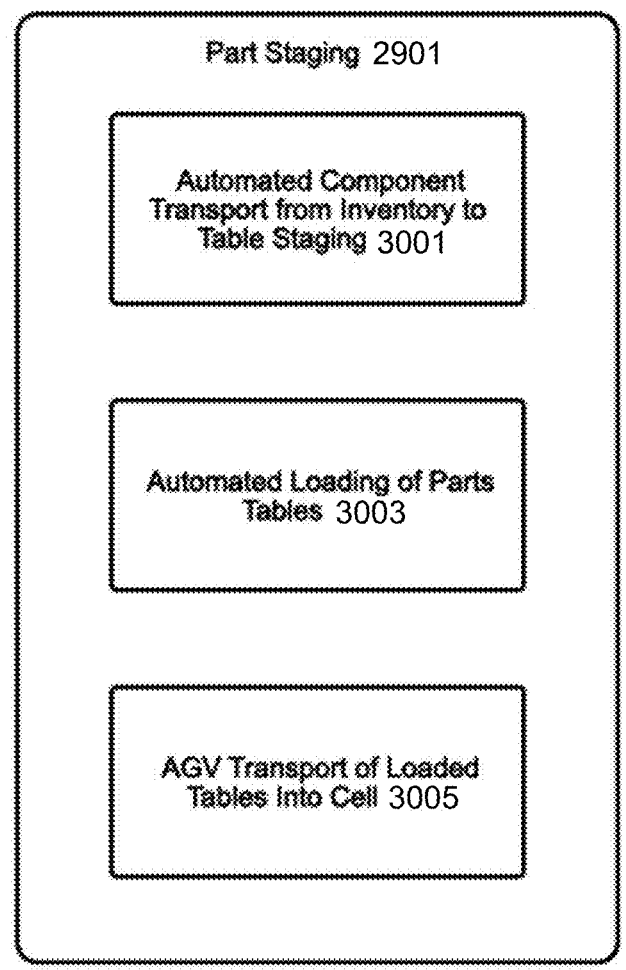
FIG. 30 illustrates further details of a part staging module in accordance with an aspect of the present disclosure.

FIG. 30 illustrates further details of a part staging module in accordance with an aspect of the present disclosure.

Part staging module 2901 can include an automated component transport from inventory to table staging module 3001, an automated loading of parts tables module 3003, and an AGV transport of loaded tables into cell module 3005.

Automated Component Transport from Inventory to Table Staging Module 3001

Automated component transport from inventory to table staging module 3001 can monitor and control the process of releasing parts from inventory and transporting them to the parts table loading stations. Instructions for which parts to release and kit may be provided by assembly module 211. The inputs for automated component transport from inventory to table staging module 3001 can include location and status of parts in inventory, which may be kitted or grouped by part table, and in some aspects of the present disclosure, kits may be controlled or monitored by an MES 2003. Instructions from assembly module 211 may be received by automated component transport from inventory to table staging module 3001 to identify which parts to release for a given build, which parts go on what table, AGV code, inventory controls, and information of when to load the tables which may be MES 2003 controlled. The outputs for automated component transport from inventory to table staging module 3001 can include the status and location of automated transport of parts from inventory to a parts table or loading/staging station.

Automated Loading of Parts Tables Module 3003

Automated loading of parts tables module 3003 can include monitoring and control of the process of loading parts onto the parts tables. The inputs for automated loading of parts tables module 3003 can include parts ready to be loaded, kits or kitting instructions of parts to be kitted on part tables, which may be received from automated component transport from inventory to table staging 3001, and instructions from assembly module 211, such as instructions on what part to place in what location of the parts table, table face, quality control, etc., as well as robot and IPC/PLC programs if automated loading. The outputs for automated loading of parts tables module 3003 can include the status and location of loaded parts tables ready for transport to the assembly cell.

AGV Transport of Loaded Tables Into Cell Module 3005

AGV transport of loaded tables into cell module 3005 can include the monitoring and control of the process of transporting the loaded part tables into the assembly cell via AGV. AGV transport of loaded tables into cell module 3005 receives instructions for the loading from assembly module 211. AGV transport of loaded tables into cell module 3005 allow for controlled entry of parts tables into the assembly cell, which can provide more continuous, uninterrupted assembly. In such an aspect of the present disclosure, AGV transport of loaded tables into cell module 3005 may also allow for the parts tables to be universal to any assembly cell structure. The inputs for AGV transport of loaded tables into cell module 3005 can include status and location of fully loaded parts tables, and instructions from assembly module 211, such as timing and indications of part tables to bring into the assembly cell, and AGV code/control. The outputs for AGV transport of loaded tables into cell module 3005 can include status and monitoring of parts tables that are or will be transported via AGV into the assembly cell.

Figure 31:
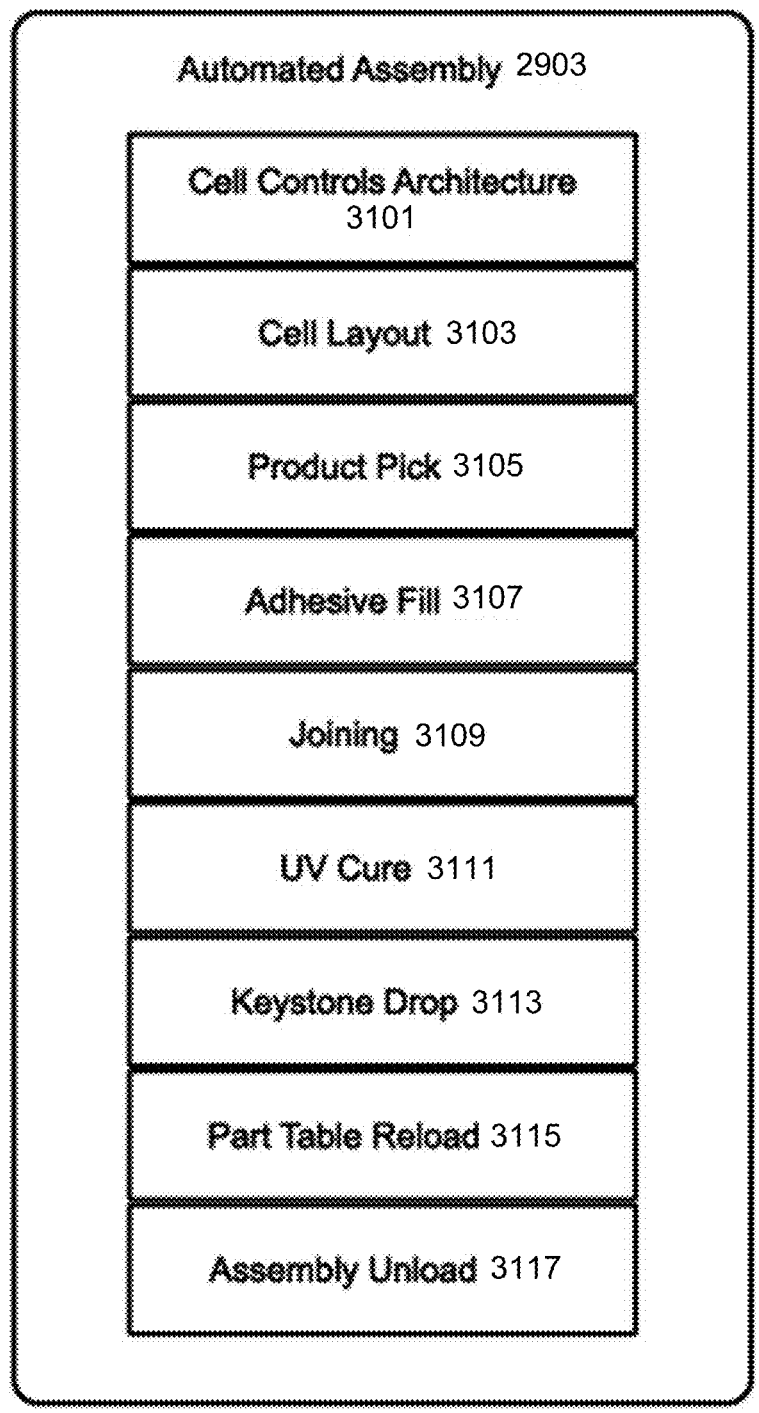
FIG. 31 illustrates further details of an automated assembly module in accordance with an aspect of the present disclosure.

FIG. 31 illustrates further details of an automated assembly module in accordance with an aspect of the present disclosure.

Automated assembly module 2903 can include a cell controls architecture module 3101, a cell layout module 3103, a product pick module 3105, an adhesive fill module 3107, a joining module 3109, a UV cure module 3111, a keystone drop module 3113, a part table reload module 3115, and an assembly unload module 3117.

Cell Controls Architecture Module 3101

Cell controls architecture module 3101 can provide monitoring and control of activity within the robot assembly cell. Cell controls architecture module 3101 can receive data from assembly module 211 to monitor and report status on activity within the assembly cell. The inputs for cell controls architecture module 3101 can include instructions from assembly module 211, such as outputs sent to the robotic assembly cell robots, which can be passed through the MES 2003, controls hardware such as data from safety hardware and sensors, IPC/PLC, and metrology hardware, move-measure-correct (MMC) software, which can include a live accuracy conductor module, tool center point (TCP) software for tool center point calibration, and IPC and robot programming code. The outputs for cell controls architecture module 3101 can include cell code received and ready to operate the robot assembly cell.

Cell Layout Module 3103

Cell layout module 3103 can include the software descriptions of the physical layout of a robot assembly cell, i.e., how the robots are arranged in the cell layout. Cell layout module 3103 may be used for different builds, as the cell layout module 3103 can be integrated with other control software to move the robots differently even though the robots are physically in the same locations. The inputs for cell layout module 3103 can include the hardware locations for the layout of the robots in the robotic assembly cell, e.g., a radial layout, a linear layout, etc. The outputs for cell layout module 3103 can include the layout of the robots in the robotic assembly cell.

Product Pick Module 3105

Product pick module 3105 can include monitoring and control of the process of a robot retrieving a part off the parts table. Product pick module 3105 can include monitoring and control of the robots and parts tables running the code/OLP for each specific pick, which may be provided by assembly module 211. Product pick module 3105 can use inputs from cameras or other sensors to correct any slight mis-positioning of parts on the part tables, and may use compliance devices on the parts tables that allow both the robot and the part table to be engaged with the part simultaneously.

The inputs for product pick module 3105 can include cell control architecture, the cell layout from cell layout module 3103 and instructions from assembly module 211. In an aspect of the present disclosure, input to pick module 3105 can include instructions for parts tables, which may include inputs from post and compliance devices on part tables, QC hardware robot inputs, cameras or other vision system inputs, and a pick process of handoff between parts table and robot. The outputs for product pick module 3105 can include status of successful retrievals or "picks" of parts from the parts table.

Adhesive Fill Module 3107

Adhesive fill module 3107 can include the monitoring and control of the process of filling joints between parts with structural or quick cure (UV) adhesives. Adhesive fill module 3107 can include the monitoring and control of when a part is retrieved from a parts table, and the location of the part and the adhesive injector, as well as the status, identification, and flow rate of the adhesive to be applied to the joint.

Adhesive fill module 3107 can include the monitoring of the parts being moved into the joining position, and monitoring and controlling the application of adhesives from one or more adhesive dispensers into the joint. The inputs for adhesive fill module 3107 can include, in general, the cell controls architecture, the cell layout, instructions from assembly module 211, inputs from joining module 3109 to indicate that the parts are ready to be adhered, inputs from adhesive metering and dispensing systems visual monitoring of adhesive dispensing, robot OLP and IPC/PLC code specific to adhesive application, structural joint architecture information, one or more UV features, QC sensors, adhesive, and TCP calibration hardware and software, which can ensure the location of the adhesive fill nozzles is known with accuracy. The outputs for adhesive fill module 3107 can include status and monitoring of joints filled with adhesive.

Joining Module 3109

Joining module 3109 can include monitoring and control of joining parts together. Joining module 3109 can include monitoring printed features, laser radar, or other metrology units to position and join parts, with or without the use of a fixture. Once the two parts or assemblies are joined, joining module may communicate with adhesive fill module 3107 to indicate that adhesive can be applied.

The inputs for joining module 3109 can include, the cell controls architecture, the cell layout, instructions from assembly module 211, input from adhesive fill module 3107. robot OLP and IPC/PLC code specific to parts joining, metrology printed metrology feature on parts or the dimensions or edges of parts, and an accuracy monitor for improving accuracy during build. The outputs for joining module 3109 can include the status of parts or assemblies are joined within the accuracy specification of the robotic assembly cell process.

UV Cure Module 3111

UV cure module 3111 can include the process monitoring and control of retaining the parts in space after joining is complete while adhesive is being cured. UV cure module 3111 may monitor the outputs of a UV light, thermal radiation source, etc. and control the outputs of curing devices to ensure that adhesives are cured in a desired manner and amount.

The inputs for UV cure module 3111 can include, the cell controls architecture, the cell layout, instructions from assembly module 211, inputs from product pick module 3105, adhesive fill module 3107, joining module 3109, robot OLP and IPC/PLC code specific to adhesive curing, a UV cure end-effector, and data from UV lights and sensors on the robot arms. The outputs for UV cure module 3011 can include the status and location of joints that are in the process of curing or have been cured.

Keystone Drop Module 3113

Keystone drop module 3113 can include the monitoring and control of the process of transferring a part or assembly from one or more robots to the keystone robot. The keystone robot can be, e.g., a larger robot capable of holding large subassemblies or assembled structures. The keystone robot may be, e.g., centrally located or otherwise accessible to most or all of the other robots in the assembly cell.

The inputs for keystone drop module 3113 can include, the cell controls architecture, the cell layout, instructions from assembly module 211, inputs from product pick module 3105, adhesive fill module 3107, joining module 3109, and robot OLP and IPC/PLC code. The outputs for keystone drop 3113 can include the status of a part or assembly that is to be or has been transferred from the assembly robots to the keystone robot.

Part Table Reload Module 3115

Part table reload module 3115 can be similar to the automated loading of parts tables module 3003 described herein. An assembly cell may be designed with extra parts tables so that the assembly cell can have a continuous supply of parts for assembly. During the build, part tables are picked until empty, triggered to exit the cell via AGV, brought to the part loading station, loaded, and returned into the assembly cell.

The inputs for part table reload module 3115 can include status and monitoring of parts ready to be loaded, data from automated component transport from inventory to table staging module 3001, and instructions from assembly module 211, which can include instructions on what part to place in what location, as well as robot and IPC/PLC programs. The outputs for part table reload module 3115 can include status of part tables to be transported out of the cell via AGV and reloaded with parts.

Assembly Unload Module 3117

Assembly unload module 3117 can monitor and control one or more robots to grab the sides of the keystone EOT. The keystone EOT toolside is released and the entire assembly can be lowered onto an AGV or other assembly carrier to proceed to the next manufacturing step. Assembly unload module 3117 can monitor and control the removal of assembly from the robotic assembly cell.

The inputs for assembly unload module 3117 can include status and monitoring of parts ready to be loaded, data from automated component transport from inventory to table staging module 3001, and instructions from assembly module 211. The outputs for assembly unload module 3117 can include the status of assemblies to be unloaded or have been unloaded from the robotic assembly cell.

Figure 32:
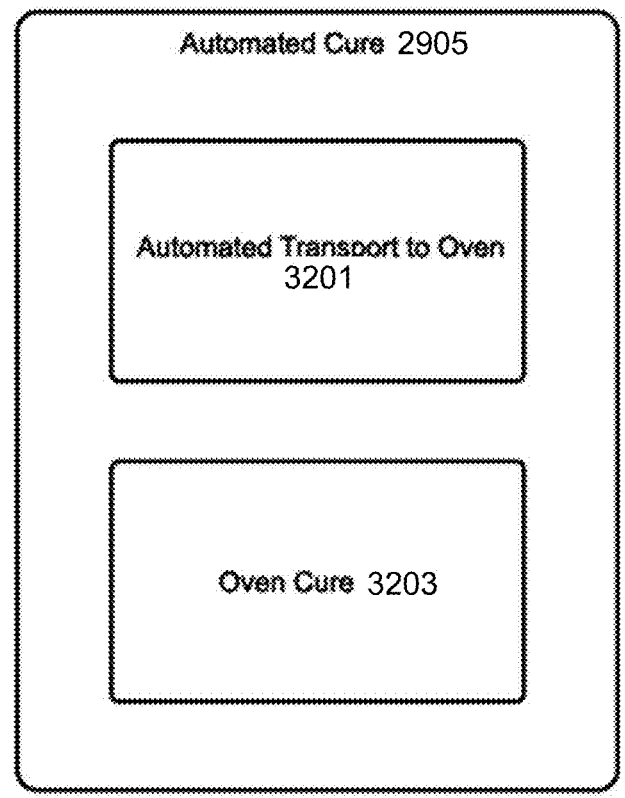
FIG. 32 illustrates further details of an automated cure module in accordance with an aspect of the present disclosure.

FIG. 32 illustrates further details of an automated cure module in accordance with an aspect of the present disclosure.

Automated cure 2805 can include an automated transport to oven module 3201 and an oven cure module 3203.

Automated Transport to Oven Module 3201

Automated transport to oven module 3201 can monitor and control the transportation of assemblies including adhesives that are to be thermally cured. The inputs for automated transport to oven module 3201 can include the status of parts that have received or will receive thermally curable adhesives, which may come from assembly module 211 or MES 2003. The outputs for automated transport to oven 3201 can include status and location of assemblies that are in transit to the oven or have been loaded into the oven, as well as status outputs to oven cure module 3203.

Oven Cure Module 3203

Oven cure module 3203 can include monitoring and control of thermal curing of adhesives in an assembly. Oven cure module 3203 can include monitoring and control of the temperature, time, and other oven parameters, as well as the length of time a given assembly has been curing. The inputs for oven cure 3203 can include information from automated transport to oven module 3201, oven sensors and timers, instructions from assembly module 211, and material properties from adhesives database 607. The outputs for oven cure module 3203 can include the status of assemblies, either those to be cured, during curing, or after curing.

Figure 33:
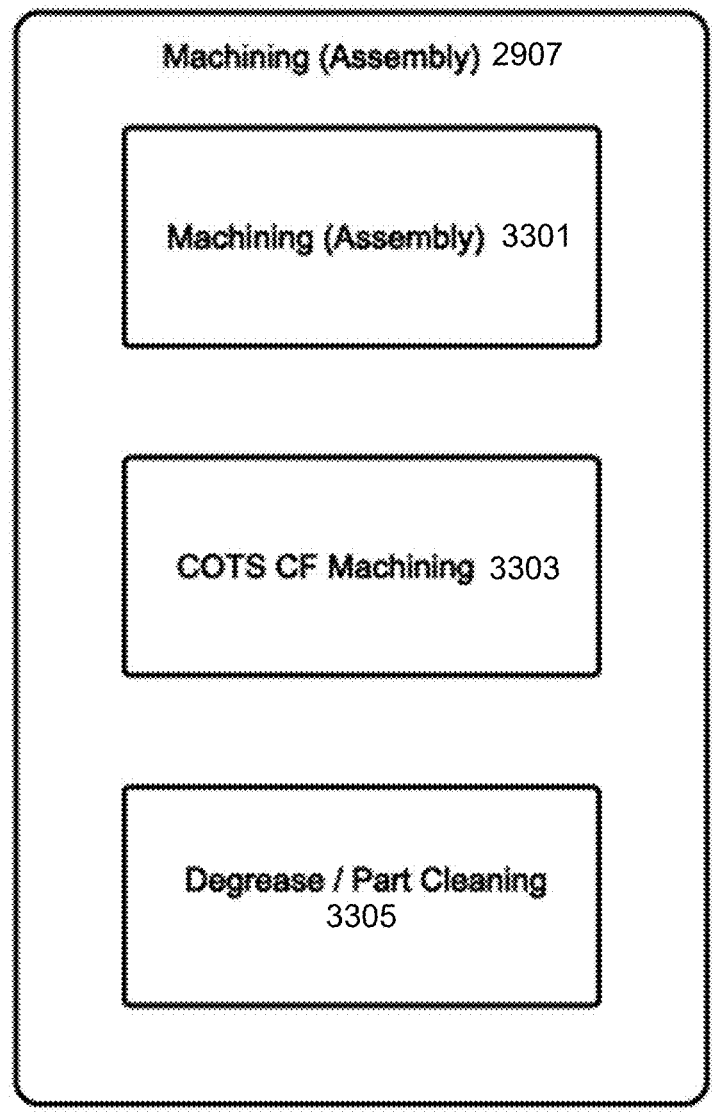
FIG. 33 illustrates further details of a machining (assembly) module in accordance with an aspect of the present disclosure.

FIG. 33 illustrates further details of a machining (assembly) module in accordance with an aspect of the present disclosure.

Machining (assembly) module 2907 can include a machining (assembly) module 3301, a COTS CF machining module 3303, and a degrease/part cleaning module 3305.

Machining (Assembly) Module 3301

Machining (assembly) module 3301 can include monitoring and control of the machining of an assembly. Machining (assembly) module 3301 can include monitoring and control of printing processes, which may be used to aid CNC processes, as well as monitor data generated during the assembly process such as join frames, location of metrology features, etc. to improve the assembly process. The inputs for machining (assembly) module 3301 can include the status and location of assemblies within assembly cells, instructions from assembly module 211 such as CNC code, and data from MES 2003. The outputs for machining (assembly) module 3301 can include status and location of assemblies to be machined, as well as status of assemblies during machining or having completed machining processes.

COTS CF Machining Module 3303

COTS CF machining module 3303 can include monitoring and control of the machining of COTS parts, which may include machining to incorporate robot gripper features, other assembly features, joint architecture, or other features. The inputs for COTS CF machining module 3303 can include COTS parts, drawings, information of locations to be machined, and CNC code from COTS parts library 609. The outputs for COTS CF machining module 3303 can include status and location of COTS parts ready to be machined, during machining, or those COTS parts that have been machined and are ready for assembly.

Degrease/Part Cleaning Module 3305

Degrease/part cleaning module 3305 can include monitoring and control of workflows for desired cleaning of assemblies. For example, a robot arm with cleaning EOT or a spray or dip cleaner can be used. The inputs for degrease/part cleaning module 3305 can include the status and location of an assembly that is to be cleaned. The outputs for degrease/part cleaning module 3305 can include the status and location of degreased and cleaned assembly.

Figure 34:
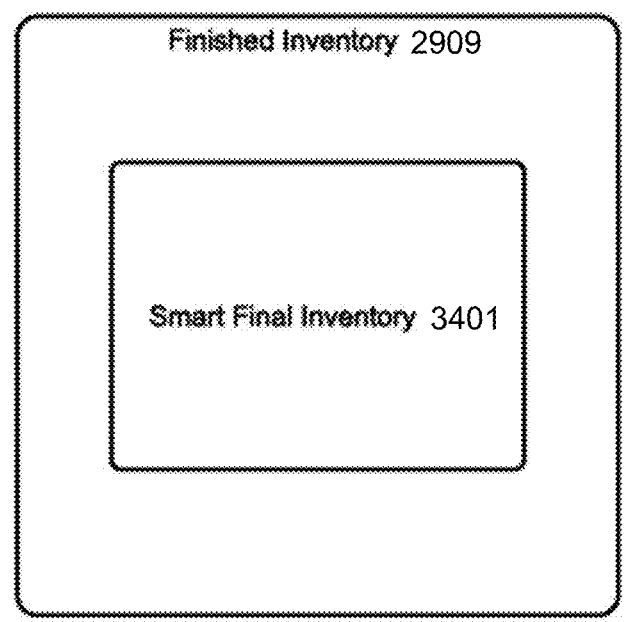
FIG. 34 illustrates further details of a finished inventory module in accordance with an aspect of the present disclosure.

FIG. 34 illustrates further details of a finished inventory module in accordance with an aspect of the present disclosure.

Finished inventory module 2909 can include a smart final inventory module 3401.

Smart Final Inventory Module 3401

Smart final inventory module 3401 can include monitoring and control of inventory of final products. Smart final inventory module 3401 can include monitoring of APS 200 data, along with MES 2003 and ERP 2001 data, to provide for procurement of necessary parts, inventory tracking, delivery timing, etc. The inputs for smart final inventory module 3401 can include the status and location of finished assemblies, as well as MES 2003 and/or ERP 2001 data. The outputs for smart final inventory module 3401 can include status and location of the inventory of finished parts, which can be integrated with ERP 2001 and MES 2003 for procurement of new materials.

Assembly System

Figure 35:
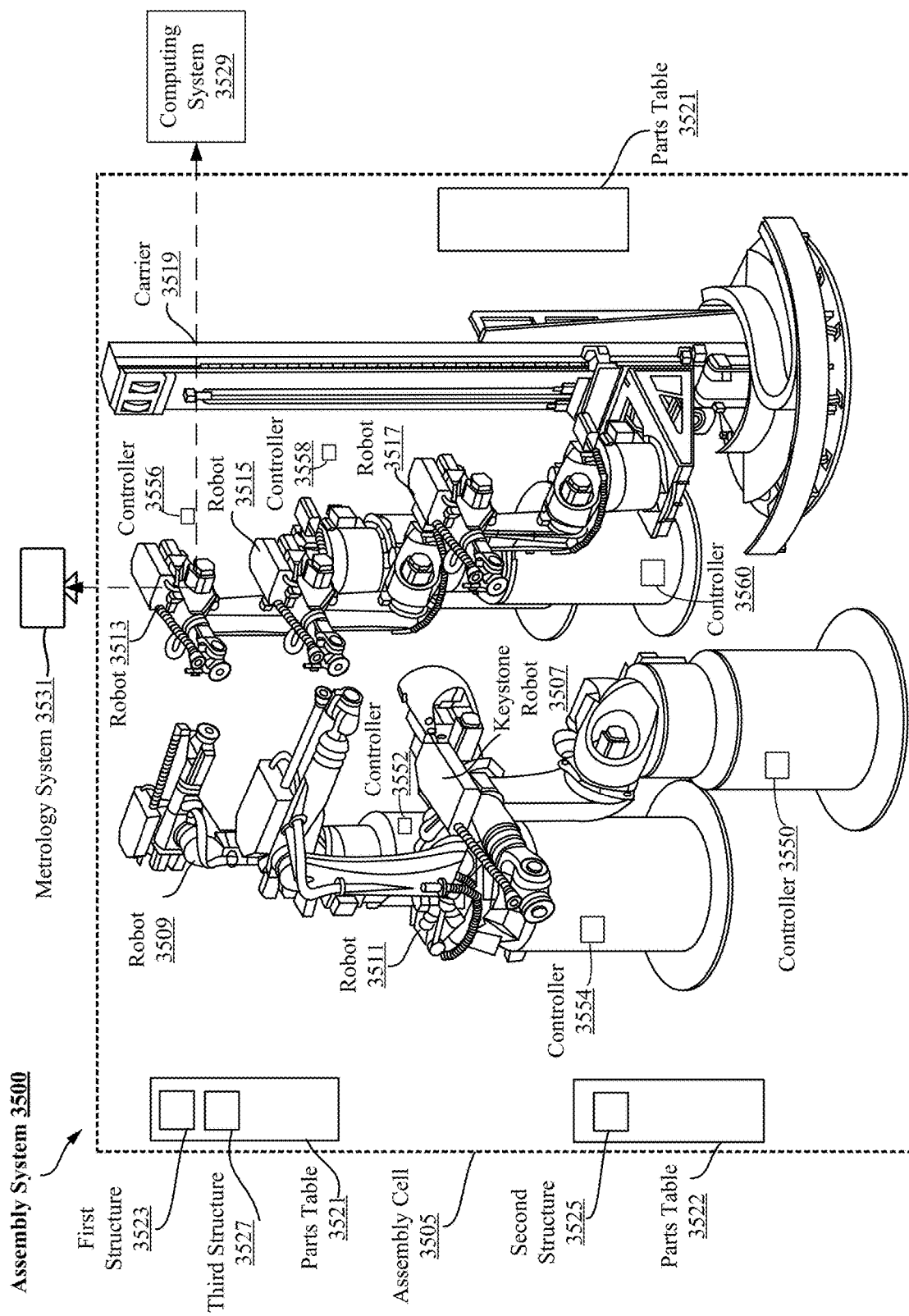
FIG. 35 illustrates a perspective view of an assembly system in accordance with an aspect of the present disclosure.

FIG. 35 illustrates a perspective view of an assembly system in accordance with an aspect of the present disclosure.

In an aspect of the present disclosure, mechanical devices, such as robots, may assemble parts and/or structures in an automated and/or semi-automated manner. At least one of the at least two structures may be additively manufactured, e.g., as described with respect to FIGS. 28A-28E above. In some aspects, at least one of the at least two structures may be a piece, part, node, component, and/or other additively manufactured structure, which may include two structures that previously have been joined. APS 200 may interact with, or be included as part of, one or more assembly systems 3500 as described herein.

Structures to be joined in association with assembly of a vehicle may be additively manufactured with one or more features that may facilitate or enable various assembly operations (e.g., joining). In an aspect of the present disclosure, an assembly system 3500 may include two robots, at least one of which may be positioned to join one structure with another structure without the use of fixtures. Various assembly operations may be performed, potentially repeatedly, so that multiple structures may be joined for fixtureless assembly of at least a portion of a vehicle (e.g., vehicle chassis, body, panel, and the like).

Within APS 200, manufacturing module 203, factory management module 212, assembly manufacturing module 215, and other modules, may interact with one or more assembly cells 3500 in the construction of assemblies or final products. In such an aspect, a first robot may be configured to engage with and retain a first structure to which one or more other structures may be joined during various operations performed in association with assembly of at least a portion of an end product, such as a vehicle. For example, the first structure may be a section of a vehicle chassis, panel, base piece, body, frame, etc., whereas other structures may be other sections of the vehicle chassis, panel, base piece, body, frame, etc.

In an aspect of the present disclosure, the first robot may engage and retain a first structure that is to be joined with a second structure, and the second structure may be engaged and retained by a second robot. Various operations performed with the first structure (e.g., joining the first structure with one or more other structures, which may include two or more previously joined structures) may be performed at least partially within an assembly cell that includes a plurality of robots. Accordingly, at least one of the robots may be directed (e.g., controlled) during manipulation of the first structure in order to function in accordance with a precision commensurate with the joining operation.

The present disclosure provides various different embodiments of directing one or more robots at least partially within an assembly system for assembly operations (including pre- and/or post-assembly operations). It will be appreciated that various embodiments described herein may be practiced together. For example, an embodiment described with respect to one illustration of the present disclosure may be implemented in another embodiment described with respect to another illustration of the present disclosure.

As shown in FIG. 35, an assembly system 3500 may be employed for component and/or part assembly. An assembly cell 3505 may be configured at the location of fixtureless assembly system 3500. Assembly cell 3505 may be a vertical assembly cell. Within assembly cell 3505, fixtureless assembly system 3500 may include a set of robots 3507, 3509, 3511, 3513, 3515, 3517. Robot 3507 may be referred to as a "keystone robot." Fixtureless assembly system 3500 may include parts tables 3521, 3522 that can hold parts and structures for the robots to access. For example, a first structure 3523, a second structure 3525, and a third structure 3527 may be positioned on one of parts tables 3521, 3522 to be picked up by the robots and assembled together. The weight and volume of the structures may vary without departing from the scope of the present disclosure. In various embodiments, one or more of the structures can be an additively manufactured structure, such as a complex node.

Assembly system 3500 may also include a computing system 3529 to issue commands to the various controllers of the robots of assembly cell 3505, as described in more detail below. In this example, computing system 3529 is communicatively connected to the robots through a wireless communication network. Fixtureless assembly system 3500 may also include a metrology system 3531 that can accurately measure the positions of the robotic arms of the robots and/or the structures held by the robots. Computing system 3529 and/or metrology system 3531 may be controlled by and/or part of computing system 2850 as described with respect to FIG. 28E herein.

Keystone robot 3507 may include a base and a robotic arm. The robotic arm may be configured for movement, which may be directed by computer-executable instructions loaded into a processor communicatively connected with keystone robot 3507. Keystone robot 3507 may contact a surface of assembly cell 3505 (e.g., a floor of the assembly cell) through the base.

Keystone robot 3507 may include and/or be connected with an end effector and/or fixture that is configured to engage and retain a first structure, part, and/or component. An end effector may be a component configured to interface with at least one structure. Examples of the end effectors may include jaws, grippers, pins, and/or other similar components capable of facilitating fixtureless engagement and retention of a structure by a robot. A fixture may also be employed by keystone robot 3507 to engage and retain a first structure, part, and/or component.

For example, a structure may be co-printed with one or more features that increase the strength of the structure, such as a mesh, honeycomb, and/or lattice arrangement. Such features may stiffen the structure to prevent unintended movement of the structure during the assembly process. In another example, a structure may be co-printed or additively manufactured with one or more features that facilitates engagement and retention of the structure by an end effector, such as protrusion(s) and/or recess(es) suitable to be engaged (e.g., "gripped") by an end effector. The aforementioned features of a structure may be co-printed with the structure and therefore may be of the same material(s) as the structure.

In retaining the first structure, keystone robot 3507 may position (e.g., move) the first structure; that is, the position of the first structure may be controlled by keystone robot 3507 when retained by the keystone robot. Keystone robot 3507 may retain the first structure by "holding" or "grasping" the first structure, e.g., using an end effector of a robotic arm of the keystone robot 3507 and/or using a fixture to maneuver the first structure. For example, keystone robot 3507 may retain the first structure by causing gripper fingers, jaws, and the like to contact one or more surfaces of the first structure and apply sufficient pressure thereto such that the keystone robot controls the position of the first structure. That is, the first structure may be prevented from moving freely in space when retained by keystone robot 3507, and movement of the first structure may be constrained by the keystone robot 3507.

As other structures (including subassemblies, substructures of structures, etc.) are connected to the first structure, keystone robot 3507 may retain the engagement with the first structure. The aggregate of the first structure and one or more structures connected thereto may be referred to as a structure itself, but may also be referred to as an "assembly" or a "subassembly" herein. Keystone robot 3507 may also retain an engagement with an assembly once the keystone robot has engaged the first structure.

In some embodiments, robots 3509 and 3511 of assembly cell 3505 may be similar to keystone robot 3507, and thus may include respective end effectors and/or fixtures configured to engage with structures that may be connected with the first structure when retained by the keystone robot 3507. In some embodiments, robots 3509, 3511 may be referred to as "assembly robots" and/or "materials handling robots."

In some embodiments, robot 3513 of assembly cell 3505 may be used to effect a structural connection between the first structure and the second structure. Robot 3513 may be referred to as a "structural adhesive robot." Structural adhesive robot 3513 may be similar to the keystone robot 3507, except the structural adhesive robot may include a tool at the distal end of the robotic arm that is configured to apply structural adhesive to at least one surface of structures retained by the keystone robot 3507 and/or assembly robots 3509, 3511. Application of the structural adhesive may occur before or after the structures are positioned at joining proximities with respect to other structures for joining with the other structures. The joining proximity can be a position that allows a first structure to be joined to a second structure. For example, in various embodiments, the first and second structures may be joined through the application of an adhesive while the structures are within their joining proximity.

However, structural adhesives might take a relatively long time to cure. If this is the case, the robots retaining the first and second structures, for example, might have to hold the structures at the joining proximity for a long time. This would prevent the robots from being used for other tasks, such as continuing to pick up and assemble structures, for an extended time while the structural adhesive cures. In order to allow more efficient use of the robots, a quick-cure adhesive may be additionally applied in some embodiments to join the structures quickly and retain the structures so that the structural adhesive can cure without requiring both robots to hold the structures during curing.

In an aspect of the present disclosure, robot 3515 of fixtureless assembly system 3500 may be used to apply a quick-cure adhesive. In such an aspect, a quick-cure UV adhesive may be used, and robot 3515 may be referred to as a "UV robot." UV robot 3515 may be similar to keystone robot 3507, except the UV robot may include a tool at the distal end of the robotic arm that is configured to apply a quick-cure UV adhesive and to cure the adhesive, e.g., when the structures are positioned within the joining proximity. That is, UV robot 3515 may cure an adhesive after the adhesive is applied to the first structure and/or second structure when the structures are within the joining proximity of the robotic arms of keystone robot 3507 and/or assembly robots 3509, 3511.

In an aspect of the present disclosure, one or more of the robots 3507, 3509, 3511, 3513, 3515, and 3517 may be used for multiple different roles. For example, robot 3517 may perform the role of an assembly robot, such as assembly robots 3509, 3511, and the role of a UV robot, such as UV robot 3515. In this regard, robot 3517 may be referred to as an "assembly/UV robot." Assembly/UV robot 3517 may offer functionality similar to each of the assembly robots 3509, 3511 when the distal end of the robotic arm of the assembly/UV robot includes an end effector (e.g., connected by means of a tool flange). However, assembly/UV robot 3515 may offer multi-functional capabilities similar to UV robot 3515 when the distal end of the robotic arm of the assembly/UV robot includes a tool configured to applied UV adhesive and to emit UV light to cure the UV adhesive.

The quick-cure adhesive applied by UV robot 3515 and assembly/UV robot 3517 may provide a partial adhesive bond in that the adhesive may be used to hold the relative positions of a first structure and a second structure within the joining proximity until the structural adhesive is applied to permanently join them. The adhesive providing the partial adhesive bond may be removed thereafter (e.g., as with temporary adhesives) or not (e.g., as with complementary adhesives).

In a fixtureless assembly system 3500, at least one surface of the first structure and/or second structure to which adhesive is to be applied may be determined based on gravity or other load-bearing forces on various regions of the assembly. Finite element method (FEM) analyses may be used to determine the at least one surface of the first structure and/or the second structure, as well as one or more discrete areas on the at least one surface, to which the adhesive is to be applied. For example, FEM analyses may indicate one or more connections of a structural assembly that may be unlikely or unable to support sections of the structural assembly disposed about the one or more connections.

In assembling at least a portion of a vehicle in assembly cell 3505, the second structure may be joined directly to the first structure by directing the various robots 3507, 3509, 3511, 3513, 3515, and 3517 as described herein. Additional structures may be indirectly joined to the first structure. For example, the first structure may be directly joined to the second structure through movement(s) of keystone robot 3507, structural adhesive robot 3513, at least one assembly robot 3509, 3511, and/or UV robot 3515. Thereafter, the first structure, joined with the second structure, may be indirectly joined to an additional structure as the additional structure is directly joined to the second structure. Thus, the first structure, which may continue to be retained by keystone robot 3507, may evolve throughout an assembly process as additional structures are directly or indirectly joined to it.

In an aspect of the present disclosure, assembly robots 3509, 3511 may join two or more structures together, e.g., with a partial, quick-cure adhesive bond, before joining those two or more structures with the first structure retained by keystone robot 3507. The two or more structures that are joined to one another prior to being joined with a structural assembly may also be a structure, and may further be referred to as a "subassembly." Accordingly, when a structure forms a portion of a structural subassembly that is connected with the first structure through movements of keystone robot 3507, structural adhesive robot 3513, at least one assembly robot 3509, 3511, and UV robot 3515, a structure of the structural subassembly may be indirectly connected to the first structure when the structural subassembly is joined to a structural assembly including the first structure.

In an aspect of the present disclosure, the structural adhesive may be applied, e.g., deposited in a groove of one of the structures, before the first and second structures are brought within the joining proximity. For example, structural adhesive robot 3513 may include a dispenser for a structural adhesive and may apply the structural adhesive prior to the structures being brought within the joining proximity. A structural adhesive may be applied after a structural assembly is fully constructed (that is, once each structure of the portion of the vehicle is joined to the first structure). For example, the structural adhesive may be applied to one or more joints or other connections between the first structure and the second structure. The structural adhesive may be applied at a time after the last adhesive curing by the UV robot 3515 is performed. The structural adhesive may also be applied separately from fixtureless assembly system 3500.

In an aspect of the present disclosure, one or more of robots 3507, 3509, 3511, 3513, 3515, 3517 may be secured to a surface of assembly cell 3505 through a respective base of each of the robots. For example, one or more of the robots may have a base that is bolted to the floor of the assembly cell 3505. In various other embodiments, one or more of the robots may include or may be connected with a component configured to move the robot within assembly cell 3505. For example, a carrier 3519 in assembly cell 3505 may be connected to assembly/UV robot 3517.

Each of the robots 3507, 3509, 3511, 3513, 3515, 3517 may be communicatively connected with a controller, such as a respective one of controllers 3550, 3552, 3554, 3556, 3558, 3560 shown in FIGS. 6A through 6V. Each of controllers 3550, 3552, 3554, 3556, 3558, 3560 may include, for example, a memory and a processor communicatively connected to the memory (e.g., memory 2854 as described with respect to FIG. 28E). According to some other embodiments, one or more of controllers 3550, 3552, 3554, 3556, 3558, 3560 may be implemented as a single controller that is communicatively connected to one or more of the robots controlled by the single controller. Controllers 3550, 3552, 3554, 3556, 358, and/or 3560 may be part of, or controlled by, processor units 2852 of computer 2850 as described with respect to FIG. 28E.

Computer-readable instructions for performing fixtureless assembly can be stored on the memories of controllers 3550, 3552, 3554, 3556, 3558, 3560 and the processors of the controllers can execute the instructions to cause robots 3507, 3509, 3511, 3513, 3515, 3517 to perform various operations.

Controllers 3550, 3552, 3554, 3556, 3558, 3560 may be communicatively connected to one or more components of an associated robot 3507, 3509, 3511, 3513, 3515, or 3517, for example, via a wired (e.g., bus or other interconnect) and/or wireless (e.g., wireless local area network, wireless intranet) connection. Each of the controllers may issue commands, requests, etc., to one or more components of the associated robots, for example, in order to perform various operations.

In an aspect of the present disclosure, controllers 3550, 3552, 3554, 3556, 3558, 3560 may issue commands, etc., to a robotic arm of the associated robot 3507, 3509, 3511, 3513, 3515, or 3517 and, for example, may direct the robotic arms based on a set of absolute coordinates relative to a global cell reference frame of assembly cell 3505. In various embodiments, controllers 3550, 3552, 3554, 3556, 3558, 3560 may issue commands, etc., to tools connected to the distal ends of the robotic arms. For example, the controllers may control operations of the tool, including depositing a controlled amount of adhesive on a surface of the first structure or second structure by an adhesive applicator, exposing adhesive deposited between structures to UV light for a controlled duration by a curing tool, and so forth. In various embodiments, controllers 3550, 3552, 3554, 3556, 3558, 3560 may issue commands, etc., to end effectors at the distal ends of the robotic arms. For example, the controllers may control operations of the end effectors, including, engaging, retaining, and/or manipulating a structure.

According to various other aspects, a computing system, such as computing system 3529, similarly having a processor and memory, may be communicatively connected with one or more of controllers 3550, 3552, 3554, 3556, 3558, 3560. In various embodiments, the computing system may be communicatively connected with the controllers via a wired and/or wireless connection, such as a local area network, an intranet, a wide area network, and so forth. In some embodiments, the computing system may be implemented in one or more of controllers 3550, 3552, 3554, 3556, 3558, 3560. In some other embodiments, the computing system may be located outside assembly cell 3505, e.g., as part of computer 2850 described with respect to FIG. 28E.

The processor of the computing system may execute instructions loaded from memory, and the execution of the instructions may cause the computing system to issue commands, etc., to the controllers 3550, 3552, 3554, 3556, 3558, 3560, such as by transmitting a message including the command, etc., to one of the controllers over a network connection or other communication link.

According to some embodiments, one or more of the commands may indicate a set of coordinates and may indicate an action to be performed by one of robots 3507, 3509, 3511, 3513, 3515, 3517 associated with the one of the controllers that receives the command. Examples of actions that may be indicated by commands include directing movement of a robotic arm, operating a tool, engaging a structure, rotating and/or translating a structure, and so forth. For example, a command issued by a computing system may cause controller 3552 of assembly robot 3509 to direct a robotic arm of assembly robot 3509 so that the distal end of the robotic arm may be located based on a set of coordinates that is indicated by the command.

The instructions loaded from memory and executed by the processor of the computing system, which cause the controllers to control actions of the robots may be based on computer-aided design (CAD) data. For example, a CAD model of assembly cell 3505 (e.g., including CAD models of the physical robots) may be constructed and used to generate the commands issued by the computing system.

In some embodiments, one or more CAD models may represent locations corresponding to various elements within the assembly cell 3505. Specifically, a CAD model may represent the locations corresponding to one or more of robots 3507, 3509, 3511, 3513, 3515, 3517. In addition, a CAD model may represent locations corresponding to structures and repositories of the structures (e.g., storage elements, such as parts tables, within fixtureless assembly system 3500 at which structures may be located before being engaged by an assembly robot). In various embodiments, a CAD model may represent sets of coordinates corresponding to respective initial or base positions of each of robots 3507, 3509, 3511, 3513, 3515, 3517.

Figure 36:
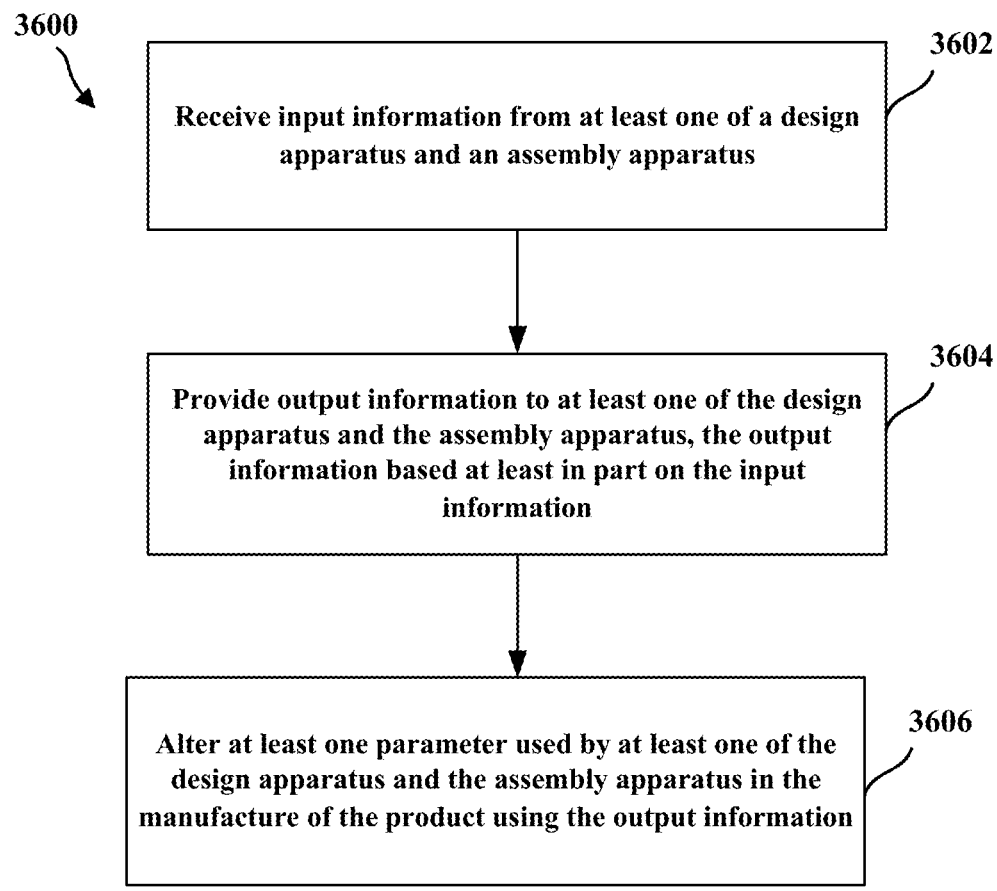
FIG. 36 shows a flow diagram illustrating an exemplary method for additively manufacturing a component in accordance with an aspect of the present disclosure.

FIG. 36 shows a flow diagram illustrating an exemplary method 3600 for manufacturing in accordance with an aspect of the present disclosure.

The objects that perform, at least in part, the exemplary functions of FIG. 36 may include, for example, computer 2850 and one or more components therein, a three-dimensional printer, such as illustrated in FIGS. 28A-E, and other objects such as an assembly cell as illustrated in FIG. 35, may be used to implement the functions described.

It should be understood that the steps identified in FIG. 36 are exemplary in nature, and a different order or sequence of steps, and additional or alternative steps, may be undertaken as contemplated in this disclosure to arrive at a similar result.

At 3602, a control apparatus receives input information from at least one of a design apparatus and an assembly apparatus. The control apparatus may be one or more processors or controllers as described in FIGS. 3, 28E, and 35 as processors 304, 2852, 3550, 3552, 3554, 3556, 3558, and 3560, or another processor or controller within APS 200.

At 3604, the control apparatus provides output information to at least one of the design apparatus and the assembly apparatus, the output information based at least in part on the input information.

At 3606, the control apparatus alters at least one parameter used by at least one of the design apparatus and the assembly apparatus in the manufacture of the product using the output information.

The previous description is provided to enable any person skilled in the art to practice the various aspects described herein. Various modifications to these exemplary embodiments presented throughout this disclosure will be readily apparent to those skilled in the art, and the concepts disclosed herein may be applied in other ways than the examples disclosed herein. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

Any claims based on the present disclosure are not intended to be limited to the example embodiments presented throughout the disclosure, but are to be accorded the full scope consistent with the language claims. All structural and functional equivalents to the elements of the example embodiments described throughout the present disclosure that are known or later come to be known to those of ordinary skill in the art are intended to be encompassed in the claims.

What is claimed is:

1. An apparatus for manufacturing a product, comprising:
    a design apparatus configured to receive input information, split a structure in at least one location so the structure is divided into a plurality of parts that can be printed and assembled together to form the product, and generate a design output based at least on the split of the structure; and
    a monitoring apparatus,
    wherein the monitoring apparatus monitors at least an assembly apparatus such that at least one material used by the assembly apparatus is provided to the assembly apparatus at a time prior to use of the at least one material in the assembly apparatus.

2. The apparatus of claim 1, further comprising a control apparatus coupled to the design apparatus and the assembly apparatus, wherein the control apparatus receives control input information from the design apparatus and the assembly apparatus, and provides output information for altering at least one parameter used in manufacturing of the product.

3. The apparatus of claim 2, wherein the control apparatus maintains at least one first parameter at a desired value while altering the at least one parameter used by the design apparatus or the assembly apparatus.

4. The apparatus of claim 3, wherein the at least one first parameter is at least one of a strength, a crashworthiness, cost, or an assembly time.

5. The apparatus of claim 2, wherein the output information is delivered to the design apparatus and the assembly apparatus for changing the operation of the design apparatus or the assembly apparatus.

6. The apparatus of claim 2, further comprising a testing apparatus.

7. The apparatus of claim 6, wherein an output of the testing apparatus is used by the control apparatus to alter at least one parameter used by the design apparatus or the assembly apparatus.

8. The apparatus of claim 1, wherein the monitoring apparatus further monitors the design apparatus, such that a change in the design output of the product made by the design apparatus is promulgated to the assembly apparatus.

9. The apparatus of claim 1, wherein the monitoring apparatus monitors an inventory of the at least one material.

10. The apparatus of claim 1, wherein the assembly apparatus is configured to receive the plurality of parts and assemble the plurality of parts to form the product.

11. The apparatus of claim 1, wherein the design apparatus is configured to determine a number of splits based on a size of at least one part of the plurality of parts.

12. The apparatus of claim 1, wherein the design apparatus is configured to determine how to split the structure while meeting design requirements of the input information.

13. The apparatus of claim 12, wherein the design apparatus is configured to compute metrics of the determined split and outputs data based on at least the determined split.

14. The apparatus of claim 12, wherein the design apparatus is configured to evaluate the determined split against the design requirements and outputs design objective metrics based on at least the determined split.

15. The apparatus of claim 14, wherein the design apparatus is configured to sample the determined split and the output design objective metrics to provide where joints between the parts are to be located.

16. The apparatus of claim 1, wherein the split of the structure comprises splitting the structure in a plurality of locations, wherein the design apparatus is configured to analyze each of the split locations of the structure in order to achieve design requirements of the input information, and output a split optimization of the structure.

17. The apparatus of claim 1, further comprising an additive manufacturing apparatus configured to receive the design output and manufacture the plurality of parts.

18. An apparatus for manufacturing a product, comprising:
    a design apparatus configured to receive input information, split a structure in at least one location so the structure is divided into a plurality of parts that can be printed and assembled together to form the product, and generate a design output based at least on the split of the structure,
    wherein the design apparatus is configured to determine how to split the structure while meeting design requirements of the input information, and
    wherein the design apparatus is configured to evaluate the determined split against the design requirements and outputs design objective metrics based on at least the determined split.

19. The apparatus of claim 18, further comprising an assembly apparatus, wherein the assembly apparatus is configured to receive the plurality of parts and assemble the plurality of parts to form the product.

20. The apparatus of claim 18, wherein the design apparatus is configured to determine a number of splits based on a size of at least one part of the plurality of parts.

21. The apparatus of claim 18, wherein the design apparatus is configured to compute metrics of the determined split and outputs data based on at least the determined split.

22. The apparatus of claim 18, wherein the design apparatus is configured to sample the determined split and the output design objective metrics to provide where joints between the parts are to be located.

23. The apparatus of claim 18, wherein the split of the structure comprises splitting the structure in a plurality of locations, wherein the design apparatus is configured to analyze each of the split locations of the structure in order to achieve design requirements of the input information, and output a split optimization of the structure.

24. The apparatus of claim 18, further comprising an additive manufacturing apparatus configured to receive the design output and manufacture the plurality of parts.

25. The apparatus of claim 18, further comprising a control apparatus coupled to the design apparatus and an assembly apparatus, wherein the control apparatus receives control input information from the design apparatus and the assembly apparatus, and provides output information for altering at least one parameter used in manufacturing of the product.

26. The apparatus of claim 25, wherein the output information is delivered to the design apparatus and the assembly apparatus for changing the operation of the design apparatus or the assembly apparatus.

27. The apparatus of claim 25, wherein the control apparatus maintains at least one first parameter at a desired value while altering the at least one parameter used by the design apparatus or the assembly apparatus.

28. The apparatus of claim 27, wherein the at least one first parameter is at least one of a strength, a crashworthiness, cost, or an assembly time.

29. The apparatus of claim 25, further comprising a testing apparatus.

30. The apparatus of claim 29, wherein an output of the testing apparatus is used by the control apparatus to alter at least one parameter used by the design apparatus or the assembly apparatus.

31. The apparatus of claim 25, wherein the control apparatus comprises a monitoring apparatus.

32. The apparatus of claim 31, wherein the monitoring apparatus monitors at least the assembly apparatus such that at least one material used by the assembly apparatus is provided to the assembly apparatus at a time prior to use of the at least one material in the assembly apparatus.

33. The apparatus of claim 32, wherein the monitoring apparatus further monitors the design apparatus, such that a change in the design output of the product made by the design apparatus is promulgated to the assembly apparatus.

34. The apparatus of claim 32, wherein the monitoring apparatus monitors an inventory of the at least one material.

35. A method for manufacturing a product comprising:
receiving input information;
performing at least one splitting strategy on the input information, wherein the at least one splitting strategy is configured to split a structure in at least one location so the structure is divided into a plurality of parts that can be printed and assembled together to form the product;
generating a design output based at least on the splitting strategy; and
monitoring at least an assembly apparatus such that at least one material used by the assembly apparatus is provided to the assembly apparatus at a time prior to use of the at least one material in the assembly apparatus.

36. The method of claim 35, further comprising:
receiving the plurality of parts; and
assembling the plurality of parts to form the product.

37. The method of claim 35, wherein the splitting is in a plurality of locations of the structure and the method further comprising:
analyzing each of the split locations of the structure in order to achieve design requirements of the input information; and
outputting a split optimization of the structure.

38. The method of claim 35, further comprising:
determining a number of splits based on a size of at least one part of the plurality of parts.

39. The method of claim 35, further comprising:
receiving the design output; and
manufacturing the plurality of parts.

40. The method of claim 35, further comprising:
monitoring a design apparatus, such that a change in the design output of the product made by the design apparatus is promulgated to the assembly apparatus.

41. The method of claim 40, further comprising:
monitoring an inventory of the at least one material.

42. The method of claim 35, further comprising:
providing output information to at least one of a design apparatus and the assembly apparatus; and
altering at least one parameter used by at least one of the design apparatus and the assembly apparatus in the manufacture of the product using the output information.

43. The method of claim 42, further comprising:
delivering the output information to the design apparatus and the assembly apparatus for changing the operation of the design apparatus or the assembly apparatus.

44. The method of claim 42, wherein the output information is based at least in part on the input information.

45. The method of claim 42, further comprising:
maintaining at least one first parameter at a desired value while altering the at least one parameter used by the design apparatus or the assembly apparatus.

46. The method of claim 45, wherein the at least one first parameter is at least one of a strength, a crashworthiness, cost, or an assembly time.

47. The method of claim 42, further comprising a testing apparatus.

48. The method of claim 47, further comprising:
providing testing output information, wherein the testing output information is used by a control apparatus to alter at least one parameter used by the design apparatus or the assembly apparatus.

49. The method of claim 35, further comprising:
determining how to split the structure while meeting design requirements of the input information.

50. The method of claim 49, further comprising:
computing metrics of the determined split; and
outputting data based on at least the determined split for a joint split.

51. The method of claim 49, further comprising:
evaluating the determined split against the design requirements; and
outputting design objective metrics based on at least the determined split.

52. The method of claim 51, further comprising:
sampling the determined split and the output design objective metrics to provide where joints between the parts are to be located.

53. A method for manufacturing a product, comprising:
receiving input information;
performing at least one splitting strategy on the input information, wherein the at least one splitting strategy is configured to split a structure in at least one location so the structure is divided into a plurality of parts that can be printed and assembled together to form the product;
determining how to split the structure while meeting design requirements of the input information;
evaluating the determined split against the design requirements;

outputting design objective metrics based on at least the determined split; and generating a design output based at least on the splitting strategy.

54. The method of claim 53, further comprising:
receiving the plurality of parts; and
assembling the plurality of parts to form the product.

55. The method of claim 53, wherein the splitting is in a plurality of locations of the structure and the method further comprising:
analyzing each of the split locations of the structure in order to achieve design requirements of the input information; and
outputting a split optimization of the structure.

56. The method of claim 53, further comprising:
determining a number of splits based on a size of at least one part of the plurality of parts.

57. The method of claim 53, further comprising:
receiving the design output; and
manufacturing the plurality of parts.

58. The method of claim 53, further comprising:
computing metrics of the determined split; and
outputting data based on at least the determined split for a joint split.

59. The method of claim 53, further comprising:
sampling the determined split and the output design objective metrics to provide where joints between the parts are to be located.

60. The method of claim 53, further comprising:
monitoring at least an assembly apparatus such that at least one material used by the assembly apparatus is provided to the assembly apparatus at a time prior to use of the at least one material in the assembly apparatus.

61. The method of claim 60, further comprising:
monitoring a design apparatus, such that a change in the design output of the product made by the design apparatus is promulgated to the assembly apparatus.

62. The method of claim 60, further comprising:
monitoring an inventory of the at least one material.

63. The method of claim 53, further comprising:
providing output information to at least one of a design apparatus and an assembly apparatus; and
altering at least one parameter used by at least one of the design apparatus and the assembly apparatus in the manufacture of the product using the output information.

64. The method of claim 63, further comprising:
delivering the output information to the design apparatus and the assembly apparatus for changing the operation of the design apparatus or the assembly apparatus.

65. The method of claim 63, wherein the output information is based at least in part on the input information.

66. The method of claim 63, further comprising:
maintaining at least one first parameter at a desired value while altering the at least one parameter used by the design apparatus or the assembly apparatus.

67. The method of claim 66, wherein the at least one first parameter is at least one of a strength, a crashworthiness, cost, or an assembly time.

68. The method of claim 65, further comprising a testing apparatus.

69. The method of claim 68, further comprising:
providing testing output information, wherein the testing output information is used by a control apparatus to alter at least one parameter used by the design apparatus or the assembly apparatus.

* * * * *